US010361415B2

(12) United States Patent
Ameyama et al.

(10) Patent No.: US 10,361,415 B2
(45) Date of Patent: Jul. 23, 2019

(54) SEPARATOR FOR ELECTRICITY STORAGE DEVICE

(71) Applicant: Asahi Kasei Kabushiki Kaisha, Tokyo (JP)

(72) Inventors: Keitaro Ameyama, Tokyo (JP); Hiroshi Miyazawa, Tokyo (JP); Satoshi Hashimoto, Tokyo (JP); Masatoshi Ikemi, Tokyo (JP); Koichiro Azuma, Tokyo (JP); Kimio Imaizumi, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 243 days.

(21) Appl. No.: 15/129,155

(22) PCT Filed: Mar. 3, 2015

(86) PCT No.: PCT/JP2015/056199
§ 371 (c)(1),
(2) Date: Sep. 26, 2016

(87) PCT Pub. No.: WO2016/047165
PCT Pub. Date: Mar. 31, 2016

(65) Prior Publication Data
US 2017/0263907 A1    Sep. 14, 2017

Related U.S. Application Data

(63) Continuation of application No. PCT/JP2015/056199, filed on Mar. 3, 2015.

(30) Foreign Application Priority Data

Sep. 26, 2014 (JP) ................................. 2014-197388

(51) Int. Cl.
*H01M 2/14* (2006.01)
*H01M 2/16* (2006.01)
(Continued)

(52) U.S. Cl.
CPC ......... *H01M 2/1686* (2013.01); *C08F 212/08* (2013.01); *C08F 220/14* (2013.01);
(Continued)

(58) Field of Classification Search
None
See application file for complete search history.

(56) References Cited

U.S. PATENT DOCUMENTS

2011/0159347 A1   6/2011   Shibano et al.
2012/0189897 A1   7/2012   Wakizaka et al.
(Continued)

FOREIGN PATENT DOCUMENTS

JP   2002-166218 A   6/2002
JP   2009-272055 A   11/2009
(Continued)

OTHER PUBLICATIONS

International Search Report issued in corresponding International Patent Application No. PCT/JP2015/056199 dated Apr. 14, 2015.
(Continued)

*Primary Examiner* — Lucas J. O'Donnell
(74) *Attorney, Agent, or Firm* — Morgan, Lewis & Bockius LLP

(57) ABSTRACT

A separator for electricity storage devices which comprises: a base comprising a porous film; and a thermoplastic polymer arranged on at least one surface of the base. The thermoplastic polymer has a dispersion ($\sigma^2$), defined by the following numerical equation using the areas (Si) of Voronoi polygons obtained by Voronoi tessellation, of 0.01-0.7. (In the equation, Si is the measured area of each Voronoi (Continued)

polygon, m is an average of the measured areas of the Voronoi polygons, and n is the total number of the Voronoi polygons).

22 Claims, 4 Drawing Sheets

(51) Int. Cl.
| | |
|---|---|
| *H01G 11/52* | (2013.01) |
| *C08F 212/08* | (2006.01) |
| *C08F 220/14* | (2006.01) |
| *C08F 220/18* | (2006.01) |
| *C08F 220/46* | (2006.01) |
| *C08K 3/04* | (2006.01) |
| *C08L 9/10* | (2006.01) |
| *C08L 23/06* | (2006.01) |
| *H01M 10/0525* | (2010.01) |
| *H01G 9/02* | (2006.01) |

(52) U.S. Cl.
CPC .......... *C08F 220/18* (2013.01); *C08F 220/46* (2013.01); *C08K 3/04* (2013.01); *C08L 9/10* (2013.01); *C08L 23/06* (2013.01); *H01G 11/52* (2013.01); *H01M 2/145* (2013.01); *H01M 2/16* (2013.01); *H01M 2/166* (2013.01); *H01M 2/1653* (2013.01); *H01M 10/0525* (2013.01); *C08F 2220/1841* (2013.01); *C08L 2203/20* (2013.01); *C08L 2205/025* (2013.01); *C08L 2205/03* (2013.01); *H01G 9/02* (2013.01); *Y02E 60/13* (2013.01)

(56) References Cited

U.S. PATENT DOCUMENTS

| | | |
|---|---|---|
| 2012/0202104 A1 | 8/2012 | Han et al. |
| 2013/0304434 A1 | 11/2013 | Miara et al. |
| 2014/0107275 A1* | 4/2014 | Uemura ................ H01M 4/628 524/503 |
| 2014/0227603 A1* | 8/2014 | Ogata ................... H01M 10/04 429/246 |
| 2014/0272523 A1 | 9/2014 | Otsuka et al. |
| 2014/0363726 A1* | 12/2014 | Honda ................ H01M 2/1653 429/145 |
| 2015/0188108 A1 | 7/2015 | Miyazawa et al. |
| 2015/0236323 A1* | 8/2015 | Honda ................ H01M 2/1653 429/144 |
| 2015/0333308 A1 | 11/2015 | Toyoda et al. |
| 2016/0359156 A1* | 12/2016 | Ohkubo ................ H01M 4/13 |

FOREIGN PATENT DOCUMENTS

| | | |
|---|---|---|
| JP | 2010-244875 A | 10/2010 |
| JP | 2012-164655 A | 8/2012 |
| JP | 2014-149936 A | 8/2014 |
| KR | 10-2014-0084187 A | 7/2014 |
| WO | 2009/096671 A2 | 8/2009 |
| WO | 2011/040562 A1 | 4/2011 |
| WO | 2012/099149 A1 | 7/2012 |
| WO | 2013/151144 A1 | 10/2013 |
| WO | 2014/017651 A1 | 1/2014 |

OTHER PUBLICATIONS

Supplementary European Search Report issued in corresponding European Patent Application No. 15844350.7 dated Nov. 13, 2017.
Supplementary Partial European Search Report issued in corresponding European Patent Application No. 15844350.7 dated Aug. 10, 2017.

* cited by examiner

SEPARATOR FOR ELECTRICITY STORAGE DEVICE

TECHNICAL FIELD

The present invention relates to a separator for an electricity storage device (hereinafter, sometimes simply referred to as "separator").

BACKGROUND ART

In recent years, development of a nonaqueous electrolyte battery, mainly a lithium ion battery, is being aggressively carried out. In a nonaqueous electrolyte battery, a microporous film (separator) is usually provided between positive and negative electrodes. The separator has a function of preventing direct contact between the positive and negative electrodes and passing an ion through an electrolytic solution held in micropores.

In order to enhance the cycle characteristics and safety of a nonaqueous electrolyte battery, improvement of a separator is studied. Recently, with the reduction in size and thickness of a portable appliance, reduction in size and thickness is also required of an electricity storage device such as a lithium ion secondary battery. On the other hand, in order to enable a portable appliance to be carried for a long period of time, an increase in the capacity of an electricity storage device by attempting to improve the volume energy density is being simultaneously persued.

Conventionally, the separator is required to have specific performance with regard to safety, such as the characteristics (fuse characteristics) of terminating a battery reaction immediately upon occurrence of abnormal heating, and property (short circuit characteristics) of maintaining shape even at high temperatures to prevent a direct reaction of a positive electrode material with a negative electrode material. In addition thereto, from the standpoint of making a charge-discharge current uniform and suppressing lithium dendrite formation, adhesiveness to an electrode is also required of the separator.

When the adhesiveness of the separator to a battery electrode is improved, a charge-discharge current is kept from becoming non-uniform and a lithium dendrite is less likely to precipitate, and as a result, the charge-discharge cycle life can be extended.

For example, in Patent Documents 1 and 2, it has been proposed to apply a slurry for a porous film onto an electrode or a separator and thereby bond/fix the separator to the electrode.

In Patent Documents 3 and 4, it has been proposed to further apply a polymer solution as a dot pattern layer onto a porous coating layer formed on a porous base material, thereby obtaining a separator, and bond/fix the dot pattern layer side of the separator to an electrode.

RELATED ART

Patent Document

Patent Document 1: International Publication No. 2011/040562
Patent Document 2: International Publication No. 2013/151144
Patent Document 3: International Publication No. 2009/096671
Patent Document 4: International Publication No. 2014/017651

SUMMARY OF THE INVENTION

Problems to be Solved by the Invention

However, in Patent Documents 1 and 2, a slurry which is to be applied to a porous film is applied onto an electrode or a separator causing polymer particles to crowd each other. Consequently, there arises a problem of reduction in the cycle characteristics of the battery.

In Patent Documents 2 and 3, a polymer solution is applied as a dot pattern layer causing, a pore of the base material corresponding to a portion coated with the polymer solution to be sealed, giving rise to a reduction in the cycle characteristics of the electricity storage device, similar to the above.

An object of the present invention is to provide a separator for an electricity storage device, ensuring that even when an electrode and a separator are bonded to each other through an organic coating film, the high-temperature storage characteristics can be enhanced without deteriorating the cycle characteristics of an electricity storage device and that the thickness of an electrode-separator bonded body can be reduced.

Means to Solve the Problems

The present inventors have made intensive studies to solve the problems above. As a result, it has been found that when a particulate thermoplastic polymer is applied onto a separator surface while adjusting the particulate thermoplastic polymer to a specific distribution or aggregation state at least in a partial region of the coating layer or coating surface, the above-described object can be attained. Specifically, the present inventors have found that the high-temperature storage characteristics of an electricity storage device can be enhanced by putting a separator surface into a state where the ionic resistance is uniform and convergence of lithium ion and generation of metallic lithium are suppressed; and when an appropriately aggregated particulate polymer is arranged on a separator surface, even if the particulate polymer layer is a thin film, sufficient adhesion can be established between an electrode and a separator. The present invention has been accomplished based on this finding.

The present invention is as follows.

[1] A separator for an electricity storage device, including a base material containing at least a porous film, and a thermoplastic polymer arranged on at least one surface of the base material, wherein
the thermoplastic polymer has a dispersion ($\sigma^2$) of 0.01 to 0.7 as defined by the following mathematical equation using the area (Si) of a Voronoi polygon obtained by Voronoi tessellation:

$$\sigma^2 = \sum_i \frac{\left(\frac{S_i}{m} - 1\right)^2}{n} \qquad \text{[Math. 1]}$$

(wherein Si is the measured area of a Voronoi polygon, m is an average value of the measured areas of Voronoi polygons, and n is the total number of Voronoi polygons).

[2] The separator for an electricity storage device according to [1], wherein the dispersion ($\sigma^2$) is from 0.01 to 0.6.

[3] The separator for an electricity storage device according to [1], wherein the dispersion ($\sigma^2$) is from 0.01 to 0.5.

[4] The separator for an electricity storage device according to any one of [1] to [3], wherein the thermoplastic polymer is particulate.

[5] The separator for an electricity storage device according to any one of [1] to [4], wherein the average particle diameter of the thermoplastic polymer is from 10 to 2,000 nm.

[6] The separator for an electricity storage device according to any one of [1] to [4], wherein the average particle diameter of the thermoplastic polymer is from 50 to 1,500 nm.

[7] The separator for an electricity storage device according to any one of [1] to [4], wherein the average particle diameter of the thermoplastic polymer is from 100 to 1,000 nm.

[8] The separator for an electricity storage device according to any one of [1] to [4], wherein the average particle diameter of the thermoplastic polymer is from 130 to 800 nm.

[9] The separator for an electricity storage device according to any one of [1] to [8], wherein the area density of the thermoplastic polymer is from 30 to 80%.

[10] The separator for an electricity storage device according to any one of [1] to [9], wherein the thermoplastic polymer is present substantially without overlapping.

[11] The separator for an electricity storage device according to any one of [1] to [10], wherein the ratio of an infrared absorption peak intensity at a wavelength of 1,720 to 1,750 $cm^{-1}$ to an infrared absorption peak intensity as a wavelength of 740 to 770 $cm^{-1}$, of the thermoplastic polymer, is from 1 to 18.

[12] The separator for an electricity storage device according to any one of [1] to [10], wherein the ratio of an infrared absorption peak intensity at a wavelength of 2,220 to 2,260 $cm^{-1}$ to an infrared absorption peak intensity as a wavelength of 1,720 to 1,750 $cm^{-1}$, of the thermoplastic polymer, is from 0.001 to 0.320.

[13] The separator for an electricity storage device according to any one of [1] to [10], wherein the thermoplastic polymer contains at least one member selected from the group consisting of the following (1) to (3):

(1) a copolymer having a (meth)acrylic acid ester as a monomer unit (with a proviso excluding the following copolymer (2) and copolymer (3)), (2) a copolymer having a cyano group-containing monomer and a (meth)acrylic acid ester monomer as monomer units, and (3) a copolymer having an aromatic vinyl compound and a (meth)acrylic acid ester monomer as monomer units.

[14] The separator for an electricity storage device according to [13], wherein the cyano group-containing monomer is (meth)acrylonitrile.

[15] The separator for an electricity storage device according to [13], wherein the aromatic vinyl compound is styrene.

[16] An electricity storage device having mounted therein the separator for an electricity storage device according to any one of [1] to [15].

[17] A method for producing a separator for an electricity storage device, including:

a step of adjusting the viscosity of a solution containing the thermoplastic polymer to 20 mPa·s or more, and a step of coating a base material containing a porous film with the prepared thermoplastic polymer solution while applying a shear force.

[18] The separator for an electricity storage device according to [1], wherein the dispersion ($\sigma^2$) is calculated from an image captured by photographing the thermoplastic polymer arranged on the base material by a scanning electron microscope at a magnification of 10,000 times.

[19] The separator for an electricity storage device according to [18], wherein the dispersion ((C) is defined as an average value of 95 dispersions ((9) calculated respectively in measurement visual fields set as follows:

i) each measurement visual field: an image captured by a scanning electron microscope, ii) method for setting the visual field:

a) an initial visual field is set, b) 19 visual fields consisting of 9 visual fields composed of regions sequentially adjoining the initial visual field in the transverse direction, 9 visual fields composed of regions sequentially adjoining in the longitudinal direction, and the starting-point visual field are set, c) a region defined by the 19 visual fields is set as a initial section, d) 4 sections composed of regions sequentially adjoining the starting-point section in the uniaxial direction at intervals of 10 mm are set, e) in each of the 4 sections, 19 visual fields are set at positions similar to those of 19 visual fields in the initial section, and f) a total of 95 visual fields (19 visual fields×5 sections) in the 4 sections and the initial section are set as the measurement visual field.

[20] The separator for an electricity storage device according to [19], wherein each of the measurement visual fields is a captured image taken at a magnification set such that the number of thermoplastic polymer particles observed in one visual field is from 80 to 200.

Effects of the Invention

According to the present invention, the adhesion between a separator and an electrode can be increased, the high-temperature storage characteristics and cycle characteristics of an electricity storage device can be enhanced, and thickness reduction of an electrode-separator bonded body can be achieved.

MODE FOR CARRYING OUT THE INVENTION

Figure 1:
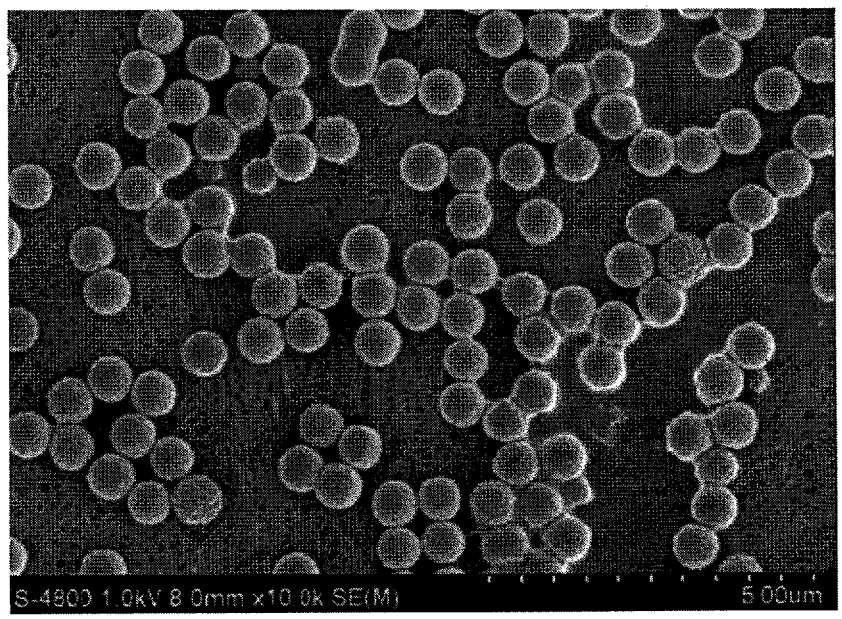
FIG. 1 illustrates one example of the photograph taken by observing a surface of the polymer layer.

The mode for carrying out the present invention (hereinafter, simply referred to as "this embodiment") is described in detail below. The present invention is not limited to the following embodiment and can be carried out by making various modifications within the scope of the gist thereof.

The separator for an electricity storage device of the present invention is described.

The separator for an electricity storage device of the present invention includes a base material containing at least a porous film, and a thermoplastic polymer arranged on at least one surface of the base material. In this separator, the dispersion ($\sigma^2$) of areas ($s_i$) of Voronoi polygons obtained by applying Voronoi tessellation to the thermoplastic polymer is from 0.01 to 0.7. The thermoplastic polymer is preferably particulate. The area density of the particulate thermoplastic polymer is preferably from 30 to 80%.

Each constitution according to the separator for an electricity storage device of the present invention is described below.

[Polymer Layer]

The layer containing a thermoplastic polymer (polymer layer) is described.

The polymer layer is formed on at least one surface of a porous film or a porous film containing an inorganic filler and a resin binder in at least one surface (these porous films are sometimes collectively referred to as "base material"). The polymer layer may be sufficient if it is formed at least in a partial region on at least one surface of the base material.

The polymer layer can provide adhesion between an electrode and the separator through a heat pressing step. In other words, the polymer layer can function as an adhesive layer.

The loading amount of the polymer layer relative to the base material is, in terms of solid content, preferably from 0.05 to 1.50 g/m², more preferably from 0.07 to 1.00 g/m², still more preferably from 0.10 to 0.70 g/m². In view of the fact that in the separator obtained, an effect of increasing the adhesive force of the polymer layer to the base material while suppressing reduction in the cycle characteristics (permeability) due to closure of pores of the base material is enhanced, it is preferable to restrict the loading amount of the polymer layer relative to the base material to the range of 0.05 to 1.50 g/m².

The loading amount of the polymer layer relative to the base material can be adjusted, for example, by changing the thermoplastic polymer content in a coating solution or the amount of a thermoplastic polymer solution applied. However, the method for adjusting the loading amount is not limited to the above.

The polymer layer is preferably present on a surface of the base material at a surface coverage of 80% or less relative to the surface area per one surface of the base material and is more preferably present on a surface of the base material at a surface coverage of 70% or less, still more preferably 60% or less. The polymer layer is preferably present on a surface of the base material at a surface coverage of 5% or more. The surface coverage of the polymer layer is preferably 80% or less in an attempt to further prevent a pore of the base material from being clogged by the thermoplastic polymer, thus enhancing the permeability of the separator.

On the other hand, the surface coverage is preferably 5% or more in order to increase the adhesion to an electrode.

The surface coverage of the polymer layer can be adjusted, for example, in the later-described production method of the separator, by changing the thermoplastic polymer content in a coating solution applied onto the base material, the amount of the coating solution applied, and the coating method and coating conditions. However, the method for adjusting the surface coverage is not limited thereto.

The average thickness of the polymer layer is not particularly limited but is preferably 2.0 μm or less, more preferably 1.0 μm or less, still more preferably 0.5 μm or less. The average thickness of the polymer layer is preferably 2.0 μm or less to facilitate suppressing a reduction in the permeability due to the polymer layer and at the time of storing the separator in the form of a roll, effectively preventing adhesion between polymer layers or between the polymer layer and the base material. The average thickness of the polymer layer can be adjusted, for example, by changing the thermoplastic polymer content in a coating solution applied onto the base material, the amount of the coating solution applied, and the coating method and coating conditions. However, the method for adjusting the surface thickness of the polymer layer is not limited thereto.

The thermoplastic polymer in the polymer layer preferably contains a particulate thermoplastic polymer, and it is more preferred that all of the thermoplastic polymer are a particulate thermoplastic polymer.

In the separator for an electricity storage device according to this embodiment, the area density of the particulate thermoplastic polymer is preferably from 30 to 80%.

The area density of the particulate thermoplastic polymer indicates a value calculated by the following equation:

area density (%)=100×(sum of projected areas of all of particulate thermoplastic polymer/projected area of separator surface), in a specific visual field at the time of observing the separator surface. When the area density is 30% or more, the adhesion between the separator and an electrode tends to be excellent. When the area density is 80% or less, there is a tendency that the electricity storage device is excellent in the cycle characteristics and an electrode-separator bonded body can be made thin. The area density of the particulate thermoplastic polymer is more preferably from 30 to 70%, still more preferably from 30 to 65%.

In the separator for an electricity storage device according to this embodiment, the dispersion ($\sigma^2$) of areas ($s_i$) of Voronoi polygons obtained by applying Voronoi tessellation to the thermoplastic polymer is from 0.01 to 0.7. The thermoplastic polymer as used herein is preferably particulate.

The Voronoi tessellation is to carry out regional division by determining, with respect to a plurality of points (generatrices) arranged at arbitrary positions on a certain metric space, to which generatrix another point on the same space is the closest. The diagram including the thus-obtained regions is called a Voronoi diagram. Generally, in the Voronoi diagram, the boundary line of a plurality of regions defines part of a bisector between respective generatrices and each region forms a polygon (Voronoi polygon).

At the time of observation of the separator surface in a specific visual region, one thermoplastic polymer particle in the observation visual region is regarded as one circle having an average diameter (l). Perpendicular bisectors are respectively drawn between a plurality of adjacent thermoplastic polymer particles, and with respect to each particle, a polygon surrounded by perpendicular bisectors is referred to as "Voronoi polygon".

The dispersion ($\sigma^2$) of areas ($s_i$) of Voronoi polygons is calculated from the following equation:

$$\sigma^2 = \sum_i \frac{\left(\frac{s_i}{m} - 1\right)^2}{n} \quad [\text{Math. 2}]$$

{wherein $s_i$ is the measured area of a Voronoi polygon, m is an average value of the measured areas of Voronoi polygons, and n is the total number of Voronoi polygons}. A region that is not closed when carrying out Voronoi tessellation in the observation visual field is excluded from the calculation of the equation above. The region that is not closed includes, for example, a region obtained by applying Voronoi tessellation to a particle which is present in the boundary of the observation visual field and hidden from observation of a complete particle.

Accordingly, in an image obtained by photographing at least a partial region of the separator surface, regarding a particle located at the edge of the image, it is preferable to confirm whether the particle is entirely observed or not.

In this embodiment, the dispersion ($\sigma^2$) of areas ($s_i$) of Voronoi polygons is an indicator of the level of variation in placement of the particulate thermoplastic polymer on the base material. The dispersion ($\sigma^2$) is thought to represent the distribution or aggregation state of the particulate thermoplastic polymer in the coating surface. When the dispersion ($\sigma^2$) of areas ($s_i$) of Voronoi polygons is 0.01 or more, the particulate thermoplastic polymer can be rated as being arranged on the separator surface by appropriately undergoing aggregation. Accordingly, in this case, the adhesion between an electrode and the separator tends to be sufficient. When the dispersion ($\sigma^2$) is 0.7 or less, the particulate thermoplastic polymer can be rated as not being excessively aggregated on the separator surface. Accordingly, in this case, the ionic resistance on the separator surface is uniformized and since generation of metallic lithium is suppressed by preventing lithium ion from converging in a specific region of the surface, the electricity storage device tends to be excellent in the high-temperature storage characteristics. The value of the dispersion ($\sigma^2$) is preferably from 0.01 to 0.6, more preferably from 0.01 to 0.5, still more preferably from 0.1 to 0.4, yet still more preferably from 0.1 to 0.35.

The average particle diameter of the particulate thermoplastic polymer is preferably from 10 to 2,000 nm, more preferably from 50 to 1,500 nm, still more preferably from 100 to 1,000 nm, yet still more preferably from 130 to 800 nm, even yet still more preferably from 150 to 800 nm, and most preferably from 200 to 750 nm. Setting the average particle diameter to 10 nm or more means that when the particulate thermoplastic polymer is applied onto a base material containing at least a porous film, it is ensured that the particulate thermoplastic polymer has a dimension great enough to prevent entering into a pore of the base material. Accordingly, this range is preferred with regard to enhancing the adhesion between an electrode and the separator and the cycle characteristics of an electricity storage device. Setting the average particle diameter to 2,000 nm or less is preferred with regard to coating the base material with the particulate thermoplastic polymer in an amount necessary to satisfy both the adhesion between an electrode and the separator and the cycle characteristics of an electricity storage device. The average particle diameter of the particulate thermoplastic polymer can be measured in conformity with the method described later in Examples.

For learning the area density of the particulate thermoplastic polymer (hereinafter, sometimes referred to as "thermoplastic polymer particle") and the dispersion ($\sigma^2$) of areas ($s_i$) of Voronoi polygons obtained by applying Voronoi tessellation to the thermoplastic polymer particle, the separator surface is observed. The observation means is appropriately selected according to the dimension or distribution state of the thermoplastic polymer particle applied onto the separator, and an arbitrary method can be employed. For example, an electron microscope, an atomic force microscope, an optical microscope, and a differential interference microscope can be used. Among these, in the case of observing the distribution state of dispersed particles as in this embodiment, an electron microscope or an atomic force microscope is suitably used.

In the observation visual field, an average visual field of the polymer layer applied onto the separator surface should be ensured. The projected area in the observation visual field should be appropriately adjusted so that an average distribution state of dispersed particles can be grasped. For example, the number of dispersed particles adopted as the calculation is preferably from about 80 to 200 particles/visual field. The observation visual field can be obtained by observing the polymer layer by employing preset observation means and magnification. For example, FIG. 1 is one example of a photograph taken by observing the surface of the polymer layer and employing a scanning electron microscope as the observation means and 10,000 times as the magnification. FIG. 1 clearly displays a state where thermoplastic polymer particles having a particle diameter of about 500 nm are present by dispersing on the surface of the polymer layer. By thus grasping a state where thermoplastic polymer particles are dispersed on the surface of the polymer layer, the dispersion state of thermoplastic polymer particles can be analyzed by Voronoi tessellation.

In the observation using a scanning electron microscope, a magnification suitable for the analysis by Voronoi tessellation is set according to the particle diameter of the thermoplastic polymer particle. Specifically, the magnification is set so that the number of thermoplastic polymer particles observed in one visual field can be preferably from 40 to 300, more preferably from 60 to 240, still more preferably from 80 to 200. At this setting, the analysis by Voronoi tessellation can be appropriately carried out. For example, it is appropriate for the analysis by Voronoi tessellation to set the magnification to 10,000 times when the particle diameter is about 500 nm, and set the magnification to about 30,000 times when the particle diameter is about 200 nm.

Figure 2:
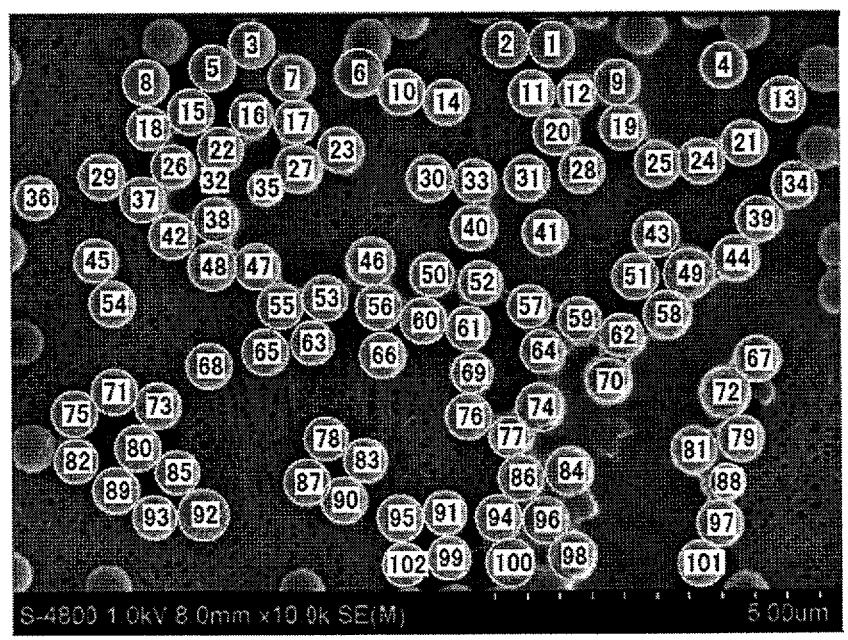
FIG. 2 illustrates one example of the result from automatically specifying the thermoplastic polymer included in the observation visual field of FIG. 1 by using an image processing software.

The thermoplastic polymer particles included in the observation visual field obtained by the observation method above are identified. For example, the thermoplastic polymer particles are identified from the observation visual field with the naked eye or by means of an image processing software. FIG. 2 is one example of the result from automatically specifying the thermoplastic polymer particles included in the observation visual field of FIG. 1 by using an image processing software. By specifying the thermoplastic polymer particles in the observation visual field obtained according to the preset method and magnification, the total number of particles, the diameter of each particle, and the projected area of each particle are calculated (see, FIG. 3 described later). In this case, it is preferable to specify only a particle that is completely included in the observation visual field.

With respect to the thermoplastic polymer particles specified in the specific observation visual field of the separator surface, the above-defined Voronoi tessellation can be carried out. Specifically, the coated film surface after applying the thermoplastic polymer onto the separator surface is photographed to obtain an image. In the obtained image, Voronoi tessellation is carried out by regarding the specified thermoplastic particle as a circle having an average diameter (l (el)), whereby Voronoi polygons can be rendered. For example, a Voronoi polygon may be rendered manually or by means of an image processing software. The area of the rendered Voronoi polygon is then calculated.

Figure 3:
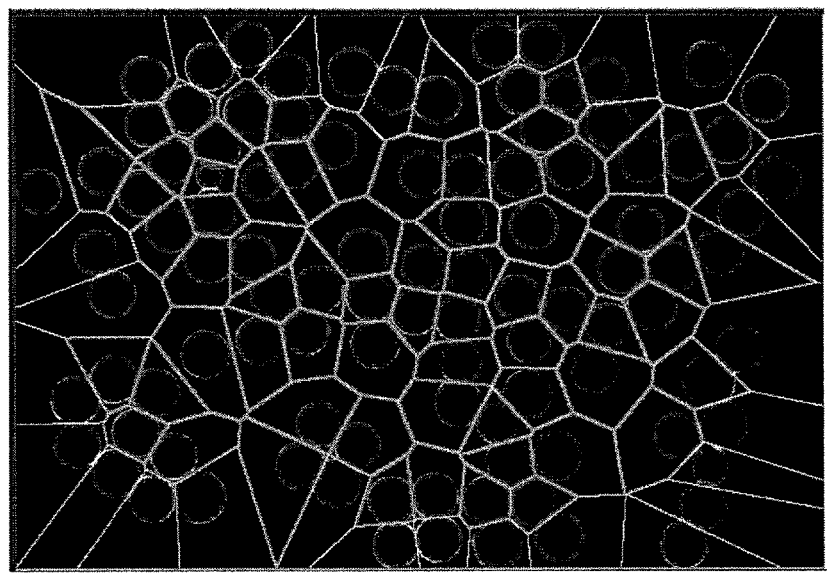
FIG. 3 illustrates one example of the result from obtaining Voronoi polygons by applying Voronoi tessellation to a plurality of particles specified in FIG. 2.
Figure 4:
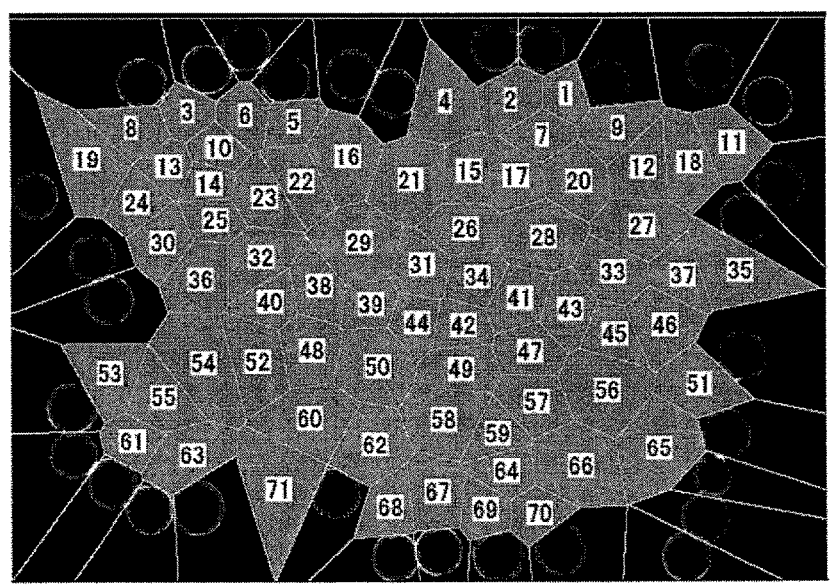
FIG. 4 illustrates one example of the result from automatically calculating the area of a Voronoi polygon obtained in FIG. 3 by using an image processing software.

For example, FIG. 3 is one example of the result from obtaining Voronoi polygons by applying Voronoi tessellation to a plurality of thermoplastic particles specified in FIG. 2. FIG. 4 illustrates the result from automatically calculating the number and areas of Voronoi polygons corresponding to closed regions out of the Voronoi polygons depicted in FIG. 3.

The projected area in the observation visual field is determined by the above-described observation method and image processing method, and the total number of thermoplastic polymer particles in the visual field, the projected areas, and the areas of Voronoi polygons are obtained. With respect to the thermoplastic polymer particles in the visual field, the area density and the dispersion ($\sigma^2$) of areas ($s_i$) of Voronoi polygons can be calculated according to the definitions above.

However, the distribution of thermoplastic polymer particles may change depending on the observation visual field. For this reason, as to each of the area density and the dispersion ($\sigma^2$), an average of values calculated for a plurality of observation visual fields is preferably employed. The number of visual fields is preferably 3 or more.

It is particularly preferable to employ an average of values calculated for 95 visual fields determined as follows:
  i) each measurement visual field: an image captured by a scanning electron microscope,
  ii) method for setting the visual field:
  a) an initial visual field is set,
  b) 19 visual fields consisting of 9 visual fields composed of regions sequentially adjoining the initial visual field in the transverse direction, 9 visual fields composed of regions sequentially adjoining in the longitudinal direction, and the initial visual field are set,
  c) a region defined by the 19 visual fields is set as an initial section,
  d) 4 sections composed of regions sequentially adjoining the initial section in the uniaxial direction at intervals of 10 mm are set,
  e) in each of the 4 sections, 19 visual fields are set at positions similar to those of 19 visual fields in the initial section, and
  f) a total of 95 visual fields (19 visual fields×5 sections) in the 4 sections and the initial section are set as the measurement visual field.

Each of the measurement visual fields is preferably a captured image taken at a magnification set such that the number of thermoplastic polymer particles observed in one visual field is from 80 to 200.

Figure 5:
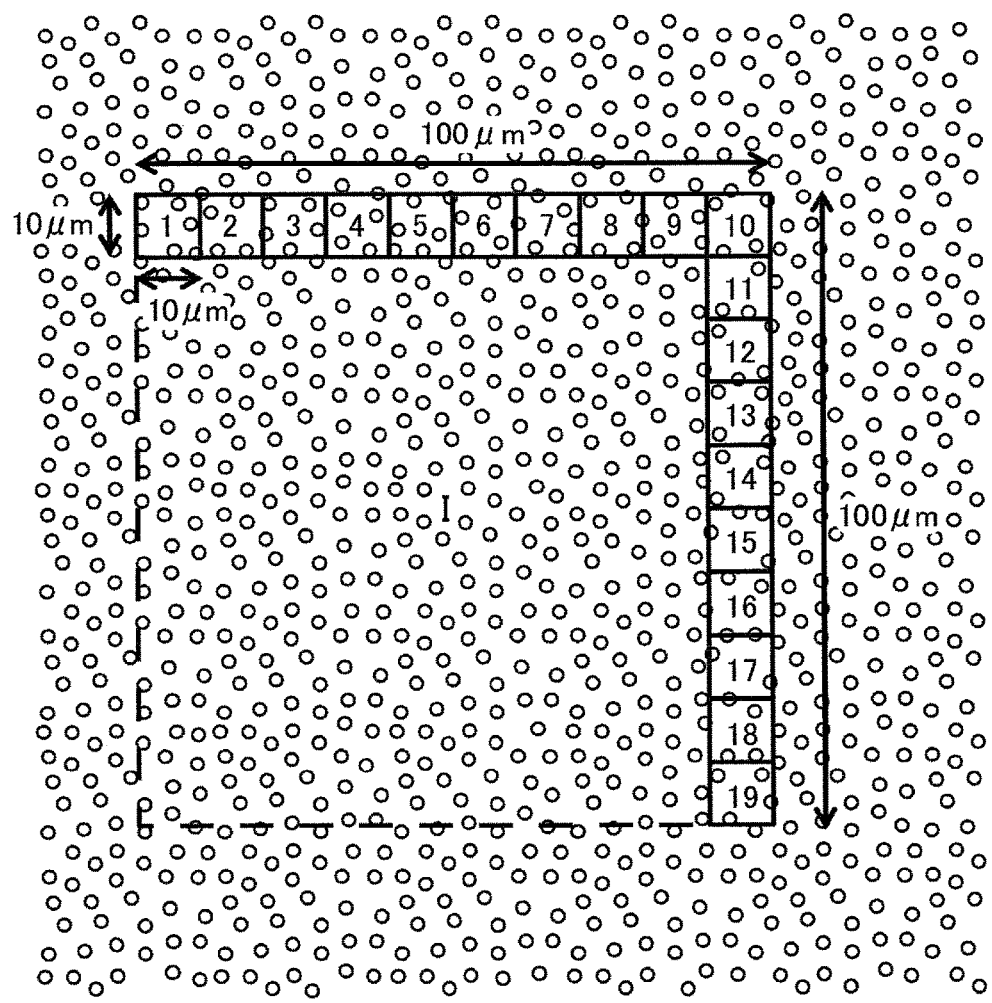
FIG. 5 illustrates one example of the method for setting one section consisting of 19 visual fields out of 95 visual fields in which thermoplastic polymer particles arranged on a separator are observed.

A preferable method for setting 95 visual fields in this embodiment is described below by referring to the drawings.
  i) As the captured image, an image captured by a scanning electron microscope at a magnification of 10,000 times is preferably employed as described above. Such image is, for example, depicted in FIG. 5. FIG. 5 is a model view illustrating part of an image of thermoplastic polymer particles on a base material, captured by a scanning electron microscope at a magnification of 10,000 times.

In the image of FIG. 5, first, an initial visual field (10) is set. Since one visual field is composed of an image captured by a scanning electron microscope at a magnification of 10,000 times, the scale of one visual field is about 10 μm×10 μm, and a visual field suitable for Voronoi tessellation evaluation based on the thermoplastic polymer particle is created. Nine visual fields (1 to 9) sequentially adjoining the initial visual field (10) in the vertical direction (X-axis direction) are then set. These visual fields (1 to 9) are each composed of a captured image at the same magnification as the initial visual field (10) and sequentially set in one direction by sharing one side with the adjacent region. Nine visual fields (11 to 19) sequentially adjoining the initial visual field (10) in the longitudinal direction are set. These visual fields (11 to 19) are each composed of the same region as that of the initial visual field (10) and sequentially set in one direction by sharing one side with the adjacent region.

A region defined by those 19 visual fields is set as an initial section (I). Since the initial section (I) is composed of a square region with two sides being defined respectively by top sides of visual fields 1 to 10 in FIG. 5 and right sides of visual fields 10 to 19, one section has a scale of about 100 μm×100 μm and corresponds to an image captured by a scanning electron microscope at a magnification of 1,000 times, and the dispersion calculated from 19 visual fields constituting the section (I) can be evaluated as a value more accurately representing the state of the separator surface.

Figure 6:
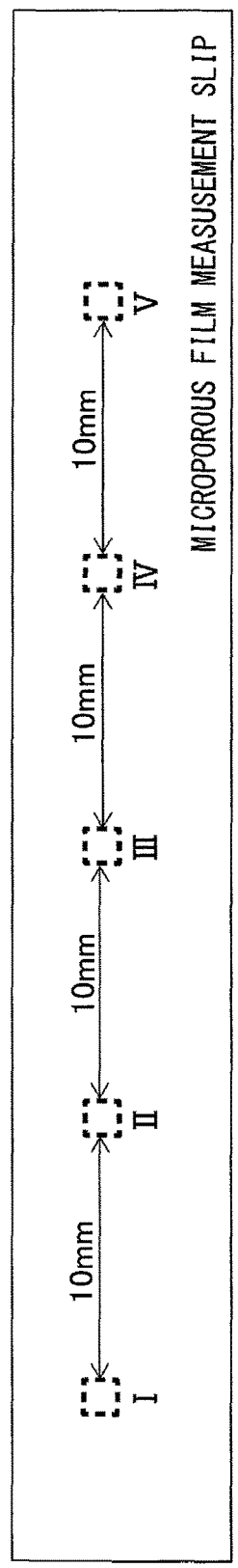
FIG. 6 illustrates one example of the method for setting 5 sections including 95 visual fields in which thermoplastic polymer particles arranged on a separator are observed.

In this embodiment, for correctly evaluating the state of the separator surface, the evaluation is further carried out by providing 5 sections each equivalent to the above-described section. Specifically, refer to FIG. 6. FIG. 6 is an overall view of the image of thermoplastic polymer particles on the base material depicted in FIG. 5. In FIG. 6, 4 sections (II to V) sequentially adjoining the initial section (I) in the uniaxial direction at intervals of 10 mm are set. Each of these 4 sections is composed of the same region as in the initial section (I).

In each of these 4 sections (II to V), 19 visual fields are set at positions similar to those of 19 visual fields in the initial section (I). A total of 95 visual fields (19 visual fields×5 sections) in the 4 sections (II-V) and the starting-point section (I) are set as the measurement visual field of the thermoplastic polymer particle on the base material.

Observation of the separator surface is preferably carried out, on a region not participating in ionic conduction. For example, the observation can be carried out on a separator immediately after production, and not yet being incorporated into an electricity storage device. In the case where an electricity storage device is in use or after use, it is preferred to observe a so-called "ear" portion (a region locating in the vicinity of the outer edge of the separator not participating in ionic conduction).

As understood from the evaluation method above, in the case where the observation target includes 95 visual fields, since the measurement target is a separator strip having a length of about 40 mm, the dispersion state of the thermoplastic polymer in the separator surface can be correctly evaluated.

The above-described Voronoi tessellation can be carried out on thermoplastic polymer particles, this indicates that in the polymer layer formed on a base material, the thermoplastic polymer particles are present as a single layer of particles substantially without overlapping. For example, in the case where the thermoplastic polymer is overlapped with each other in many layers in the polymer layer, the concept of area occupied by a single particle is not established and therefore, Voronoi tessellation cannot be carried out.

In the separator of this embodiment, after the thermoplastic polymer particles in the polymer layer formed on a base material are arranged so as to substantially eliminate overlap with one another, each of the area density and the dispersion ($\sigma^2$) is preferably adjusted to the range above.

The methods for adjusting the area density and dispersion ($\sigma^2$) of the thermoplastic polymer to the above-described ranges are not particularly limited, but these can be adjusted, for example, by changing the thermoplastic polymer content in the coating solution applied onto a base material, the amount of the coating solution applied, and the coating method and coating conditions. More specifically, the thermoplastic polymer solution is adjusted to a high viscosity and applied onto a surface of a porous film while applying a shear force, whereby the thermoplastic polymer can be arranged by dispersion in the above-described range.

The polymer layer on the base material is not particularly limited in its form (pattern) but is preferably present such that the thermoplastic polymer particles are mutually dispersed over the entire surface of the base material to satisfy the dispersion above. The thermoplastic polymer particles may form a cluster in a partial region, but each particle must be dispersed to the extent of satisfying the range of dispersion above as a whole. In the partial region, a polymer particle may be stacked on top of another, but each particle must be dispersed to the extent of satisfying the range of dispersion above as a whole.

In the case where the polymer layer is present in a pattern on a base material, each of the area density and the dispersion ($\sigma^2$) is preferably evaluated using an image captured by photographing a region where the polymer layer is present.

Specific examples of the thermoplastic polymer contained in the polymer layer include the following 1) to 4):

1) a conjugated diene-based polymer,
2) an acrylic polymer
3) a polyvinyl alcohol-based resin, and
4) a fluorine-containing resin.

Among others, in view of compatibility with an electrode, 1) the conjugated diene-based polymer is preferred, and in view of withstand voltage property, 2) the acrylic polymer and 4) the fluorine-containing resin are preferred.

The polymer layer contains the thermoplastic polymer in an amount of preferably 60 mass % or more, more preferably 90 mass- or more, still more preferably 95 mass % or more, yet still more preferably 98 mass % or more, relative to the total amount of the polymer layer.

The polymer layer may contain other components to an extent of not hindering the attainment of the object of the present invention, in addition to the thermoplastic polymer.

The 1) conjugated diene-based polymer is a polymer containing a conjugated diene compound as a monomer unit. The conjugated diene compound includes, for example, 1,3-butadiene, 2-methyl-1,3-pentadiene, 2,3-dimethyl-1,3-butadiene, 2-chloro-1,3-butadiene, substituted linear conjugated pentadienes, and substituted and side-chain conjugated hexadienes. One of these may be used alone, or two or more thereof may be used in combination. Among others, 1,3-butadiene is particularly preferred.

The conjugated diene-based polymer may also contain the later-described (meth)acrylic compound or other monomers as a monomer unit. Specifically, the conjugated diene-based polymer may include, for example, a styrene-butadiene copolymer and a hydride thereof, an acrylonitrile-butadiene copolymer and a hydride thereof, and an acrylonitrile-butadiene-styrene copolymer and a hydride thereof.

The 2) acrylic polymer is a polymer containing a (meth)acrylic compound as a monomer unit. The (meth)acrylic compound indicates at least one member selected from the group consisting of a (meth)acrylic acid and a (meth)acrylic acid ester.

Such a compound includes, for example, a compound represented by the following formula (P1):

$$CH_2=CR^{Y1}-COO-R^{Y2} \qquad (P1)$$

In formula (P1), $R^{Y1}$ represents a hydrogen atom or a methyl group, and $R^{Y2}$ represents a hydrogen atom or a monovalent hydrocarbon group. In the case where $R^{Y2}$ is a monovalent hydrocarbon group, the group may have a substituent and may have a heteroatom in the chain. The monovalent hydrocarbon group includes, for example, a chain alkyl group that may be linear or branched, a cycloalkyl group, and an aryl group. The substituent includes, for example, a hydroxyl group and a phenyl group, and the heteroatom includes, for example, a halogen atom and an oxygen atom. As the (meth)acrylic compound, one compound is used alone, or two or more compounds are used in combination.

The (meth)acrylic compound includes, for example, a (meth)acrylic acid, a chain alkyl (meth)acrylate, a cycloalkyl (meth)acrylate, a hydroxyl group-containing (meth)acrylate, and a phenyl group-containing (meth)acrylate.

The chain alkyl group as one member of $R^{Y2}$ includes, more specifically, a chain alkyl having 1 to 3 carbon atoms, such as methyl group, ethyl group, n-propyl group and isopropyl group; and a chain alkyl group having 4 or more carbon atoms, such as n-butyl group, isobutyl group, tert-butyl group, n-hexyl group, 2-ethylhexyl group and lauryl group. The aryl group as one member of $R^{Y2}$ includes, for example, a phenyl group.

Specific examples of the (meth)acrylic acid ester monomer having this $R^{Y2}$ include a (meth)acrylate having a chain alkyl group, such as methyl acrylate, ethyl acrylate, propyl acrylate, isopropyl acrylate, butyl acrylate, isobutyl acrylate, tert-butyl acrylate, n-hexyl acrylate, 2-ethylhexyl acrylate, lauryl acrylate, methyl methacrylate, ethyl methacrylate, propyl methacrylate, isopropyl methacrylate, butyl methacrylate, isobutyl methacrylate, tert-butyl methacrylate, n-hexyl methacrylate, 2-ethylhexyl methacrylate and lauryl methacrylate; and a (meth)acrylate having an aromatic ring, such as phenyl (meth)acrylate and benzyl (meth)acrylate.

Among these, with regard to enhancing the adhesiveness to an electrode (electrode active material), a monomer containing a chain alkyl group having 4 or more carbon atoms, more specifically, a (meth)acrylic acid ester monomer when $R^{Y2}$ is a chain alkyl group having 4 or more carbon atoms, is preferred. More specifically, at least one member selected from the group consisting of butyl acrylate, butyl methacrylate, and 2-ethylhexyl acrylate is preferred. The upper limit of the number of carbon atoms in the chain alkyl group having 4 or more carbon atoms is not particularly limited and may be, for example, 14 but is preferably 7. One of these (meth)acrylic acid ester monomers is used alone, or two or more thereof are used in combination.

It is also preferable for the (meth)acrylic acid ester monomer to contain a monomer having a cycloalkyl group as $R^{Y2}$, in place of or in addition to the monomer containing a chain alkyl group having 4 or more carbon atoms. The adhesiveness to an electrode is enhanced by this configuration.

The cycloalkyl group-containing monomer includes more specifically, for example, cyclohexyl (meth)acrylate, isobornyl (meth)acrylate, and adamantyl (meth)acrylate. The number of carbon atoms constituting the alicyclic ring of the cycloalkyl group is preferably from 4 to 8, more preferably 6 or 7, still more preferably 6. The cycloalkyl group may or may not have a substituent. The substituent includes, for example, a methyl group and a tert-butyl group. Among the monomers above, at least one member selected from cyclohexyl acrylate and cyclohexyl methacrylate is preferred in that the polymerization stability at the time of preparation of an acrylic polymer is good. One of these is used alone, or two or more thereof are used in combination.

The acrylic polymer preferably contains a crosslinking monomer as a (meth)acrylic acid ester monomer, in place of or in addition to, preferably in addition to, the monomer above. The crosslinking monomer is not particularly limited but includes, for example, a monomer having two or more radical polymerizable double bonds, and a monomer having a functional group that provides a self-crosslinked structure during polymerization or after polymerization. One of these is used alone, or two or more thereof are used in combination.

The monomer having two or more radical polymerizable double bonds includes, for example, divinylbenzene and a polyfunctional (meth)acrylate. The polyfunctional (meth) acrylate may be at least one member selected from the group consisting of a bifunctional (meth)acrylate, a trifunctional (meth)acrylate, and a tetrafunctional (meth)acrylate. Specific examples thereof include polyoxyethylene diacrylate, polyoxyethylene dimethacrylate, polyoxypropylene diacrylate, polyoxypropylene dimethacrylate, neopentyl glycol diacrylate, neopentyl glycol dimethacrylate, butanediol diacrylate, butanediol dimethacrylate, trimethylolpropane triacrylate, trimethylolpropane trimethacrylate, pentaerythritol tetraacrylate, and pentaerythritol tetramethacrylate. One of these is used alone, or two or more thereof are used in combination. Among these, as above, at least one member selected from the group consisting of trimethylolpropane triacrylate and trimethylolpropane trimethacrylate is preferred.

The monomer having a functional group that provides a self-crosslinked structure during polymerization or after polymerization includes, for example, an epoxy group-containing monomer, a methylol group-containing monomer, an alkoxymethyl group-containing monomer, and a hydrolyzable silyl group-containing monomer. The epoxy group-containing monomer is preferably an ethylenically unsaturated monomer having an alkoxymethyl group and specifically includes, for example, glycidyl (meth)acrylate, 2,3-epoxycyclohexyl (meth)acrylate, 3,4-epoxycyclohexyl (meth)acrylate, and allyl glycidyl ether.

The methylol group-containing monomer includes, for example, N-methylolacrylamide, N-methylolmethacrylamide, dimethylolacrylamide, and dimethylolmethacrylamide.

The alkoxymethyl group-containing monomer is preferably an ethylenically unsaturated monomer having an alkoxymethyl group and specifically includes, for example, N-methoxymethylacrylamide, N-methoxymethylmethacrylamide, N-butoxymethylacrylamide, and N-butoxymethylmethacrylamide.

The hydrolyzable silyl group-containing monomer includes, for example, vinylsilane, γ-acryloxypropyltrimethoxysilane, γ-acryloxypropyltriethoxysilane, γ-methacryloxypropyltrimethoxysilane, and γ-methacryloxypropyltriethoxysilane.

One of these is used alone, or two or more thereof are used in combination.

The acrylic polymer may further have a monomer other than those described above as a monomer unit for improving various qualities and physical properties. Such a monomer includes, for example, a carboxyl group-containing monomer (with a proviso excluding (meth)acrylic acid), an amide group-containing monomer, a cyano group-containing monomer, a hydroxyl group-containing monomer, and an aromatic vinyl monomer.

Various vinyl monomers having a functional group such as sulfonic acid group and phosphoric acid group, as well as, for example, vinyl acetate, vinyl propionate, vinyl versatate, vinylpyrrolidone, methyl vinyl ketone, butadiene, ethylene, propylene, vinyl chloride, and vinylidene chloride can also be used, if desired.

One of these is used alone, or two or more thereof are used in combination. The above-described other monomer may be a monomer belonging to two or more classifications of respective monomers above.

The amide group-containing monomer includes, for example, (meth)acrylamide.

The cyano group-containing monomer is preferably an ethylenically unsaturated monomer having a cyano group, and specifically, examples thereof include (meth)acrylonitrile.

The hydroxy group-containing monomer includes, for example, 2-hydroxyethyl (meth)acrylate.

The aromatic vinyl monomer includes, for example, styrene, vinyltoluene, and α-methylstyrene, with styrene being preferred.

The ratio of the (meth)acrylic compound contained as a monomer unit in the acrylic polymer is preferably from 5 to 95 mass % per 100 mass % of the acrylic polymer. The lower limit value thereof is more preferably 15 mass %, still more preferably 20 mass %, yet still more preferably 30 mass %. When the content ratio of the above-described monomer unit is 5 mass % or more, this is preferred in view of bindability to a base material and oxidation resistance. On the other hand, the upper limit value is more preferably 92 mass %, still more preferably 80 mass %, yet still more preferably 60 mass %. When the content ratio of the monomer is 95 mass % or less, the adhesiveness to a base material is advantageously enhanced.

In the case where the acrylic polymer contains a chain alkyl (meth)acrylate or a cycloalkyl (meth)acrylate as a monomer unit, the total content ratio thereof is preferably from 3 to 92 mass %, more preferably from 10 to 90 mass %, still more preferably from 15 to 75 mass %, yet still more preferably from 25 to 55 mass %, per 100 mass % of the acrylic polymer. A content ratio of these monomers of 3 mass % or more is preferred in view of oxidation resistance, and when the content ratio is 92 mass % or less, the bindability to a base material is advantageously enhanced.

In the case where the acrylic polymer contains a (meth) acrylic acid as a monomer unit, the content ratio thereof is preferably from 0.1 to 5 mass % per 100 mass % of the acrylic polymer. When the content ratio of the monomer is 0.1 mass % or more, the cushioning property of the separator in a swollen state tends to be improved, and when it is 5 mass % or less, the polymerization stability is likely to be good.

In the case where the acrylic polymer contains a crosslinking monomer as a monomer unit, the content ratio of the crosslinking monomer in the acrylic polymer is preferably from 0.01 to 10 mass %, more preferably from 0.1 to 5 mass %, still more preferably from 0.1 to 3 mass %, per 100 mass % of the acrylic polymer. When the content ratio of the monomer is 0.01 mass % or more, the electrolytic solution resistance is further enhanced, and when it is 10 mass % or less, the cushioning property in a swollen state can be prevented from deterioration.

The acrylic polymer in this embodiment is preferably any one of the following embodiments. In the following, all of the copolymerization ratios are a value based on 100 parts by mass of the copolymer.

(1) A copolymer having a (meth)acrylic acid ester as a monomer unit (with a proviso excluding the following copolymer (2) and copolymer (3)), preferably a copolymer of 5 mass % or less (more preferably from 0.1 to 5 mass %) of a (meth)acrylic acid, from 3 to 92 mass % (more preferably from 10 to 90 mass %, still more preferably from 15 to 75 mass %, yet still more preferably from 25 to 55 mass %) of a (meth)acrylic acid ester monomer, 15 mass % or less (more preferably 10 mass % or less) of at least one member selected from the group consisting of an amide group-containing monomer, a cyano group-containing monomer and a hydroxyl group-containing monomer, and 10 mass % or less (more preferably from 0.01 to 5 mass %, still more preferably from 0.1 to 3 mass %) of a crosslinking monomer;

(2) a copolymer having an aromatic vinyl monomer and a (meth)acrylic acid ester monomer as monomer units, preferably a copolymer of from 5 to 95 mass % (more preferably from 10 to 92 mass %, still more preferably from 25 to 80 mass %, yet still more preferably from 40 to 60 mass %) of an aromatic vinyl monomer, 5 mass % or less (more preferably from 0.1 to 5 mass %) of a (meth)acrylic acid, from 5 to 95 mass % (more preferably from 15 to 85 mass %, still more preferably from 20 to 80 mass %, yet still more preferably from 30 to 75 mass %) of a (meth)acrylic acid ester monomer, 10 mass % or less (more preferably 5 mass % or less) of at least one member selected from the group consisting of an amide group-containing monomer, a cyano group-containing monomer, and a hydroxyl group-containing monomer, and 10 mass % or less (more preferably from 0.01 to 5 mass %, still more preferably from 0.1 to 3 mass %) of a crosslinking monomer; and (3) a copolymer having a cyano group-containing monomer and a (meth)acrylic acid ester monomer as monomer units, preferably a copolymer of from 1 to 95 mass % (more preferably from 5 to 90 mass %, still more preferably from 50 to 85 mass %) of a cyano group-containing monomer, 5 mass % or less (preferably from 0.1 to 5 mass %) of a (meth)acrylic acid, from 1 to 95 mass % (more preferably from 5 to 85 mass %, still more preferably from 10 to 50 mass %) of a (meth)acrylic acid ester monomer, 10 mass % or less (more preferably 5 mass % or less) of at least one member selected from the group consisting of an amide group-containing monomer, a cyano group-containing monomer, and a hydroxyl group-containing monomer, and 10 mass % or less (more preferably from 0.01 to 5 mass %, still more preferably from 0.1 to 3 mass %) of a crosslinking monomer.

The copolymer (2) preferably contains, as a (meth)acrylic acid ester monomer, a hydrocarbon ester of (meth)acrylic acid. In this case, the copolymerization ratio of the hydrocarbon ester of (meth)acrylic acid is preferably from 0.1 to 5 mass %. In the case where the copolymer (2) has an amide group-containing monomer component, the copolymerization ratio of the component is preferably from 0.1 to 5 mass %. In the case where the copolymer (2) has a hydroxyl group-containing monomer component, the copolymerization ratio of the component is preferably from 0.1 to 5 mass %.

The copolymer (3) preferably contains, as a (meth)acrylic acid ester monomer, at least one member selected from the group consisting of a chain alkyl (meth)acrylate and a cycloalkyl (meth)acrylate. The chain alkyl (meth)acrylate is preferably a (meth)acrylic acid ester containing a chain alkyl group having 6 or more carbon atoms. The copolymerization ratio of the chain alkyl (meth)acrylate in the copolymer (3) is preferably from 1 to 95 mass %, more preferably from 3 to 90 mass %, still more preferably from 5 to 85 mass %. The upper limit value of this copolymerization ratio may be 60 mass %, particularly may be 40 mass % or 30 mass %, and above all, is preferably 20 mass %. The copolymerization ratio of the cyclohexylalkyl (meth)acrylate in the copolymer (3) is preferably from 1 to 95 mass %, more preferably from 3 to 90 mass %, still more preferably from 5 to 85 mass %. The upper limit value of this copolymerization ratio may be 60 mass %, particularly may be 50 mass %, and above all, is preferably 40 mass %.

In the case where the copolymer (3) has an amide group-containing monomer component, the copolymerization ratio of the component is preferably from 0.1 to 10 mass %, more preferably from 2 to 10 mass %. In the case where the copolymer (3) has a hydroxyl group-containing monomer component, the copolymerization ratio of the component is preferably from 0.1 to 10 mass %, more preferably from 1 to 10 mass %.

The acrylic polymer is obtained, for example, by a normal emulsion polymerization process. The method for emulsion polymerization is not particularly limited, and a conventionally known method can be used.

For example, a monomer composition containing respective monomers above is polymerized in a disperse system containing the monomers above, a surfactant, a radical polymerization initiator, and other additive components optionally used, as basic components, which are dispersed in an aqueous medium. At the time of polymerization, various methods can be utilized according to the need. The methods include a method of maintaining the formulation of the supplied monomer composition constant in the entire course of polymerization, and a method of sequentially or continuously changing the formulation in the course of polymerization to provide morphological and compositional changes to a particle in the resin dispersion produced. In the case of obtaining the acrylic polymer by emulsion polymerization, the polymer may be, for example, in the form of a water dispersion (latex) containing water and a particulate acrylic polymer dispersed in the water.

The surfactant is a compound having at least one or more hydrophilic groups and one or more lipophilic groups per molecule. Various surfactants include a nonreactive surfactant and a reactive surfactant. The surfactant is preferably a reactive surfactant, more preferably an anionic reactive surfactant, still more preferably a reactive surfactant having a sulfonic acid group.

The surfactant is preferably used in an amount of 0.1 to 5 parts by mass per 100 parts by mass of the monomer composition. One surfactant is used alone, or two or more surfactants are used in combination.

The radical polymerization initiator is radically decomposed by heat or a reducing substance to start addition polymerization of monomers, and both an inorganic initiator and an organic initiator can be used. A water-soluble or oil-soluble polymerization initiator can be used as the radical polymerization initiator.

The radical polymerization initiator may be used in an amount of preferably from 0.05 to 2 parts by mass per 100 parts by mass of the monomer composition. One radical polymerization initiator is used alone, or two or more radical polymerization initiators are used in combination.

The 3) polyvinyl alcohol-based resin includes, for example, polyvinyl alcohol and polyvinyl acetate; and the 4) fluorine-containing resin includes, for example, polyvinylidene fluoride, polytetrafluoroethylene, a vinylidene fluoride-hexafluoropropylene copolymer, a vinylidene fluoride-hexafluoropropylene-tetrafluoroethylene copolymer, and an ethylene-tetrafluoroethylene copolymer.

Among those thermoplastic polymers, an acrylic copolymer latex formed of an emulsion containing monomers, an emulsifier, an initiator and water is preferred for enhancing the adhesion between the separator and an electrode as well as the high-temperature storage characteristics and cycle characteristics of an electricity storage device and achieving thickness reduction of an electrode-separator bonded body. The acrylic copolymer latex applied onto a base material is granulated on the base material and appropriately undergoes aggregation, which is preferred from the standpoint of controlling the area density of thermoplastic polymer particles and the dispersion ($\sigma^2$) of areas ($s_i$) of Voronoi polygons.

The glass transition temperature (hereinafter, sometimes referred to as "Tg") of the thermoplastic polymer is not particularly limited but may be −50° C. or more and is preferably 20° C. or more, more preferably from 20 to 120° C., still more preferably from 20 to 100° C. When Tg of the thermoplastic polymer is 20° C. or more, the outermost surface of the separator having the above-described polymer layer can be prevented from adhering, and the handling property tends to be enhanced. When Tg is 120° C. or less, the adhesiveness of the separator to an electrode (electrode active material) tends to be improved.

The glass transition temperature as used herein is determined from a DSC curve obtained by differential scanning calorimetry (DSC). Specifically, the glass transition temperature is determined by an intersection of a linear line extended from the base line on a lower temperature side of the DSC curve toward a high temperature side, with a tangent line at a glass transition inflection point present in a stepwise change portion.

The "glass transition" indicates a calorimetric change caused in DSC on the endothermic side along with a change in the state of a polymer as a test sample. Such a calorimetric change is observed as a stepwise profile of change in a DSC curve. The "stepwise change" indicates a change in a portion where the curve departs from the old base line on the low temperature side and transitions to a new base line on the high temperature side in the DSC curve. A stepwise change combined with a peak is also encompassed by the stepwise change.

The "inflection point" indicates a point at which the gradient in the stepwise change portion of the DSC curve becomes maximum, and may also be expressed as a point at which, assuming that the upper side is a heat generation side, a convex shaped curve changes to a concave shaped curve. The "peak" indicates a portion where the curve departs from the base line on the low temperature side and again returns to the same base line in the DSC curve. The "base line" indicates a DSC curve in a temperature range where no transition and no reaction occur in the test sample.

Tg of a thermoplastic polymer can be appropriately adjusted, for example, by changing the type of the monomer used for the production of the thermoplastic polymer and the mixing ratio of respective monomers. Tg of a thermoplastic polymer can be roughly estimated from Tg of a homopolymer generally shown for each monomer used for the production of the polymer (described, for example, in "Polymer Handbook" (A WILEY-INTERSCIENCE PUBLICATION)) and the mixing ratio of monomers. A thermoplastic polymer having copolymerized-monomers such as styrene, methyl methacrylate and acrylonitrile providing a polymer having Tg of about 100° C., in a high ratio, has high Tg, and a thermoplastic polymer having copolymerized-monomers such as butadiene providing a polymer having Tg of about −80° C., and n-butyl acrylate and 2-ethylhexyl acrylate providing a polymer having Tg of about −50° C., in a high ratio, has low Tg.

Tg of the polymer can be roughly calculated according to the FOX formula (the following formula (2)). As the glass transition temperature of the thermoplastic polymer, a value measured by a method using DSC above is employed.

$$1/Tg = W1/Tg1 + W2/Tg2 + \ldots + Wi/Tgi + \ldots Wn/Tgn \quad (2)$$

In formula (2), Tg (K) represents Tg of a copolymer, Tgi (K) represents Tg of a homopolymer of each monomer i, and Wi represents a mass fraction of each monomer.

Although it is not particularly limited, the gel fraction of the thermoplastic polymer is, with regard to suppressing dissolution in an electrolytic solution and maintaining the strength of the thermoplastic polymer inside a battery, preferably 80 mass % or more, more preferably 85 mass % or more, still more preferably 90 mass % or more. The gel fraction can be determined by the measurement of toluene-insoluble matter.

The gel fraction can be adjusted by changing the monomer component polymerized, the ratio of respective monomers charged, and the polymerization conditions.

The thermoplastic polymer preferably has swellability in an electrolytic solution in view of battery characteristics such as cycle characteristics. Assuming that the mass of a thermoplastic polymer (A) after impregnating a dried thermoplastic polymer (or a thermoplastic polymer dispersion liquid) with an electrolytic solution for a predetermined time and washing it is Wa, and the mass after allowing A to stand still in an oven of 150° C. for one hour is Wb, the degree of swelling with the electrolytic solution can be calculated according to the following formula. The degree of swelling is preferably 6 times or less, more preferably 5 times or less, still more further preferably 4.5 times or less, yet still more preferably 4 times or less. The degree of swelling is preferably equivalent or more, more preferably 2 times or more.

Degree of swelling of thermoplastic polymer with electrolytic solution (times)=(Wa−Wb)÷Wb In the case where the polymer layer contains two or more copolymers, the degree of swelling is a weighted average of degrees of swelling of respective copolymers.

The thermoplastic polymer in the separator of this embodiment is preferably measured for its swellability in an electrolytic solution by using, as a model for the electrolytic solution, a mixed solvent composed of an ethylene carbonate (EC):ethyl methyl carbonate (EMC) mixed solvent (volume ratio: 1:2), or a mixed solvent (mass ratio: 2:3) of ethylene carbonate (EC) and diethyl carbonate (DEC).

In the separator of this embodiment, the degree of swelling of the thermoplastic polymer with an ethylene carbonate (EC):ethyl methyl carbonate (EMC) mixed solvent (volume ratio: 1:2) is in the range above, whereby excellent cycle characteristics are enhanced in the obtained electricity storage device. In the case where the (1) copolymer having a (meth)acrylic acid ester as a monomer unit (with a proviso excluding the copolymer (2) and the copolymer (3)) is contained as the thermoplastic polymer in the separator of this embodiment, the degree of swelling with the EC:EMC=1:2 (by volume) mixed solvent can be easily controlled to the range above.

In the separator of this embodiment, the degree of swelling of the thermoplastic polymer with a mixed solvent (mass ratio: 2:3) of ethylene carbonate (EC) and diethyl carbonate (DEC) is preferably from 0.5 to 6.0 times, more preferably from 1.0 to 5.0 times. When the degree of swelling is 6.0 times or less, reduction in the ionic resistance of the separator is more effectively and unfailingly suppressed, whereby the reliability of an electricity storage device can be enhanced and not only the rate characteristics can be improved but also the film strength can be increased. In the case where one or more members selected from the group consisting of (2) the copolymer having an aromatic vinyl monomer and a (meth)acrylic acid ester monomer as monomer units, and (3) the copolymer having a cyano group-containing monomer and a (meth)acrylic acid ester monomer as monomer units are contained as the thermoplastic polymer in the separator of this embodiment, the degree of swelling with the EC:DEC=2:3 (by mass) mixed solvent can be easily controlled to the range above.

The thermoplastic polymer layer preferably has at least two glass transition temperatures. This configuration makes it possible to more successfully balance both the adhesion to an electrode and the handling property.

In the case where the thermoplastic polymer layer has at least two glass transition temperatures, at least one of these glass transition temperatures is preferably present in a region of less than 20° C. In this case, improved adhesiveness to a base material is exhibited. As a result, an increase in the adhesiveness of the separator to an electrode is produced. In the same point of view, at least one of the glass transition temperatures of the thermoplastic polymer used is more preferably present in a region of 15° C. or less, still more preferably present in a region of −30° C. to 15° C. With regard to improving the handling property better while increasing the adhesiveness of the thermoplastic polymer to a base material, it is preferred that the glass transition temperature present in the region of less than 20° C. is present only in a region of −30° C. to 15° C.

In the case where the thermoplastic polymer layer has at least two glass transition temperatures, at least one of these glass transition temperatures is preferably present in a region of 20° C. or more. This configuration provides an effect that the adhesion between the separator and an electrode and the handling property are enhanced. At least one of the glass transition temperatures of the thermoplastic polymer used is more preferably present in a region of 20 to 120° C., still more preferably from 50 to 120° C. When a glass transition temperature is present in the range above, further improved handling property can be imparted, and the adhesiveness of an electrode to the separator, which is developed by pressurization at the time of manufacture of a battery, can be increased. With regard to preservation of handling properties while increasing the adhesiveness of the thermoplastic polymer to a base material, the glass transition temperature present in a region of 20° C. or more is preferably present only in a region of 20 to 120° C., more preferably present only in a region of 50 to 120° C.

The thermoplastic polymer having at least two glass transition temperatures can be achieved, for example, by a method of blending two or more types of thermoplastic polymers, or a method of using a thermoplastic polymer having a core-shell structure. The present invention is, however, not limited thereto. The polymer having a core-shell structure is a polymer having a dual-structure morphology in which the polymer residing the core portion and the polymer residing in the outer shell portion are composed of different formulations.

In the polymer blend and the core-shell structure, when a polymer having a high glass transition temperature and a polymer having a low glass transition temperature are combined, the glass transition temperature of the entire thermoplastic polymer can be controlled, and a plurality of functions can be imparted to the entire thermoplastic polymer.

For example, in the case of a blend, when two or more types of polymers, particularly, a polymer having a glass transition temperature present in a region of 20° C. or more and a polymer having a glass transition temperature in a region of less than 20° C., are blended, both the adhering resistance and the wettability to a base material can be more successfully satisfied. As the mixing ratio at the time of blending, the ratio of a polymer having a glass transition temperature present in a region of 20° C. or more and a polymer having a glass transition temperature present in a region of less than 20° C. is preferably from 0.1:99.9 to 99.9:0.1, more preferably from 5:95 to 95:5, still more preferably from 50:50 to 95:5, yet still more preferably from 60:40 to 90:10.

In the case of a core-shell structure, the adhesion and compatibility to another material (for example, a polyolefin microporous film) can be adjusted by changing the type of the outer shell polymer. The polymer residing in the core portion can be adjusted, for example, to a polymer selected to increase the adhesion to an electrode after heat pressing, by changing the type of the polymer. The viscoelasticity can also be controlled by combining a polymer having high viscosity and a polymer having high elasticity.

The glass transition temperature of the shell of the thermoplastic polymer having a core-shell structure is not particularly limited but is preferably less than 20° C., more preferably 15° C. or less, still more preferably from −30° C. to 15° C. The glass transition temperature of the core of the thermoplastic polymer having a core-shell structure is not particularly limited but is preferably 20° C. or more, more preferably from 20 to 120° C., still more preferably from 50 to 120° C.

When infrared spectrophotometry is carried out on the thermoplastic polymer of the separator of this embodiment, it is preferable to satisfy any one of the following requirements:

(A) the ratio of the infrared absorption peak intensity at a wavelength of 1,720 to 1,750 $cm^{-1}$ to the infrared absorption peak intensity at a wavelength of 740 to 770 cm$^{-1}$, of the thermoplastic polymer, is from 1 to 18, or (B) the ratio of the infrared absorption peak intensity at a wavelength of 2,220 to 2,260 cm$^{-1}$ to the infrared absorption peak intensity at a wavelength of 1,720 to 1,750 cm$^{-1}$, of the thermoplastic polymer, is from 0.001 to 0.320.

The ratio of infrared absorption peak intensities of (A) is more preferably from 2 to 15, still more preferably from 5 to 10. It is thought that the infrared peak at a wavelength of 740 to 770 cm$^{-1}$ is derived from an aromatic ring of an aromatic vinyl monomer and the infrared peak at a wavelength of 1,720 to 1,750 cm$^{-1}$ is derived from a (meth)acryloyl group of a (meth)acrylic acid ester monomer. In the case where (2) the copolymer having an aromatic vinyl monomer and a (meth)acrylic acid ester monomer as monomer units is used as the thermoplastic polymer, the ratio of infrared absorption peak intensities of (A) is easily realized. The thermoplastic polymer satisfying this peak intensity ratio contains, for example, from about 5 to 50 mass % of an aromatic vinyl monomer relative to 100 mass % of the total of an aromatic vinyl monomer and a (meth)acrylic acid ester monomer. Use of this thermoplastic polymer is preferred in view of the balance between the adhesion to an electrode and the handling property.

The ratio of infrared absorption peak intensities of (B) is more preferably from 0.010 to 0.320, still more preferably from 0.170 to 0.320. It is speculated that the infrared peak at a wavelength of 1,720 to 1,750 cm$^{-1}$ is, as described above, derived from a (meth)acryloyl group of a (meth)acrylic acid ester monomer and the other infrared peak at a wavelength of 2,220 to 2,260 cm$^{-1}$ is derived from the cyano group-containing monomer. In the case where (3) the copolymer having a cyano group-containing monomer and a (meth)acrylic acid ester monomer as monomer units is used as the thermoplastic polymer, the ratio of infrared absorption peak intensities of (B) is easily realized. The thermoplastic polymer satisfying this peak intensity ratio contains, for example, from 1 to 90 mass %, preferably from 5 to 90 mass %, more preferably from 50 to 90 mass %, of a cyano group-containing monomer relative to 100 mass % of the total of a (meth)acrylic acid ester monomer and a cyano-containing monomer. Use of this thermoplastic polymer is preferred in view of the oxidation resistance.

In both cases, the ratio of infrared absorption peak intensities can be determined from infrared absorption analysis described in Examples later.

[Method for Forming Polymer Layer]

The method for loading a polymer layer on at least one surface (one side) of a base material is not particularly limited.

The method includes, for example, a method of applying a coating solution containing the thermoplastic polymer onto at least one surface of a base material and then, if desired, removing the solvent or dispersion medium of the coating solution. As the coating solution, a dispersion in which polymer particles are dispersed in a medium is preferably used.

The solid content of the dispersion is preferably from 30 to 70 mass.

A mixture of a plurality of thermoplastic polymer particles differing in the glass transition temperature is preferably incorporated into the dispersion. All of the plurality of thermoplastic polymer particles preferably has an average particle diameter of 100 nm or more. When a dispersion containing the mixture is applied onto a base material, respective particles are granulated on the base material and appropriately aggregated, which is preferred with regard to controlling the area density of thermoplastic polymer particles and the dispersion ($\sigma^2$) of areas ($s_i$) of Voronoi polygons.

Specifically, it is preferable to use a mixture of (1) a thermoplastic polymer particle having a glass transition temperature of less than 20° C. and (2) a thermoplastic polymer particle having a glass transition temperature of 20° C. or more. The glass transition temperature of the thermoplastic polymer particle (1) is more preferably 15° C. or less, still more preferably from −30° C. to 15° C. The glass transition temperature of the thermoplastic polymer particle (2) is more preferably from 20 to 120° C., still more preferably from 50 to 120° C. In this case, both of the thermoplastic polymer particles (1) and (2) preferably have an average particle diameter of about 100 nm or more, more preferably an average particle diameter of 100 to 1,000 nm, still more preferably an average particle diameter of 100 to 800 nm.

The solvent or dispersion medium contained in the coating solution is not particularly limited but is preferably water. At the time of applying the coating solution onto a base material, if the coating solution enters the inside of the base material, the thermoplastic polymer clogs the surface and inside of a pore of the base material, and the permeability of the obtained separator is reduced. In the case of using water as the solvent or dispersion medium of the coating solution, the coating solution is less likely to enter the inside of the base material, and it becomes more likely for the thermoplastic polymer to be present primarily on the outer surface of the base material. Consequently, the obtained separator can be more effectively prevented from reducing in the permeability, as preferred. As the solvent or dispersion medium, only water may be used, or water and another solvent or dispersion medium compatible with water may be used in combination. The solvent or dispersion medium usable in combination with water includes, for example, ethanol and methanol.

In the case of using water as the medium, in order to keep the dispersion stability for a long period of time, the pH thereof is preferably adjusted to a range of 5 to 12. For adjusting the pH of one of ammonia, sodium hydroxide, potassium hydroxide, or amines such as dimethylaminoethanol are preferably used, and it is more preferable to adjust the pH with (aqueous) ammonia or sodium hydroxide.

In the dispersion, other components such as dispersant, lubricant, thickener and antiseptic may be contained as long as the stability of the dispersion is not impaired.

The viscosity of the coating solution is preferably 20 mPa·s or more. Adjusting the coating solution to such a viscosity makes it easy to realize the preferable area density, dispersion ($\sigma^2$) of areas ($s_i$) of Voronoi polygons, and ratio ($c_i/s_i$) between the projected area ($c_i$) and the area ($s_i$) of Voronoi polygon. The viscosity of the coating solution is more preferably from 1 to 50 mPa·s, still more preferably from 10 to 30 mPa·s.

In this embodiment, the thermoplastic polymer contained in the coating solution is preferably a particle having a large particle diameter of 10 to 2,000 nm. The coating solution containing the thermoplastic polymer is therefore generally less likely to have a high viscosity. The viscosity of the coating solution is preferably adjusted to the range above by incorporating a thickener to the coating solution. The thickener used includes, for example, polyethylene glycols, polyethers, celluloses, polysaccharide, polyacrylamides, and poly-N-pyrrolidones. The ratio of the thickener blended is preferably 5 mass % or less, more preferably 3 mass % or less, relative to the total amount of the coating solution.

The method for applying the coating solution onto a base material is not particularly limited as long as it is a method capable of realizing the required layer thickness and coating area. Examples of the method include a gravure coater method, a small-diameter gravure coater method, a reverse roll coater method, a transfer roll coater method, a kiss coater method, a dip coater method, a knife coater method, an air doctor coater method, a blade coater method, a rod coater method, a squeeze coater method, a cast coater method, a die coater method, a screen printing method, and a spray coating method.

When loading the polymer layer on a base material, with regard to allowing the thickness of the polymer layer to be substantially equal to the diameter of the thermoplastic polymer particle, for example, a gravure coater or a wire bar is preferably used as the coating apparatus. It is particularly preferable to perform the coating while applying a shear force to the coating solution by a reverse coating method using a gravure coater.

Prior to coating with the coating solution, in order to more facilitate the coating with the coating solution and enhance the adhesion between the base material and the thermoplastic polymer, the base material surface is preferably subjected to a surface treatment. The method for surface treatment is not particularly limited as long as it is a method not significantly damaging the structure of the base material (for example, a porous structure of an olefin microporous film). The method includes, for example, a corona discharge treatment method, a plasma treatment method, a mechanical surface roughening method, a solvent treatment method, an acid treatment method, and an ultraviolet oxidation method.

In the case of removing the solvent from the coating solution applied onto a base material, the method therefor is not particularly limited as long as it is a method not adversely affecting the base material. In the case of using a polyolefin microporous film as the base material, the method includes, for example, a method of drying the coating at a temperature not more than the melting point of the film while immobilizing the base material, a method of drying the coating at a low temperature under reduced pressure, and a method of immersing the coating in a poor solvent for the thermoplastic polymer to solidify the thermoplastic polymer and at the same time, extract the solvent.

[Porous Film]

The porous film for use in the present invention is described below.

The porous film is preferably low in electron conductivity, exhibits ionic conductivity and high resistance to an organic solvent, and has a small pore size.

Such a porous film includes, for example, a porous film containing a resin selected from polyolefin, polyethylene terephthalate, polycycloolefin, polyethersulfone, polyamide, polyimide, polyimideamide, polyaramide, polycycloolefin, nylon and polytetrafluoroethylene; a porous film formed by weaving polyolefin-based fiber (woven fabric); a nonwoven fabric formed of polyolefin-based fiber; paper formed of polyolefin-based fiber; and an assembly of insulating material particles. Among these, a porous film containing a polyolefin resin (hereinafter, sometimes referred to as "polyolefin resin porous film") is preferred from the standpoint of, when obtaining a multilayer porous film (separator) through a coating step, providing a coating solution with high coatability, reducing the film thickness of the separator, and increasing the proportion of an active material in an electricity storage device such as battery, thereby increasing the capacity per volume.

In view of enhancing the shutdown performance when formed into a separator for a battery, the polyolefin resin porous film is preferably a porous film formed from a polyolefin resin composition in which a polyolefin resin accounts for 50 to 100 mass % of the resin components constituting the porous film. The proportion of the polyolefin resin in the polyolefin resin composition is more preferably from 60 to 100 mass %, still more preferably from 70 to 100 mass %.

The polyolefin resin contained in the polyolefin resin composition is not particularly limited and includes, for example, a homopolymer, a copolymer, and a multi-stage polymerization product each obtained using, as a monomer, an α-olefin selected from ethylene, propylene, 1-butene, 4-methyl-1-pentene, 1-hexene and 1-octene. One of these polyolefin resins may be used alone, or two or more thereof may be mixed and used.

Among others, in view of shutdown characteristics, the polyolefin resin is preferably polyethylene, polypropylene, a copolymer thereof, or a mixture thereof.

Specific examples of the polyethylene include a low-density polyethylene, a linear low-density polyethylene, a medium-density polyethylene, a high-density polyethylene, and an ultrahigh molecular weight polyethylene.

Specific examples of the polypropylene include isotactic polypropylene, syndiotactic polypropylene, and atactic polypropylene.

Specific examples of the copolymer include an ethylene-propylene random copolymer and ethylene propylene rubber.

With regard to satisfying the required performances of low melting point and high strength when formed into a separator for a battery, polyethylene, particularly high-density polyethylene, is preferably used as the polyolefin resin. In the present invention, the high-density polyethylene means polyethylene having a density of 0.942 to 0.970 g/cm$^3$. In the present invention, the density of polyethylene indicates a value measured in accordance with D) Density Gradient Tube Method described in JIS K7112 (1999).

With regard to enhancing the heat resistance of the porous film, a mixture of polyethylene and polypropylene is preferably used as the polyolefin resin. In this case, the ratio of polypropylene to total polyolefin resins in the polyolefin resin composition is, in view of satisfying both heat resistance and preferable shutdown function, preferably from 1 to 35 mass %, more preferably from 3 to 20 mass %, still more preferably from 4 to 10 mass %.

In the polyolefin resin composition, an optional additive can be incorporated. The additive includes, for example, a polymer except for a polyolefin resin; an inorganic filler; an antioxidant such as phenol-based, phosphorus-based and sulfur-based antioxidants; metal soaps such as calcium stearate and zinc stearate; an ultraviolet absorber; a light stabilizer; an antistatic agent; an antifogging agent; and a color pigment. The total addition amount of these additives is, per 100 parts by mass of the polyolefin resin, preferably 20 parts by mass or less from the standpoint of enhancing the shutdown performance, and more preferably 10 parts by mass or less, still more preferably 5 parts by mass or less.

The porous film has a porous structure where a large number of minute pores cluster together to form dense continuous holes, and therefore is characterized by having not only very excellent ion conductivity but also good voltage withstanding characteristics and high strength.

The porous film may be a single-layer film composed of the above-described material or may be a multilayer film.

The thickness of the porous film is preferably from 0.1 to 100 μm, more preferably from 1 to 50 μm, still more preferably from 3 to 25 μm. The film thickness is preferably 0.1 μm or more in view of mechanical strength and is preferably 100 μm or less in view of high capacity of a battery. The thickness of the porous film can be adjusted, for example, by controlling the die lip distance or the stretch ratio in the stretching process.

The average pore size of the porous film is preferably from 0.03 to 0.70 μm, more preferably from 0.04 to 0.20 μm, still more preferably from 0.05 to 0.10 μm, yet still more preferably from 0.06 to 0.09 μm. In view of high ion conductivity and withstand voltage, the average pore size is preferably from 0.03 to 0.70 μm. The average pore size of the porous film can be measured by the later-described measuring method.

The average pore size can be adjusted by controlling one or more selected from, for example, the composition ratio, the cooling rate of extruded sheet, the stretch temperature, the stretch ratio, the heat setting temperature, the stretch ratio at heat setting, and the relaxation rate at heat setting.

The porosity of the porous film is preferably from 25 to 95%, more preferably from 30 to 65%, still more preferably from 35 to 55%. The porosity is preferably 25% or more from the standpoint of enhancing the ion conductivity and is preferably 95% or less in view of voltage withstanding characteristics. The porosity of the porous film can be measured by the method described later.

The porosity of the porous film can be adjusted by controlling one or more selected from, for example, the mixing ratio of polyolefin resin composition and plasticizer, the stretch temperature, the stretch ratio, the heat setting temperature, the stretch ratio at heat setting, and the relaxation rate at heat setting.

In the case where the porous film is a polyolefin resin porous film, the viscosity average molecular weight of the polyolefin resin porous film is preferably from 30,000 to 12,000,000, more preferably from 50,000 to less than 2,000,000, still more preferably from 100,000 to less than 1,000,000. The viscosity average molecular weight is preferably 30,000 or more, as the melt tension at the time of melt molding increases to provide good moldability and at the same time, high strength tends to be obtained due to entangling of polymers with each other. The viscosity average molecular weight is preferably 12,000,000 or less, as uniform melt-kneading is facilitated and the resulting sheet tends to be excellent in moldability, particularly, thickness stability. The viscosity average molecular weight is preferably less than 1,000,000, as when formed into a separator for a battery, a pore is easily closed at the time of temperature rise and a good shutdown function tends to be obtained. The viscosity average molecular weight of the polyolefin resin porous film can be measured by the method described later.

[Production Method of Porous Film]

The method for producing the porous film is not particularly limited, and a known production method can be employed. The method includes, for example, (1) a method where the polyolefin resin composition and a pore-forming material are melt-kneaded and after molding in a sheet shape and, if desired, stretching, the pore-forming material is extracted to make the sheet porous, (2) a method where the polyolefin resin composition is melt-kneaded and extracted at a high draw ratio and the polyolefin crystal interface is separated by heat treatment and stretching to thereby make the product porous;

(3) a method where the polyolefin resin composition and an inorganic filler are melt-kneaded and after molding in a sheet shape, the interface between the polyolefin and the inorganic filler is separated by stretching to thereby make the sheet porous; and (4) a method where the polyolefin resin composition is dissolved and then immersed in a poor solvent for polyolefin to solidify the polyolefin and at the same time, remove the solvent, thereby making the product porous.

As an example of the method for producing a porous film, a method of melt-kneading the polyolefin resin composition and a pore-forming material, molding it in a sheet shape, and extracting the pore-forming material is described below.

The polyolefin resin composition and a pore-forming material are first melt-kneaded. The melt-kneading method includes, for example, a method where the polyolefin resin and, if desired, other additives are kneaded with a pore-forming material introduced in an arbitrary ratio while heating and melting the resin components, by using a resin kneading apparatus such as extruder, kneader, Labo Plastomill, kneading roll and Banbury mixer.

The pore-forming material includes a plasticizer, an inorganic material, and a combination thereof.

The plasticizer is not particularly limited, but a nonvolatile solvent capable of forming a uniform solution at a temperature not less than the melting point of polyolefin is preferably used. Specific examples of the nonvolatile solvent include hydrocarbons such as liquid paraffin and paraffin wax; esters such as dioctyl phthalate and dibutyl phthalate; and higher alcohols such as oleyl alcohol and stearyl alcohol. Among others, liquid paraffin is preferred with regard to compatibility with other components and uniformity at the time of stretching.

As the method for mixing the plasticizer, it is preferable to preliminarily knead the polyolefin resin, other additives and the plasticizer in a predetermined ratio in advance by using, e.g., a Henschel mixer before introducing the plasticizer into a resin kneading apparatus. More preferably, in the preliminary kneading, only part of the plasticizer is charged and kneading is carried out by side-feeding the remaining plasticizer to the resin kneading apparatus under appropriate warming. When such a kneading method is used, the dispersibility of the plasticizer is increased and at the time of stretching in a later step of a sheet compact that is a melt-kneaded product of a resin composition and a plasticizer, the sheet can be stretched at a high ratio without breakage.

The ratio of the polyolefin resin composition to the plasticizer is not particularly limited as long as these can be uniformly melt-kneaded and molded into a sheet. For example, the mass fraction of the plasticizer in a composition composed of the polyolefin resin composition and the plasticizer is preferably from 20 to 90 mass %, more preferably from 30 to 80 mass %. When the mass fraction of the plasticizer is 90 mass % or less, the melt tension at the time of melt molding tends to be high enough to enhance the moldability. When the mass fraction of the plasticizer is 20 mass % or more, even if a mixture of the polyolefin resin composition and the plasticizer is stretched at a high ratio, breakage of a polyolefin chain does not occur and it is possible to form a uniform and fine pore structure and increase the strength.

The inorganic material is not particularly limited and includes, for example, an oxide-based ceramic such as alumina, silica (silicon oxide), titania, zirconia, magnesia, ceria, yttria, zinc oxide and iron oxide; a nitride-based ceramic such as silicon nitride, titanium nitride and boron nitride; ceramics such as silicon carbide, calcium carbonate, aluminum sulfate, aluminum hydroxide, potassium titanate, talc, kaolin clay, kaolinite, halloysite, pyrophyllite, montmorillonite, sericite, mica, amesite, bentonite, asbestos, zeolite, calcium silicate, magnesium silicate, diatomaceous earth and silica sand; and a glass fiber. One of these is used alone, or two or more thereof are used in combination. Among these, silica, alumina and titania are preferred in view of electrochemical stability, and silica is more preferred because of ease of extraction.

The ratio of the polyolefin resin composition to the inorganic material is, from the standpoint of obtaining good insulation, preferably 5 mass % or more, more preferably 10 mass % or more, relative to the total mass thereof, and from the standpoint of ensuring high strength, the ratio is preferably 99 mass % or less, more preferably 95 mass % or less, relative to the total mass of the polyolefin resin composition and the inorganic material.

The melt-kneaded product is then molded into a sheet. The method for producing a sheet compact includes, for example, a method where the melt-kneaded product is extruded via, e.g., T-die into a sheet and the sheet is cooled to a temperature sufficiently lower than the crystallization temperature of the resin component by the contact with a heat conductor and thereby solidified. The heat conductor used for cooling and solidification includes, for example, a metal, water, air or a plasticizer. Among these, a metal roll is preferably used because of its high heat conduction efficiency. At the time of the contact of the extruded kneaded product with a metal roll, the sheet is more preferably sandwiched between rolls, because the heat conduction efficiency is further enhanced and at the same time, the sheet is oriented to increase the film strength and improve surface smoothness of the sheet. The die lip distance at the time of extrusion of the melt-kneaded product into a sheet via T-die is preferably from 200 to 3,000 μm, more preferably from 500 to 2,500 μm. When the die lip distance is 200 μm or more, die-lip buildup is reduced, producing little effect on the film quality, such as streaking and defects, and the risk of film breakage can be decreased in the subsequent stretching step. When the die lip distance is 3,000 μm or less, the cooling rate is high and not only can cooling unevenness be prevented but also the thickness stability of sheet can be maintained.

The sheet compact may also be rolled. The rolling can be carried out, for example, by a pressing method using, e.g., a double belt pressing machine. The orientation particularly in the surface layer portion can be increased by rolling. The rolling area ratio is preferably more than equivalent and 3 times or less, more preferably more than equivalent and 2 times or less. When the rolling ratio is more than equivalent, the plane orientation is increased, and the strength of the finally obtained porous film tends to increase. When the rolling ratio is 3 times or less, the difference in the orientation between the surface layer portion and the central inner part is small, a porous structure uniform in the film-thickness direction tends to be formable.

The pore-forming material is removed from the sheet compact to form a porous film. The method for removing the pore-forming material includes, for example, a method where the sheet compact is immersed in an extraction solvent to extract the pore-forming material and thereafter, sufficiently dried. The method for extracting the pore-forming material may be either in a batch system or a continuous system. In order to suppress shrinkage of the porous film, the ends of the sheet compact are preferably fixed in a series of steps consisting of immersion and drying.

At the time of removal of the pore-forming material from the sheet compact, the amount of the pore-forming material remaining in the porous film is preferably less than 1 mass % relative to the mass of the entire porous film.

The extraction solvent used at the time of extraction of the pore-forming material is preferably a solvent serving as a poor solvent for the pore-formed material and a good solvent for the pore-forming material and having a boiling point lower than the melting point of the pore-formed material. As such an extraction solvent, in the case of using a polyolefin resin as the pore-formed material, for example, hydrocarbons such as n-hexane and cyclohexane; halogenated hydrocarbons such as methylene chloride and 1,1,1-trichloroethane; non-chlorine-based halogenated solvents such as hydrofluoroether and hydrofluorocarbon; alcohols such as ethanol and isopropanol; ethers such as diethylether and tetrahydrofuran; and ketones such as acetone and methyl ethyl ketone; and in the case of using an inorganic material as the pore-forming material, for example, an aqueous solution of sodium hydroxide or potassium hydroxide, can be used as the extraction solvent.

The sheet compact or porous film is preferably stretched. The stretching may be carried out before extracting the pore-forming material from the sheet compact, may be carried out for the porous film after extracting the pore-forming material from the sheet compact, or may be carried out before and after extracting the pore-forming material from the sheet compact.

For the stretching treatment, either uniaxial stretching or biaxial stretching can be suitably employed. With regard to enhancing, e.g., the strength of the obtained porous film, biaxial stretching is preferred. When the sheet compact is stretched at a high ratio in the biaxial direction, the molecules are oriented in the surface direction, and the finally obtained porous film is resistant to breaking and has a high piercing strength. The stretching method includes, for example, simultaneous biaxial stretching, sequential biaxial stretching, multistage stretching, and multiple stretching. In view of an increase in piecing strength, uniformity of stretching and shutdown property, simultaneous biaxial stretching is preferred. In view of ease of control of the surface orientation, sequential biaxial stretching is preferred.

The stretch ratio is, in terms of area ratio, preferably from 20 to 100 times, and more preferably from 25 to 70 times. The stretch ratio in each axial direction is preferably from 4 to 10 times in MD and from 4 to 10 times in TD; more preferably from 5 to 8 times in MD and from 5 to 8 times in TD. When the total area ratio is 20 times or more, a sufficient strength tends to be imparted to the obtained porous film, and when the total area ratio is 100 times or less, film breakage in the stretching step can be prevented and a high productivity is obtained.

From the standpoint of suppressing shrinkage, the porous film is preferably subjected to a heat treatment for the purpose of heat setting. The method for heat treatment includes one or more methods of a stretching operation with the objective to adjust the physical properties and a relaxation operation with an objective to reduce the stretching stress. A relaxation operation may be carried out after carrying out a stretching operation. These heat treatments can be carried out using a tenter or a roll stretching machine.

In the stretching operation, stretching is preferably applied at a ratio of 1.1 times or more, more preferably 1.2 times or more, in one or more directions of MD and TD of the film, because a porous film having higher strength and higher porosity is obtained.

The relaxation rate (a value obtained by dividing the dimension of film after relaxation operation by the dimension of film before relaxation operation) is, in one or more directions of MD and TD of the film, preferably 1.0 or less, more preferably 0.97 or less, still more preferably 0.95 or less. In view of the film quality, the relaxation rate is preferably 0.5 or more. The relaxation operation may be carried out in both directions of MD and TD or may be carried out only in one direction of MD or TD.

The stretching and relaxation operations after the extraction of plasticizer are preferably carried out in TD. The temperature in the stretching and relaxation operations is preferably lower than the melting point (hereinafter, sometimes referred to as "Tm") of the polyolefin resin, more preferably lower than Tm by 1 to 25° C. The temperature in the stretching and relaxation operations is preferably in the range above in view of balance between the reduction in heat shrinkage ratio and the porosity.

[Porous Layer Containing Inorganic Filler and Resin Binder]

The porous layer containing an inorganic filler and a resin binder is described.

[Inorganic Filler]

The inorganic filler used for the porous layer is not particularly limited but is preferably an inorganic filler having high heat resistance and high electrical insulation and at the same time, being electrochemically stable in the range of use of a lithium ion secondary battery.

The inorganic filler may include, for example, an aluminum compound, a magnesium compound, and other compounds.

The aluminum compound includes, for example, aluminum oxide, aluminum silicate, aluminum hydroxide, aluminum oxide hydroxide, sodium aluminate, aluminum sulfate, aluminum phosphate, and hydrotalcite.

The magnesium compound includes, for example, magnesium sulfate and magnesium hydroxide.

Other compounds include, for example, oxide-based ceramic, nitride-based ceramic, clay mineral, silicon carbide, calcium carbonate, barium titanate, asbestos, zeolite, calcium silicate, magnesium silicate, diatomaceous earth, silica sand, and glass fiber. The oxide-based ceramic includes, for example, silica, titania, zirconia, magnesia, ceria, yttria, zinc oxide, and iron oxide. The nitride-based ceramic includes, for example, silicon nitride, titanium nitride, and boron nitride. The clay mineral includes, for example, talc, montmorillonite, sericite, mica, amesite, and bentonite.

These may be used individually or in combination of a plurality thereof.

Among those inorganic fillers, in view of electrochemical stability and heat resistance characteristics, one or more members selected from the group consisting of aluminum oxide, aluminum oxide hydroxide, and aluminum silicate are preferred. Specific examples of the aluminum oxide include alumina. Specific examples of the aluminum oxide hydroxide include boehmite. Specific examples of the aluminum silicate include kaolinite, dickite, nacrite, halloysite, and pyrophyllite.

The aluminum oxide is more preferably alumina regarding electrochemical stability. When a particle mainly composed of alumina is employed as the inorganic filler constituting the porous layer, a very lightweight porous layer can be realized while maintaining high permeability. Even when the thickness of the porous layer is small, the porous film tends to be blocked from heat shrinkage at high temperatures and expresses excellent heat resistance. Alumina has many crystalline forms such as α-alumina, β-alumina, γ-alumina, and θ-alumina, and any of these can be suitably used. Among others, α-alumina is thermally/chemically stable and therefore, is most preferred.

The aluminum oxide hydroxide is more preferably boehmite with regard to preventing internal short circuit caused by occurrence of lithium dendrite. When a particle mainly composed of boehmite is employed as the inorganic filler constituting the porous layer, a very lightweight porous layer can be realized while maintaining high permeability. Even when the thickness of the porous layer is small, the porous film tends to be blocked from heat shrinkage at high temperatures and expresses excellent heat resistance. Synthetic boehmite capable of decreasing ionic impurities adversely affecting the characteristics of an electricity storage device is preferred.

Among the aluminum silicates above, kaolinite (hereinafter, sometimes referred to as kaolin) primarily constituted by kaolin mineral is preferred in view of light weight and permeability. Kaolin includes wet kaolin and fired kaolin obtained by baking wet kaolin. The fired kaolin is particularly preferred in terms of electrochemical stability, because impurities are removed during baking in addition to the release of crystal water. When a particle mainly composed of fired kaolin is employed as the inorganic filler constituting the porous layer, a very lightweight porous layer can be realized while maintaining high permeability. Even when the thickness of the porous layer is small, the porous film tends to be blocked from heat shrinkage at high temperatures and expresses excellent heat resistance.

The average particle diameter of the inorganic filler is preferably from 0.1 to 10.0 μm, more preferably from 0.2 to 5.0 μm, still more preferably from 0.4 to 3.0 μm. The average particle diameter of the inorganic filler is preferably adjusted to the range above with regard to increasing the permeability and suppressing heat shrinkage at high temperatures.

Preferable particle size distribution of the inorganic filler is as follows. The minimum particle diameter is preferably 0.02 μm or more, more preferably 0.05 μm or more, still more preferably 0.1 μm or more. The maximum particle diameter is preferably 20 μm or less, more preferably 10 μm or less, still more preferably 7 μm or less. The ratio of maximum particle diameter/average particle diameter is preferably 50 or less, more preferably 30 or less, still more preferably 20 or less. The particle size distribution of the inorganic filler is preferably adjusted to the range with regard to suppressing heat shrinkage at high temperatures. The particle size distribution of the inorganic filler may further have one particle diameter peak or a plurality of particle diameter peaks between the maximum particle diameter and the minimum particle diameter. The method for adjusting the particle size distribution of the inorganic filler includes, for example, a method of adjusting the particle diameter to a desired particle size distribution by pulverizing the inorganic filler by means of a ball mill, a bead mill, or a jet mill, and a method of preparing fillers having a plurality of particle diameter distributions and then blending the fillers.

The shape of the inorganic filler includes, for example, plate, scale, polyhedron, needle, pillar, sphere, spindle, and lump. A plurality of types of inorganic fillers having the shapes above may be used in combination. Among others, regarding enhancing the permeability, one or more shapes selected from plate, scale and polyhedron are preferred.

The proportion of the inorganic filler in the porous layer can be appropriately determined in view of permeability and heat resistance. The proportion may be preferably 50 mass % or more, more preferably 70 mass % or more, still more preferably 80 mass % or more, yet still more preferably 95 mass % or more, and most preferably 97 mass % or more. The proportion is preferably less than 100 mass %, more preferably 99.99 mass % or less, still more preferably 99.9 mass % or less, yet still more preferably 99 mass % or less.

[Resin Binder]

The resin binder is a resin fulfilling the role of binding the above-described inorganic fillers to each other and in addition, is preferably a resin fulfilling the role of binding the inorganic filler and the porous film together.

As for the type of the resin made binder, a binder insoluble in an electrolytic solution of a lithium ion secondary battery when formed into a separator, and electrochemically stable under an environment in the range of use of a lithium secondary battery is preferable.

Specific examples of the resin binder include the following 1) to 7):

1) a polyolefin: for example, polyethylene, polypropylene, ethylene propylene rubber, and modification products thereof;

2) a conjugated diene-based polymer, for example, a styrene-butadiene copolymer and a hydride thereof, an acrylonitrile-butadiene copolymer and a hydride thereof, and an acrylonitrile-butadiene-styrene copolymer and a hydride thereof;

3) an acrylic polymer: for example, a methacrylic acid ester-acrylic acid ester copolymer, a styrene-acrylic acid ester copolymer, and an acrylonitrile-acrylic acid ester copolymer;

4) a polyvinyl alcohol-based resin: for example, polyvinyl alcohol and polyvinyl acetate;

5) a fluorine-containing resin: for example, polyvinylidene fluoride, polytetrafluoroethylene, a vinylidene fluoride-hexafluoropropylene copolymer, a vinylidene fluoride-hexafluoropropylene-tetrafluoroethylene copolymer and an ethylene-tetrafluoroethylene copolymer;

6) a cellulose derivative: for example, ethyl cellulose, methyl cellulose, hydroxyethyl cellulose and carboxymethyl cellulose;

7) a resin having a melting point and/or a glass transition temperature of 180° C. or more or a polymer having no melting point and a decomposition temperature of 200° C. or more: for example, polyphenylene ether, polysulfone, polyethersulfone, polyphenylene sulfide, polyetherimide, polyamideimide, polyamide and polyester; in view of durability, a wholly aromatic polyamide, particularly polymetaphenyleneisophthalamide, is suitable.

Among others, in view of compatibility with an electrode, 2) the conjugated diene-based polymer is preferred, and in view of voltage withstanding properties, one or more members selected from the group consisting of 3) the acrylic polymer and 5) the fluorine-containing resin are preferred.

The 2) conjugated diene-based polymer is a polymer containing a conjugated diene compound as a monomer unit.

The conjugated diene compound includes, for example, 1,3-butadiene, 2-methyl-1,3-pentadiene, 2,3-dimethyl-1,3-butadiene, 2-chloro-1,3-butadiene, substituted linear conjugated pentadienes, and substituted and side-chain conjugated hexadienes. One of these may be used alone, or two or more thereof may be used in combination. Among others, 1,3-butadiene is particularly preferred.

The 3) acrylic polymer is a polymer containing a (meth) acrylic compound as a monomer unit. The (meth)acrylic compound indicates at least one member selected from the group consisting of a (meth)acrylic acid and a (meth)acrylic acid ester.

The (meth)acrylic acid used in the 3) acrylic polymer includes, for example, an acrylic acid and a methacrylic acid.

The (meth)acrylic acid ester used in the 3) acrylic polymer includes, for example, a (meth)acrylic acid ester monomer, such as methyl acrylate, methyl methacrylate, ethyl acrylate, ethyl methacrylate, butyl acrylate, butyl methacrylate, 2-ethylhexyl acrylate, and 2-ethylhexyl methacrylate; and an epoxy group-containing (meth)acrylic acid ester, such as glycidyl acrylate and glycidyl methacrylate. One of these may be used alone, or two or more thereof may be used in combination. Among these, one or more members selected from the group consisting of an acrylic acid and a methacrylic acid are preferred.

Each of the 2) conjugated diene-based polymer and the 3) acrylic polymer may be a polymer obtained by copolymerizing a conjugated diene compound or a (meth)acrylic compound and another monomer copolymerizable therewith. The copolymerizable another monomer includes, for example, an unsaturated carboxylic acid alkyl ester, an aromatic vinyl-based monomer, a vinyl cyanide-based monomer, an unsaturated monomer having a hydroxyalkyl group, an unsaturated carboxylic acid amide monomer, a crotonic acid, a maleic acid, a maleic anhydride, a fumaric acid, and an itaconic acid. One of these may be used alone, or two or more thereof may be used in combination. Among these, an unsaturated carboxylic acid alkyl ester monomer is preferred. The unsaturated carboxylic acid alkyl ester monomer includes, for example, dimethyl fumarate, diethyl fumarate, dimethyl maleate, diethyl maleate, dimethyl itaconate, monomethyl fumarate, and monoethyl fumarate. One of these may be used alone, or two or more thereof may be used in combination.

The 2) conjugated diene-based polymer may be a polymer obtained by copolymerizing the above-described (meth) acrylic compound as another monomer.

[Structure and Formation Method of Porous Layer]

The thickness of the porous layer is, with regard to enhancing the heat resistance and insulating properties, preferably 1 µm or more, more preferably 1.0 µm or more, still more preferably 1.2 µm or more, yet still more preferably 1.5 µm or more, even yet still more preferably 1.8 µm or more, and most preferably 2.0 µm or more. From the standpoint of increasing the capacity and permeability of a battery, the thickness is preferably 50 µm or less, more preferably 20 µm or less, still more preferably 10 µm or less, yet still more preferably 7 µm or less.

The filling factor of the inorganic filler in the porous layer is, in view of light weight and high permeability, preferably 95 vol % or less, more preferably 80 vol % or less, still more preferably 70 vol % or less, yet still more preferably 60 vol % or less. Regarding suppressing heat shrinkage and dendrite formation, the lower limit of the filling factor of the inorganic filler is preferably 20 vol % or more, more preferably 30 vol % or more, still more preferably 40 vol % or more. The filling factor of the inorganic filler can be calculated from the thickness of the porous layer and the mass and specific gravity of the inorganic filler.

The porous layer may be formed only on one surface of the porous film or may be formed on both surfaces.

The method for forming the porous layer includes, for example, a method where a coating solution containing an inorganic filler and a resin binder is applied onto at least one surface of a porous film to form a porous layer.

The form of the resin binder in the coating solution may be a water-based solution or dispersion liquid in which a resin is dissolved or dispersed in water, or may be a general organic medium-based solution or dispersion liquid in which a resin is dissolved or dispersed in the organic medium, but is preferably a resin latex. The "resin latex" indicates a dispersion liquid in the state of a resin being dispersed in a medium. In the case where a resin latex is used as the binder, when a porous layer containing an inorganic filler and the binder are laminated to at least one surface of a polyolefin porous film, the ion permeability is less likely to decrease and a separator having high output characteristics is easily obtained. Even when the temperature rises at a high rate upon abnormal heat generation, smooth shutdown characteristics are exhibited, making it easy to attain high safety.

The average particle diameter of the resin binder is preferably from 50 to 1,000 nm, more preferably from 60 to 500 nm, still more preferably from 80 to 250 nm. When the average particle diameter is 50 nm or more, good bindability is developed at the time of lamination of a porous layer containing an inorganic filler and the binder to at least one surface of a porous polyolefin film, and a separator formed tends to have good heat shrinkage performance and be excellent in the safety. When the average particle diameter is 1,000 nm or less, ion permeability is less likely to decrease, and high output characteristics are easily obtained. Even when the temperature rises at a high rate upon abnormal heat generation, smooth shutdown characteristics are exhibited, making it easy to attain high safety. The average particle diameter can be controlled by adjusting, the polymerization time, the polymerization temperature, the composition ratio of starting material, the order of charging starting materials, the pH, and the stirring speed, at the time of production of the resin binder.

The medium of the coating solution is preferably a medium capable of uniformly and stably dispersing or dissolving the inorganic filler and the resin binder. Specifically, the medium includes, for example, N-methylpyrrolidone, N,N-dimethylformamide, N,N-dimethylacetamide, water, ethanol, toluene, hated xylene, methylene chloride, and hexane.

In order to stabilize the dispersion and enhance the coatability, various additives, for example, a dispersant such as surfactant; a thickener; a wetting agent; a defoaming agent; and a pH adjusting agent containing an acid or an alkali, may be added to the coating solution. The total addition amount of these additives is, per 100 parts by mass of the inorganic filler, in terms of the amount of the active ingredient (in the case where the additive is dissolved in a solvent, the mass of the dissolved additive component), preferably 20 parts by mass or less, more preferably 10 parts by mass or less, still more preferably 5 parts by mass or less.

The method for dispersing or dissolving the inorganic filler and the resin binder in a medium of the coating solution is not particularly limited as long as it is a method capable of realizing dispersion characteristics of the coating solution necessary for the coating process. The method includes, for example, mechanical stirring using a ball mill, a bead mill, a planetary ball mill, a vibratory ball mill, a sand mill, a colloidal mill, an attritor, a roll mill, a high-speed impeller dispersion, a disperser, a homogenizer, a high-velocity impact mill, an ultrasonic dispersion, or a stirring blade.

The method for applying the coating solution onto a porous film is not particularly limited as long as it is a method capable of realizing the required layer thickness and coating area. The method includes, for example, a gravure coater method, a small-diameter gravure coater method, a reverse roll coater method, a transfer roll coater method, a kiss-coater method, a dip coater method, a knife coater method, an air doctor coater method, a blade coater method, a rod coater method, a squeeze coater method, a cast coater method, a die coater method, a screen printing method, and a spray coating method.

Prior to coating with the coating solution, the surface of a porous film is preferably subjected to a surface treatment, as the coating solution is more easily applied and simultaneously, the adhesion between the inorganic filler-containing porous layer after coating and the porous film surface enhances. The surface treatment method is not particularly limited as long as it is a method not significantly damaging the porous structure of the porous film. The method includes, for example, a corona discharge treatment method, a plasma discharge treatment method, a mechanical surface roughening method, a solvent treatment method, an acid treatment method, and an ultraviolet oxidation method.

The method for removing the medium from the coated film after coating is not particularly limited as long as it is a method not adversely affecting the porous film. The method includes, for example, a method of drying the porous film at a temperature not more than its melting point while immobile, a method of drying the film under reduced pressure at a low temperature, and extraction/drying. Part of the solvent may be allowed to remain in quantities limited so as to not significantly affect the battery characteristics. With regard to controlling the shrinkage stress in the MD direction of a porous film after the lamination of a porous film and a porous layer, it is preferable to appropriately adjust the drying temperature or the winding tension.

[Separator for Electricity storage Device]

The separator of the present invention has a polymer layer on a base material and therefore, is excellent in the adhesion to an electrode active material.

The air permeability of the separator is preferably from 10 to 650 sec/100 cc, more preferably from 20 to 500 sec/100 cc, still more preferably from 30 to 450 sec/100 cc, yet still more preferably from 50 to 400 sec/100 cc. When the air permeability is 10 sec/100 cc or more, the self-discharge when used as a separator for a battery tends to be suppressed, and when the air permeability is 650 sec/100 cc or less, good charge-discharge characteristics are likely to be obtained.

The final film thickness of the separator is preferably from 2 to 200 µm, more preferably from 5 to 100 µm, still more preferably from 7 to 30 µm. When the film thickness is 2 µm or more, the mechanical strength tends to be sufficient, and when the film thickness is 200 µm or less, the occupied volume of the separator decreases, and this is likely to be advantageous in terms of high capacity of a battery.

The peel strength of the separator (the adhesion between the separator and an electrode) is measured as a peel strength when an aluminum foil of the positive electrode collector is pressed to the thermoplastic polymer-containing layer side of the separator at 80° C. and a pressure of 10 MPa for 2 minutes (hereinafter, sometimes referred to as "heating peel strength"). As for the peel strength of the separator, the value of the heating peel strength above is preferably 4 mN/mm or more. A separator where the heating peel strength is in the range above is preferred in that when applied to the later-described electricity storage device, the adhesiveness of an electrode to the separator is excellent. The method for measuring the heating peel strength is specifically described in Examples later.

In regards to the separator of this embodiment, the 90° peel strength after two sheets of the separator are laminated one on top of another and pressurized in the lamination direction at a temperature of 25° C. and a pressure of 5 MPa for 3 minutes (hereinafter, sometimes referred to as "normal temperature peel strength") is preferably 40 mN/mm or less, more preferably 20 mN/mm or less. By satisfying this requirement, there is obtained an effect that the separator is more excellent in the blocking resistance and the handling property thereof is more improved.

A specific method for measuring the normal temperature peel strength is described in Examples later.

The normal peel strength and heating peel strength are preferably in the ranges above so that the adhesiveness at the time of heat pressing of the separator to an electrode is enhanced. The reason why such an effect is obtained is not clearly known, but the present inventors presume the reason as follows.

When the normal peel strength is in the range above, this is considered to indicate that in the thermoplastic polymer-containing layer of the separator, a large amount of thermoplastic resin having a high glass transition temperature is present on the outermost surface side and a large amount of thermoplastic resin having a low glass transition temperature is present on the base material side. In other words, stickiness is suppressed by virtue of the configuration where a large amount of thermoplastic resin having a high glass transition temperature is present on the outermost surface side of the thermoplastic polymer-containing layer. The thermoplastic resin having a high glass transition temperature is excellent in the adhesiveness to an electrode. Consequently, it is inferred that a separator satisfying both the requirements of low stickiness and excellent adhesiveness to an electrode is obtained.

The adhesion between a base material and a thermoplastic polymer is enhanced by virtue of the configuration where a large amount of thermoplastic resin having a low glass transition temperature is present on the base material side of the thermoplastic polymer-containing layer. As a result, peeling at the interface between the base material and the thermoplastic resin is suppressed and consequently, it is inferred that a separator excellent in the adhesiveness to an electrode is obtained.

[Electricity Storage Device]

The electricity storage device in this embodiment is described below.

The electricity storage device has the above-described separator. Other constituents may be the same as conventionally known constituents.

The electricity storage device in this embodiment is not particularly limited but may be, for example, a battery such as nonaqueous electrolyte battery, a condenser, or a capacitor. Among these, a nonaqueous electrolyte battery is preferred, a nonaqueous electrolyte secondary battery is more preferred, and a lithium ion secondary battery is still more preferred. A preferred embodiment of the case where the electricity storage device is a nonaqueous electrolyte battery is described below.

The nonaqueous electrolyte battery having the above-described separator has, in addition to the separator, a positive electrode, a negative electrode, and a nonaqueous electrolytic solution. The positive electrode, the negative electrode, and the nonaqueous electrolytic solution are not particularly limited, and those known in the art can be used.

The positive electrode material (a positive electrode active material) is not particularly limited but includes, for example, a lithium-containing composite oxide such as $LiCoO_2$, $LiNiO_2$, spinel-type $LiMnO_4$ and olivine-type $LiFePO_4$. The negative electrode material is not particularly limited but includes, for example, a carbon material such as graphite, hardly graphitizable carbonaceous material, easily graphitizable carbonaceous material and carbon composite; silicon, tin, metallic lithium, and various alloy materials. Both the positive electrode and the negative electrode may have a collector. The positive electrode collector includes, for example, an aluminum foil, and the negative electrode collector includes, for example, a copper foil.

The nonaqueous electrolytic solution is not particularly limited, but an electrolytic solution prepared by dissolving an electrolyte in an organic solvent can be used. The organic solvent includes, for example, propylene carbonate, ethylene carbonate, dimethyl carbonate, diethyl carbonate, ethyl methyl carbonate, and a mixed solvent thereof. The electrolyte includes, for example, a lithium salt such as $LiClO_4$, $LiBF_4$ and $LiPF_6$.

Although it is not particularly limited, the electricity storage device is produced, for example, as follows.

The above-described separator is manufactured as a separator with a longitudinal shape having a width of 10 to 500 mm (preferably from 80 to 500 mm) and a length of 200 to 4,000 m (preferably from 1,000 to 4,000 m). An electricity storage device is obtained through steps of, for example, stacking the separators together with a positive electrode and a negative electrode in the order of positive electrode-separator-negative electrode-separator, or negative electrode-separator-positive electrode-separator to obtain a laminate, rolling the laminate into a circular or flat spiral form to obtain a wound body, housing the wound body in an outer case, and injecting an electrolytic solution thereinto.

The electricity storage device can also be manufactured through steps of, for example, forming the separator, the positive electrode and the negative electrode each in a plate form, stacking these in the order of positive electrode-separator-negative electrode-separator, or negative electrode-separator-positive electrode-separator to obtain a laminate, housing the laminate in an outer case, and injecting an electrolytic solution thereinto.

As the outer case, for example, a metal can (battery can) and a bursiform film can be used. Among these, from the standpoint that a profit due to the action and effect of the separator above is more effectively obtained, it is preferable to use a square battery can or a bursiform film.

In the electricity storage device, the separator is preferably bonded to an electrode. Hereinafter, a product obtained by bonding the separator and an electrode is referred to as "electrode-separator bonded body" or simply "bonded body". The "bonding" as used herein indicates that the peel strength between the separator and an electrode is preferably 4 mN/mm or more, more preferably 6 mN/mm or more, still more preferably 8 mN/mm or more.

The method for producing the bonded body is not particularly limited, but the bonded body can be produced, for example, by laminating the separator to an electrode and then carrying out at least one process of heating and pressing.

The heating and pressing can be carried out in the state of an electrode being laminated to the separator. For example, after forming the above-described wound body or laminate, at least one processing of heating and pressing can be carried out.

Each of the heating and the pressing may be carried out before housing an electrode and the separator in an outer case, may be carried out after the housing in an outer case, or may be carried out both before and after the housing in an outer case.

In the case where at least one process of heating and pressing is carried out after housing an electrode and the separator in an outer case, the process may be carried out before injecting an electrolytic solution into the outer case, may be carried out after the injection, or may be carried out both before and after the injection of an electrolytic solution.

In the case of using a bursiform film as the outer case, at least one process of heating and pressing is preferably carried out after housing an electrode and the separator in an outer case and injecting an electrolytic solution. At this time, regarding the prevention of slippage of the electrode relative to the separator, at least one process of heating and pressing is preferably carried out before injecting into an outer case.

The temperature at the time of heating above is preferably from 40 to 120° C., and the heating time is preferably from 5 seconds to 5 hours.

The pressure at the time of pressing above is preferably from 1 to 30 MPa, and the pressing time is preferably from 5 seconds to 5 hours.

In the case of carrying out both heating and pressing, as for the order thereof, pressing may be carried out after heating, heating may be carried out after pressing, or pressing and heating may be carried out simultaneously. Among these, it is preferable to perform pressing and heating simultaneously.

EXAMPLES

This embodiment is more specifically described below by referring to Examples and Comparative Example. However, this embodiment is not limited to the following Examples as long as the gist thereof is observed.

The physical properties in Examples or Comparative Examples were measured using the following methods. When the measurement atmosphere is not specified clearly, the measurement is carried out in the air at 23° C., 1 atm. and relative humidity of 50%.

(1) Viscosity Average Molecular Weight (Mv) of Polyolefin

The limiting viscosity $[\eta]$ (dl/g) in a decalin solvent at 135° C. was determined in conformity with ASTM-D4020.

Mv of polyethylene was calculated according to the following formula:

$$[\eta]=6.77\times10^{-4}Mv^{0.67}$$

Mv of polypropylene was calculated according to the following formula:

$$[\eta]=1.10\times10^{-4}Mv^{0.80}$$

(2) Thickness (2-1) Thicknesses (μm) of Base Material and Separator for Electricity Storage Device A sample of MD 10 mm×TD 10 mm was cut from both the base material and the separator for an electricity storage device. Nine portions (3 points×3 points) arranged in a grid pattern were selected on the sample surface, and the film thickness at each portion was measured using a micro-thickness meter (Type KBM, manufactured by Toyo Seiki Seisaku-Sho, Ltd.) at room temperature 23±2° C. The average value measured at 9 portions in each sample was taken as the film thickness (μm) of the base material or the separator for the electricity storage device.

(2-2) Thickness (μm) of Polymer Layer

The thickness of the polymer layer was measured by cross-sectional observation of the separator by using a scanning electron microscope (SEM) "Model S-4800, manufactured by HITACHI Ltd.". A sample of about 1.5 mm×2.0 mm was taken out from the separator and stained with ruthenium. The stained sample and ethanol were put in a gelatin capsule and frozen with liquid nitrogen, and the sample was then broken by a hammer. After vapor-depositing osmium, the sample was observed at an acceleration voltage of 1.0 kV and a magnification of 30,000 times, and the thickness of the polymer layer was calculated. In the SEM image, the outermost surface region where a porous structure of the base material cross-section was not observed was taken as the polymer layer region.

(2-3) Thicknesses of Porous Film and Porous Layer

In the case where the base material is a multilayer porous film having a porous film and a porous layer, each film thickness is measured as follows. A sample of MD 10 mm×TD 10 mm was cut from both the porous film and the multilayer porous film, 9 portions (3 points×3 points) arranged in a grid pattern were selected, and the film thickness was measured using a dial gage (PEACOCK No. 25 (registered trademark)) manufactured by Ozaki Mfg. Co., Ltd.). The average value measured at 9 portions in each sample was taken as the film thickness (μm) of the porous film or the multilayer porous film. The difference between the thus-measured thickness of the multilayer porous film and the thickness of the porous film was taken as the film thickness (μm) of the porous layer.

(3) Porosity of Porous Film

A sample of 10 cm×10 cm square was cut from the porous film, and the volume (cm³) and mass (g) thereof were determined. Using these values and taking density of the porous film as 0.95 (g/cm³), the porosity was calculated according to the following formula:

$$\text{Porosity (\%)}=(1-\text{mass/volume}/0.95)\times100$$

(4) Average Pore Diameter (μm)

It is known that a fluid inside a capillary of a porous film acts as a Knudsen flow when the mean free path of the fluid is larger than the pore diameter of the capillary, and acts as a Poiseuille flow when the mean free path is smaller. It is assumed that the air flow in the measurement of air permeability of a microporous film and the water flow in the measurement of water permeability of a microporous film act as the Knudsen flow and the Poiseuille flow, respectively.

The average pore diameter d (μm) was determined from air permeation rate constant $R_{gas}$ (m³/(m²·sec·Pa)), water permeation rate constant $R_{liq}$ (m³/(m²·sec·Pa)), molecular speed of air v (m/sec), water viscosity $\eta$ (Pa·sec), and standard pressure Ps (=101,325 Pa) according to the following formula:

$$d=2v\times(R_{liq}/R_{gas})\times(16\eta/3Ps)\times10^6$$

$R_{gas}$ and $R_{liq}$ are respectively determined using the following formulae:

$$R_{gas}=0.0001/(\text{air permeability}\times(6.424\times10^{-4})\times(0.01276\times101325))$$

$$R_{liq}=\text{water permeability}/100$$

The air permeability and the water permeability are respectively determined as follows.

[Air Permeability]

The air permeability as used herein can be obtained as an air resistance by measuring a microporous film in conformity with "(5) Air Permeability of Base Material and Separator" described later.

[Water Permeability]

A microporous film previously immersed in ethanol was set in a stainless steel liquid-permeable cell having a diameter of 41 mm, and ethanol of the film was washed with water. Water was thereafter allowed to permeate at a differential pressure of about 50,000 Pa, and the permeated water amount per unit time·unit pressure·unit area was calculated from the permeated water amount (cm³) after 120 sec had elapsed and taken as the water permeability.

ν is determined from gas constant R (=8.314), absolute temperature T (K), circular constant π, and average molecular weight M of air (=2.896×10⁻² kg/mol) by using the following formula:

$$\nu=\{(8R \times T)/(\pi \times M)\}^{1/2}$$

(5) Air Permeability of Base Material

Using a Gurley-type air permeability meter (G-B2 (trademark), manufactured by Toyo Seiki Seisaku-Sho, Ltd., mass of inner cylinder: 567 g) in conformity with JIS P-8117, the time (sec) required for 100 cc of air to pass through a base material having an area of 645 mm² (a circle with a diameter of 28.6 mm) was measured and taken as the air permeability (sec/100 cc) of the base material.

(6) Piercing Strength (g)

Using a handy compression tester KES-G5 (trademark) manufactured by Kato Tech Co., Ltd., a porous film (base material) was immobilized by a sample holder with an opening of 11.3 mm in diameter. A piercing test was carried out in the central section of the immobilized porous film at a piercing rate of 2 mm/sec in an atmosphere of 25° C. by using a needle having a tip curvature radius of 0.5 mm, and a piercing strength (g) was obtained as a maximum piercing load.

(7) Glass Transition Temperature of Thermoplastic Polymer

An appropriate amount of a coating solution (nonvolatile content=from 38 to 42%, pH=9.0) of a thermoplastic polymer was put in an aluminum pan and dried by a hot-air dryer at 130° C. for 30 minutes. After the drying, about 17 mg of the dried film was packed in an aluminum container for measurement, and DSC curve and DDSC curve in a nitrogen atmosphere were obtained by means of a DSC measuring apparatus (DSC6220, manufactured by Shimadzu Corporation). The measurement conditions were as follows:

(First Stage: Temperature Raising Program)

The temperature was raised, starting from 70° C., at a rate of 15° C. per minute and after reaching 110° C., maintained for 5 minutes.

(Second Stage: Temperature Lowering Program)

The temperature was lowered from 110° C. at a predetermined rate per minute and after reaching −50° C., maintained for a predetermined time.

In the temperature lowering program of the second stage, the temperature drop rate and the time for which the temperature of −50° C. is maintained are as follows.

Production Examples A1 and A2

Temperature drop rate: 40° C./min
Maintaining time: 5 minutes

Production Examples A3 to A23 and A25

Temperature drop rate: 30° C./min
Maintaining time: 4 minutes (Third Stage: Temperature Raising Program)

The temperature was raised from −50° C. at a rate of 15° C. per minute up to 130° C. During temperature rise of this third stage, DSC and DDSC data were obtained.

An intersection of a base line (a straight line obtained by extending the base line in the obtained DSC curve toward high temperature side) with a tangent line at an inflection point (a point at which a convex curve changes to a concave curve) was taken as the glass transition temperature (Tg).

(8) Gel Fraction of Thermoplastic Polymer (Toluene-Insoluble Matter, Production Examples A1 and A2)

On a Teflon (registered trademark) plate, a coating solution (nonvolatile content=from 38 to 42%, pH=9.0) of a thermoplastic polymer was dropped (diameter: 5 mm or less) with a pipette and dried by a hot-air dryer at 130° C. for 30 minutes. After the drying, about 0.5 g (a) of the dried film was accurately weighed and put in a 50-mL polyethylene container, and 30 mL of toluene was poured thereinto, followed by shaking at room temperature for 3 hours. The contents were then filtered through a 325 mesh, and the toluene-insoluble matter remaining on the mesh was dried together with the mesh by a hot-air dryer at 130° C. for one hour. The dry mass of the 325 mesh used herein had been previously measured.

After evaporating toluene, the dry mass (b) of the toluene-insoluble matter was obtained by subtracting the previously measured mass of the 325 mesh from the total mass of the dried toluene-insoluble matte and the 325 mesh. The gel fraction (toluene-insoluble matter) was calculated using the following calculation formula:

Gel fraction(toluene-insoluble matter) (%) of thermoplastic polymer=$(b)/(a) \times 100$ (9) Degree of Swelling (Times) of Thermoplastic Polymer in Electrolytic Solution A thermoplastic polymer or a solution having dispersed therein a thermoplastic polymer was allowed to stand still in an oven at 130° C. for one hour, and 0.5 g of the dried thermoplastic polymer was cut and placed in a 50-mL vial together with 10 g of a mixed solvent of predetermined components in a predetermined mixing ratio. After solvent penetration for a predetermined time, the sample was taken out, washed with the mixed solvent above, and measured for the mass (Wa). The sample was further allowed to stand still in an oven at 150° C. for one hour and measured for the mass (Wb), and the degree of swelling of the thermoplastic polymer in an electrolytic solution was measured according to the following formula:

Degree of swelling(times) of thermoplastic polymer in electrolytic solution=$(Wa-Wb)/(Wb)$ The components and mixing ratio of the mixed solvent above and the penetration time are as follows.

Mixing ratio: ethylene carbonate:ethyl methyl carbonate=1:2 (by volume)

Penetration time: 3 hours

(10) Method for Observing Polymer Layer (Voronoi Tessellation)

i) Evaluation Using 3 Visual Fields

Using a scanning electron microscope S-4800 (manufactured by Hitachi High-Technologies Corporation), the surface of the polymer layer on the separator was photographed in three visual fields at a magnification of 10,000 times or 30,000 times according to the particle diameter of the polymer particle. With respect to the particulate thermoplastic polymer included in these three visual fields, each of the area density, the dispersion ($\sigma^2$) of areas ($s_i$) of Voronoi polygons, and the ratio ($c_i/s_i$) between the projected area ($c_i$) and the area ($s_i$) of Voronoi polygon was obtained as an average value of three visual fields. The area density, the dispersion ($\sigma^2$) of areas ($s_i$) of Voronoi polygons, and the ratio ($c_i/s_i$) were automatically computed using an image processing software "A-ZO KUN" (registered trademark: produced by Asahi Kasei Engineering Corporation). A region that is not closed when carrying out Voronoi tessellation in the observation visual field is excluded from the target for calculating the Voronoi polygon area.

ii) Evaluation Using 95 Visual Fields

Using a scanning electron microscope S-4800 (manufactured by Hitachi High-Technologies Corporation), the surface of the polymer layer on the separator was photographed at a magnification of 10,000 times or 30,000 times according to the particle diameter of the polymer particle. Using the obtained image, 5 sections including 95 visual fields were set as depicted in FIGS. 5 and 6. With respect to the particulate thermoplastic polymer included in these 95 visual fields, each of the area density, the area density of Voronoi polygon, the dispersion ($\sigma^2$) of areas ($s_i$) of Voronoi polygons, and the ratio ($c_i/s_i$) between the projected area ($c_i$) and the area ($s_i$) of Voronoi polygon was obtained as an average value of 95 visual fields in the same manner as in i) above.

(11) Average Particle Diameter of Thermoplastic Polymer

The average particle diameter of the thermoplastic polymer was measured using a particle diameter measuring apparatus (Microtrac UPA150, manufactured by Nikkiso Co., Ltd.). The measurement conditions were a loading index=0.15 to 0.3 and a measurement time of 300 seconds, and the numerical value of the 50% particle diameter in the obtained data was shown as the particle diameter.

(12) Basis Weight of Polymer Layer (Amount of Polymer Layer Supported on Base Material)

A sample of 10 cm×10 cm square was cut out from the base material (polyolefin microporous film or polyolefin microporous film+inorganic filler porous layer) and measured for the mass by means of an electronic balance AEL-200 manufactured by Shimadzu Corporation. The obtained mass was multiplied by 100 to calculate the basis weight (g/m$^2$) of the base material per 1 m$^2$. The basis weight of the polymer per 1 m$^2$ (the amount of polymer layer supported on base material, g/m$^2$) was calculated by subtracting the basis weight (g/m$^2$) of the base material per 1 m$^2$ from the basis weight (g/m$^2$) of the separator per 1 m$^2$.

(13) Infrared Absorption Analysis of Copolymer

The copolymer was measured as follows by using an infrared absorption analyzer (product name: "FTS-60A/896UMA300") manufactured by BIO RAD.

A water dispersion liquid of the copolymer was vacuum-dried at 60° C. for 24 hours to obtain a white measurement sample, and the sample was pulverized in an agate mortar. Similar, KBr was prepared and ground in an agate mortar. The measurement sample and KB were sufficiently ground and mixed in an agate mortar by adding 0.5 mg of the measurement sample to 100 mg of KBr, and a tablet was then manufactured. This tablet was used as a sample and measured under the following conditions. Before the measurement, background measurement was carried out.

Measurement mode: microscopic transmission method
Detector: MCT
Beam splitter: KBr (potassium bromide)
Scanning speed: 20 kHz
Cumulative number: 64 times
Resolution: 4 cm$^{-1}$
Measurement wavelength: from 4,000 to 700 cm$^{-1}$ From the obtained infrared absorption spectrum, A(Ac), A(An) and A(Ar) were determined as follows, and an infrared absorption peak intensity ratio A(An)/A(Ac) or A(Ar)/A(Ac) was calculated.

A(Ac): the intensity of an infra red absorption peak exhibiting a highest intensity in the wavelength range of 1,720 to 1,750 cm$^{-1}$ A(An): the intensity of an infra red absorption peak exhibiting a highest intensity in the wavelength range of 2,220 to 2,260 cm$^{-1}$ A(Ar): the intensity of an infra red absorption peak exhibiting a highest intensity in the wavelength range of 740 to 770 cm$^{-1}$

(14) Heating Peel Strength

As an adherend, a positive electrode collector (aluminum foil produced by Fuji Impex Corp., thickness: 20 µm) was cut to a size of 30 mm×150 mm. A separator (size: width 20 mm, length: 100 mm) was immersed in an electrolytic solution (produced by Tomiyama Pure Chemical Industries, Ltd.) prepared by mixing ethylene carbonate and diethyl carbonate in a ratio of 2:3 (by volume), thoroughly wetted, and pulled up. The collector and the thoroughly wetted base material were laminated one on top of another, and the laminate was sandwiched between two Teflon (registered trademark) sheets (NAFLON PTFE Sheet TOMBO-No. 9000 (product name), produced by NICHIAS Corporation). The resulting laminate was pressed for 2 minutes under the conditions of 80° C. and 10 MPa and used as a sample for a heating peel strength test. The 90° peel strength between the separator and the collector of the obtained test sample was measured at a tensile speed of 50 mm/min by using Force Gauge ZP5N and MX2-500N (product names) manufactured by Imada Co., Ltd. and evaluated according to the following criteria.

Criteria for Evaluation of Heating Peel Strength:
AA (very good): The peel strength is 8 mN/mm or more.
A (good): The peel strength is 6 mN/mm or more, and less than 8 mN/mm.
B (fair): The peel strength is 4 mN/mm or more, and less than 6 mN/mm.
C (poor): The peel strength is less than 4 mN/mm.

(15) Evaluation of Adhesion of Separator

The adhesion was evaluated in the same manner as in "(14) Heating Peel Strength" except that the separator obtained in each of Examples and Comparative Examples was used in place of the base material and laminated together with the collector by arranging the polymer layer side thereof as the bonding surface.

(16) Rate Characteristics a. Manufacture of Positive Electrode 90.4 mass % of a nickel-manganese-cobalt composite oxide (NMC) (Ni:Mn:Co=1:1:1 (element ratio), density: 4.70 g/cm$^3$) as a positive electrode active material, 1.6 mass % of graphite powder (KS6) (density: 2.26 g/cm$^3$, number average particle diameter: 6.5 µm) and 3.8 mass % of acetylene black (AB) (density: 1.95 g/cm$^3$, number average particle diameter: 48 nm) as conductive aids, and 4.2 mass % of polyvinylidene fluoride (PVDF) (density: 1.75 g/cm$^3$) as a binder were mixed and dispersed in N-methylpyrrolidone (NMP) to prepare a slurry. The slurry was applied onto one surface of a 20 µm-thick aluminum foil working out to a positive electrode collector by means of a die coater, dried at 130° C. for 3 minutes and then compression-molded by a roll pressing machine to prepare a positive electrode. The amount of the positive electrode active material applied here was 109 g/m$^2$.

b. Manufacture of Negative Electrode 87.6 mass % of graphite powder A (density: 2.23 g/cm$^3$, number average particle diameter: 12.7 µm) and 9.7 mass of graphite powder B (density: 2.27 g/cm$^3$, number average particle diameter: 6.5 µm) as negative electrode active materials, and 1.4 mass % (in terms of solid content) of an ammonium salt of carboxymethyl cellulose (an aqueous solution having a solid content concentration of 1.83 mass %) and 1.7 mass % (in terms of solid content) of a diene rubber-based latex (an aqueous solution having a solid content concentration of 40 mass %) as binders, were dispersed in purified water to prepare a slurry. The slurry was applied onto one surface of a 12 μm-thick copper foil working out to a negative electrode collector by means of a die coater, dried at 120° C. for 3 minutes and then compression-molded by a roll pressing machine to prepare a negative electrode. The amount of the negative electrode active material applied here was 5.2 g/m².

c. Preparation of Nonaqueous Electrolytic Solution

A nonaqueous electrolyte was prepared by dissolving $LiPF_6$ as a solute in a mixed solvent of ethylene carbonate:ethyl methyl carbonate=1:2 (by volume) to provide a concentration of 1.0 mol/L.

d. Assembly of Battery

A base material as the separator is cut into a circular shape of 24 mmφ, and each of the positive electrode and the negative electrode was cut into a circular shape of 16 mmφ. The negative electrode, the separator and the positive electrode were stacked in this order by arranging the active material surfaces of the positive electrode and the negative electrode to face each other, and the laminate was housed in a stainless metal container with a cover. The container was insulated from the cover, and the container and the over were contacted with the copper foil of negative electrode and the aluminum foil of positive electrode, respectively. A battery was assembled by injecting 0.4 ml of the nonaqueous electrolytic solution above into the container and tightly sealing the container.

e. Evaluation of Rate Characteristics

The initial charge after the fabrication of a battery was carried out for a total of about 6 hours by the method where a simple battery assembled in d. is charged at 25° C. at a current value of 3 mA (about 0.5 C) to a battery voltage of 4.2 V and then the current value is throttled from 3 mA while maintaining the voltage at 4.2 V. The battery was thereafter discharged at a current value of 3 mA to a battery voltage of 3.0 V.

The charge was subsequently carried out for a total of about 3 hours by the method where the battery is charged at 25° C. at a current value of 6 mA (about 1.0 C) to a battery voltage of 4.2 V and then the current value was throttled from 6 mA while maintaining the voltage of 4.2 V. The battery was thereafter discharged at a current value of 6 mA to a battery voltage of 3.0 V, and the discharge capacity at this time was designated as a 1 C discharge capacity (mAh).

The charge was further carried out for a total of about 3 hours by the method where the battery is charged at 25° C. at a current value of 6 mA (about 1.0 C) to a battery voltage of 4.2 V and then the current value was throttled from 6 mA while maintaining the voltage of 4.2 V. The battery was thereafter discharged at a current value of 12 mA (about 2.0 C) to a battery voltage of 3.0 V, and the discharge capacity at this time was designated as a 2 C discharge capacity (mAh).

The ratio of 2 C discharge capacity to 1 C discharge capacity was calculated, and the value obtained was taken as rate characteristics.

Rate characteristics (%)=(2 C discharge capacity/1C discharge capacity)×100

Criteria for Evaluation of Rate Characteristics (%):

AA (very good): The rate characteristics is more than 90%.

A (good): The rate characteristics is more than 85% and 90% or less.

B (fair): The rate characteristics is more than 80% and 85% or less.

C (poor): The rate characteristics is 80% or less.

(17) Cycle Characteristics

A simple battery assembled in the same manner as in a. to d. of (17) except for using, as the separator, a separator obtained in each of Examples and Comparative Examples was evaluated for the cycle characteristics.

The battery above was subjected to constant-current charge at a current value of ⅓ C to a voltage of 4.2 V and then to constant-voltage charge at 4.2 V for 8 hours and discharged at a current of ⅓ C to a final voltage of 3.0 V. The battery was thereafter subjected to constant-current charge at a current value of 1 C to a voltage of 4.2 V and then to constant-voltage charge at 4.2 V for 3 hours and discharged at a current value of 1 C to a final voltage of 3.0 V. The battery was finally subjected to constant-current charge at a current value of 1 C to 4.2 V and then to constant-voltage charge at 4.2 V for 3 hours, thereby completing a pretreatment. "1 C" as used herein represents a current value for discharging the reference capacity of a battery in one hour.

The battery subjected to the pretreatment above was discharged under the condition of a temperature of 25° C. at a discharge current of 1 A to a discharge final voltage of 3 V and then charged at a charge current of 1 A to a charge final voltage of 4.2 V. Taking these as one cycle, charge and discharge were repeated. The cycle characteristics were evaluated according to the following criteria by using a capacity retention rate after 200 cycles relative to the initial capacity (the capacity at the first cycle).

Criteria for Evaluation of Cycle Characteristics

AA (very good): The capacity retention rate is from 95 to 100%.

A (good): The capacity retention rate is 90% or more and less than 95%.

B (fair): The capacity retention rate is 85% or more and less than 90%.

C (poor): The capacity retention rate is less than 85%.

(18) High-Temperature Storage Characteristics

A simple battery assembled in the same manner as in a. to d. of (16) except for using, as the separator, a separator obtained in each of Examples and Comparative Examples was evaluated for the high-temperature storage characteristics.

The charge was carried out for a total of 6 hours by the method where the battery above is charged in an atmosphere of 25° C. at a current value of 3 mA (about 0.5 C) to a battery voltage of 4.2 V and after reaching the voltage, the current value is throttled from 3 mA while maintaining 4.2 V. The battery was thereafter discharged at a current value of 3 mA to a battery voltage of 3.0 V.

The charge was subsequently carried out for a total of 3 hours by the method where the battery is charged in an atmosphere of 25° C. at a current value of 6 mA (about 1.0 C) to a battery voltage of 4.2 V and after reaching the voltage, the current value was throttled from 6 mA while maintaining 4.2 V. The battery was thereafter discharged at a current value of 6 mA to a battery voltage of 3.0 V, and the discharge capacity at this time was designated as A (mAh).

The charge was further carried out for a total of 3 hours by the method where the battery is charged in an atmosphere of 25° C. at a current value of 6 mA (about 1.0 C) to a battery voltage of 4.2 V and after reaching the voltage, the current value was throttled from 6 mA while maintaining 4.2 V. The cell kept in the charged state held in an atmosphere of 60° C. for 7 days. The cell was thereafter taken out, discharged in an atmosphere of 25° C. at a current value of 6 mA to a battery voltage of 3.0 V. The charge was subsequently carried out for a total of 3 hours by the method where the cell is charged in an atmosphere of 25° C. at a current value of 6 mA (about 1.0 C) to a battery voltage of 4.2 V and after reaching the voltage, the current value is throttled from 6 mA while maintaining 4.2 V. The cell was thereafter discharged at a current value of 6 mA to a battery voltage of 3.0 V, and the discharge capacity at this time was designated as B (mAh).

The high-temperature storage characteristics were evaluated according to the following criteria by using a ratio of B to A.

Criteria for Evaluation of High-Temperature Storage Characteristics

A (good): The ratio of B to A is 70% or more.
C (poor): The ratio of B to A is less than 70%.

(19) Oxidation Resistance

The oxidation resistance was evaluated by observing the degree of blackening of the separator surface after a trickle test using an NC cell.

Details are as follows.

Each of the separators obtained in Examples and Comparative Examples was cut into a size of 18 mmϕ, and each of the positive electrode and the negative electrode respectively manufactured in the same manner as in "(16) Rate Characteristics" above was cut into a circular shape of 16 mmϕ (disc). The positive electrode, the separator and the negative electrode were stacked in this order by arranging the active material surfaces of the positive electrode and the negative electrode to face each other, and the laminate was housed in a stainless metal container with a cover. The container was insulated from the cover, and the container and the cover were disposed to contact with the copper foil of negative electrode and the aluminum foil of positive electrode, respectively. A battery was manufactured by injecting the electrolytic solution above into the container and leaving it in this state at room temperature for one day. The electrolytic solution used here was prepared by dissolving $LiPF_6$ as a solute in a mixed solvent of ethylene carbonate/ethyl methyl carbonate=1/2 (by volume) to provide a concentration of 1.0 mol/L.

The charge was subsequently carried out for a total of 3 hours by the method where the battery above is charged in an atmosphere of 25° C. at a current value of 6 mA (1.0 C) to a battery voltage of 4.2 V and the current value was throttled from 6 mA while maintaining 4.2 V. The battery was thereafter discharged at a current value of 6 mA (1.0 C) to a battery voltage of 3.0 V. The charge was further carried out for a total of 3 hours by the method where the battery is charged in an atmosphere of 60° C. at a current value of 6 mA (1.0 C) to a battery voltage of 4.2 V and the current value was throttled from 6 mA while maintaining 4.2 V. After storage in an atmosphere of 60° C. for 4 days in the state of continuing the charge to maintain 4.2 V, the battery was discharged at a current value of 6 mA (1.0 C) to a battery voltage of 3.0 V. The separator was taken out from the battery and subjected to ultrasonic cleaning sequentially in dimethoxyethane, in ethanol and in 1 N hydrochloric acid, each for 15 minutes, for removing deposits. The separator was dried in air, and the oxidation resistance was evaluated by observing, visually, the degree of black discoloration of the water dispersion liquid-coated part of the separator on the side contacted with the positive electrode.

The oxidation resistance was judged as AA (very good) when the percentage proportion of the black discolored area per area is 5% or less, as A (good) when the proportion is more than 5% and 10% or less, and as C (poor) when the proportion is more than 10%.

<Production of Base Material>

Production Example B1

(Production of Base Material B1-1)

45 Parts by mass of a high-density polyethylene of a homopolymer with My of 700,000, 45 parts by mass of a high-density polyethylene of a homopolymer with My of 300,000, and 5 parts by mass of polypropylene of a homopolymer with My of 400,000 were dry blended using a tumbler blender.

To 99 parts by mass of the obtained polyolefin mixture, 1 part by mass of tetrakis-[methylene-(3',5'-di-tert-butyl-4'-hydroxyphenyl)propionate]methane was added as an antioxidant, and these were again dry blended using a tumbler blender to obtain a mixture.

The obtained mixture was fed to a twin-screw extruder by means of a feeder in a nitrogen atmosphere.

Liquid paraffin (kinetic viscosity at 37.78° C.: $7.59 \times 10^{-5}$ $m^2/s$) was also injected into the extruder cylinder by a plunger pump.

The operating conditions of the feeder and pump were adjusted to provide a proportion of liquid paraffin of 65 parts by mass and a polymer concentration of 35 parts by mass in the entire mixture extruded.

These were melt-kneaded in the twin-screw extruder under heating at 230° C., and the resulting melt-kneaded product was extruded via a T-die onto a cooling roll controlled to a surface temperature of 80° C. The extrudate put into contact with the cooling roll is molded (cast) and cooled/solidified to obtain a sheet of a molded product.

The sheet was stretched by a simultaneous biaxial stretching machine at a stretch ratio of 7×6.4 times at a temperature of 112° C. The stretched sheet was immersed in methylene chloride and after removing liquid paraffin by extraction, dried. The sheet was further stretched twofold in the transverse direction by a tenter stretching machine at a temperature of 130° C.

The resulting stretched sheet was heat-treated to provide a relaxation of about 10% in the width direction, and Base Material B1-1 as a polyolefin resin microporous film was thereby obtained.

Base Material B1-1 was measured for various physical properties by the methods above, and the results obtained are shown in Table 1.

Production Example B2

(Production of Base Material B2-1)

Base Material B1-1 was produced by the method above. 96.0 Parts by mass of aluminum oxide hydroxide (average particle diameter: 1.0 μm), 4.0 parts by mass of acryl latex (solid content concentration: 40%, average particle diameter: 145 nm, lowest film-deposition temperature: 0° C. or less), and 1.0 parts by mass of an aqueous ammonium polycarboxylate solution (SN Dispersant 5468, produced by San Nopco Limited) were uniformly dispersed in 100 parts by mass of water to prepare a coating solution. The coating solution was applied onto a surface of the polyolefin resin microporous film (Base Material B1-1) by using a gravure coater and then dried at 60° C. to remove water. Aluminum hydroxide (porous layer of an inorganic filler) was thus formed to a thickness of 2 μm on the polyolefin resin porous film (Base Material B1-1) to obtain Base Material B2-1.

Each of these base materials was measured for various physical properties by the methods above. The results obtained are shown in Table 1.

TABLE 1

|  | Polyolefin Microporous Film, No. | |
|---|---|---|
|  | B1-1 | B2-1 |
| Basis weight (g/m$^2$) | 7 | produced by applying aluminum hydroxide of 2 μm onto polyolefin microporous film B1-1 |
| Thickness (μm) | 12 | |
| Porosity (%) | 40 | |
| Air permeability (s/100 cc) | 150 | |
| Piercing strength (g) | 320 | |
| Average pore size (μm) | 0.075 | |
| Thickness of inorganic filler layer (μm) | — | 2 |
| Heating peel strength | C | C |
| Handling property of separator | A | A |
| Rate characteristics | AA | AA |

<Production of Raw Material Polymer>

Production Example A1: Synthesis of Water Dispersion (in the Table, Denoted by "Raw Material Polymer", Hereinafter the Same) A1

Into a reaction vessel equipped with a stirrer, a reflux condenser, a dropping tank and a thermometer, 70.4 parts by mass of ion exchange water, 0.5 parts by mass of "AQUALON KH1025" (registered trademark, produced by DKS Co. Ltd., an aqueous 25% solution; in the Table, denoted by "KH1025", hereinafter the same) and 0.5 parts by mass of "ADEKA REASOAP SR1025" (registered trademark, produced by ADEKA Corporation, an aqueous 25% solution; in the Table, denoted by "SR1025", hereinafter the same) were charged. The temperature inside the reaction vessel was raised to 80° C. and while maintaining the temperature of 80° C. inside the vessel, 7.5 parts by mass of ammonium persulfate (an aqueous 2% solution) (in the Table, denoted by "APS (aq)", hereinafter the same) was added.

A mixture of 38.5 parts by mass of methyl methacrylate (in the Table, denoted by "MMA", hereinafter the same), 19.6 parts by mass of n-butyl acrylate (in the Table, denoted by "BA", hereinafter the same), 31.9 parts by mass of 2-ethylhexyl acrylate (in the Table, denoted by "EHA", hereinafter the same), 0.1 parts by mass of methacrylic acid (in the Table, denoted by "MAA", hereinafter the same), 0.1 parts by mass of acrylic acid (in the Table, denoted by "AA", hereinafter the same), 2 parts by mass of 2-hydroxyethyl methacrylate (in the Table, denoted by "HEMA", hereinafter the same), 5 parts by mass of acrylamide (in the Table, denoted by "AM", hereinafter the same), 2.8 parts by mass of glycidyl methacrylate (in the Table, denoted by "GMA", hereinafter the same), 3 parts by mass of "AQUALON KH1025" (registered trademark, produced by DKS Co., Ltd., an aqueous 25% solution), 3 parts by mass of "ADEKA REASOAP SR1025" (registered trademark, produced by ADEKA Corporation, an aqueous 25% solution), 0.05 parts by mass of sodium p-styrenesulfonate (in the Table, denoted by "NaSS", hereinafter the same), 0.7 parts by mass of trimethylolpropane triacrylate (produced by Shin-Nakamura Chemical Co., Ltd.) (in the Table, denoted by "A-TMPT", hereinafter the same), 0.3 parts by mass of γ-methacryloxypropyltrimethoxysilane (in the Table, denoted by "MPTMS", hereinafter the same), 7.5 parts by mass of ammonium persulfate (an aqueous 2% solution), and 52 parts by mass of ion-exchanged water was mixed by a homomixer for 5 minutes to produce an emulsified liquid.

The resulting emulsified liquid was added dropwise to the reaction vessel from the dropping tank. The dropwise addition began 5 minutes after the addition of an aqueous ammonium persulfate solution to the reaction vessel, and the entirety of the emulsified liquid was added dropwise over 150 minutes. During the dropwise addition, the temperature inside the vessel was maintained at 80° C.

After the completion of dropwise addition of the emulsified liquid, the temperature inside the reaction vessel was maintained at 80° C. for 90 minutes, and the system was then cooled to room temperature to obtain an emulsion. The obtained emulsion was adjusted to pH=9.0 by using an aqueous ammonium hydroxide solution (an aqueous 25% solution) to obtain an acrylic copolymer latex at a concentration of 40 mass % (Raw Material Polymer A1). Raw Material Polymer (Water Dispersion) A1 was evaluated by the methods above. The results obtained are shown in Table 2.

Production Examples A2 to A18: Synthesis of Water Dispersions A2 to A18

Copolymer latexes (Raw Material Polymers A2 to A18) were obtained in the same manner as Raw Material Polymer (Water Dispersion) A1 except that the compositions of monomers and other raw materials used were changed as shown in Table 2. Raw Material Polymers (Water Dispersions) A2 to A18 were evaluated by the methods above. The results obtained are shown in Table 2.

TABLE 2

| Class | | Name of Raw Material | Active Component or Unit | Raw Material Polymer | | | | | |
|---|---|---|---|---|---|---|---|---|---|
| | | | | A1 | A2 | A3 | A4 | A5 | A6 |
| Initial supply | Emulsifier | KH1025 | 25% | 0.5 | 0.34 | 0.50 | 0.50 | 0.50 | 0.50 |
| | | SR1025 | 25% | 0.5 | 0.34 | 0.50 | 0.50 | 0.50 | 0.50 |
| | | Ion-exchanged water | — | 70.4 | 70.4 | 70.4 | 70.4 | 70.4 | 70.4 |
| | Initiator | APS (aq) | 2% | 7.5 | 7.5 | 7.5 | 7.5 | 7.5 | 7.5 |
| Emulsified liquid | Acid monomer | MAA | 100% | 0.1 | 0.1 | 1 | 1 | 1 | 1 |
| | | AA | 100% | 0.1 | 0.1 | 1 | 1 | 1 | 1 |
| | (Meth)acrylic acid ester | MMA | 100% | 38.5 | 71.5 | 0 | 0 | 0 | 0 |
| | | BA | 100% | 19.6 | 18.9 | 0 | 0 | 0 | 10 |
| | | BMA | 100% | 0 | 0 | 0 | 0 | 5 | 0 |
| | | EHA | 100% | 31.9 | 2 | 10 | 10 | 5 | 0 |
| | | CHMA | 100% | 0 | 0 | 83 | 33 | 5 | 68 |

TABLE 2-continued

|  | Class | Name of Raw Material | Active Component or Unit |  |  |  |  |  |
|---|---|---|---|---|---|---|---|---|
|  | Aromatic vinyl monomer | St | 100% | 0 | 0 | 0 | 0 | 0 | 0 |
|  | Cyano group-containing monomer | AN | 100% | 0 | 0 | 5 | 55 | 83 | 20 |
|  | Functional group-containing monomer | HEMA | 100% | 2 | 2 | 0 | 0 | 0 | 0 |
|  |  | AM | 100% | 5 | 5 | 0 | 0 | 0 | 0 |
|  | Crosslinking monomer | GMA | 100% | 2.8 | 0.4 | 0 | 0 | 0 | 0 |
|  |  | A-TMPT | 100% | 0.7 | 0.4 | 1 | 1 | 1 | 1 |
|  |  | AcSi | 100% | 0.3 | 0.3 | 0.5 | 0.5 | 0.5 | 0.5 |
|  | Emulsifier | KH1025 | 25% | 3 | 3 | 2 | 2 | 2 | 2 |
|  |  | SR1025 | 25% | 3 | 3 | 0 | 0 | 0 | 0 |
|  |  | NaSS | 100% | 0.05 | 0.05 | 0 | 0 | 0 | 0 |
|  | Initiator | APS (aq) | 2% | 7.5 | 7.5 | 7.5 | 7.5 | 7.5 | 7.5 |
|  | Ion-exchanged water |  | — | 52 | 52 | 52 | 52 | 52 | 52 |
| Physical properties | Glass transition temperature Tg |  | (° C.) | −6 | 55 | 47.4 | 61.8 | 79.3 | 54.9 |
|  | Particle diameter (50% particle diameter) |  | (nm) | 132 | 144 | 150 | 150 | 150 | 150 |
|  | Toluene-insoluble matter |  | (%) | 96% | 96% | — | — | — | — |
|  | Degree of swelling with electrolyte solvent |  | (times) | 2.5 | 2.4 | 2.5 | 5 | 6 | 3 |
|  | Infrared absorption peak intensity ratio | A(An)/A(Ac) |  | — | — | 0.015 | 0.188 | 0.284 | 0.067 |
|  |  | A(Ac)/A(Ar) |  | — | — | — | — | — | — |

|  | Class | Name of Raw Material | Active Component or Unit | Raw Material Polymer |  |  |  |  |
|---|---|---|---|---|---|---|---|---|
|  |  |  |  | A7 | A8 | A9 | A10 | A11 |
| Initial supply | Emulsifier | KH1025 | 25% | 0.50 | 0.50 | 0.50 | 0.50 | 0.50 |
|  |  | SR1025 | 25% | 0.50 | 0.50 | 0.50 | 0.50 | 0.50 |
|  | Ion-exchanged water |  | — | 70.4 | 70.4 | 70.4 | 70.4 | 70.4 |
|  | Initiator | APS (aq) | 2% | 7.5 | 7.5 | 7.5 | 7.5 | 7.5 |
| Emulsified liquid | Acid monomer | MAA | 100% | 1 | 1 | 1 | 1.0 | 1.0 |
|  |  | AA | 100% | 1 | 1 | 1 | 1.0 | 1.0 |
|  | (Meth)acrylic acid ester | MMA | 100% | 5 | 5 | 51 | 20 | 48 |
|  |  | BA | 100% | 0 | 5 | 37 | 0 | 0 |
|  |  | BMA | 100% | 0 | 5 | 0 | 0 | 0 |
|  |  | EHA | 100% | 48 | 5 | 0 | 0 | 0 |
|  |  | CHMA | 100% | 35 | 78 | 0 | 0 | 0 |
|  | Aromatic vinyl monomer | St | 100% | 0 | 0 | 0 | 78 | 50 |
|  | Cyano group-containing monomer | AN | 100% | 10 | 0 | 10 | 0 | 0 |
|  | Functional group-containing monomer | HEMA | 100% | 0 | 0 | 0 | 0 | 0 |
|  |  | AM | 100% | 0 | 0 | 0 | 0 | 0 |
|  | Crosslinking monomer | GMA | 100% | 0 | 0 | 0 | 0 | 0 |
|  |  | A-TMPT | 100% | 1 | 1 | 1 | 1.0 | 1.0 |
|  |  | AcSi | 100% | 0.5 | 0.5 | 0.5 | 0.5 | 0.5 |
|  | Emulsifier | KH1025 | 25% | 2 | 2 | 2 | 2.0 | 2.0 |
|  |  | SR1025 | 25% | 0 | 0 | 0 | 0 | 0 |
|  |  | NaSS | 100% | 0 | 0 | 0 | 0 | 0 |
|  | Initiator | APS (aq) | 2% | 7.5 | 7.5 | 7.5 | 7.5 | 7.5 |
|  | Ion-exchanged water |  | — | 52 | 52 | 52 | 52 | 52 |
| Physical properties | Glass transition temperature Tg |  | (° C.) | −11.6 | 46.8 | 24.8 | 95 | 95 |
|  | Particle diameter (50% particle diameter) |  | (nm) | 150 | 150 | 150 | 150 | 150 |
|  | Toluene-insoluble matter |  | (%) | — | — | — | — | — |
|  | Degree of swelling with electrolyte solvent |  | (times) | 3 | 3 | 6.5 | 3.6 | 4.4 |
|  | Infrared absorption peak intensity ratio | A(An)/A(Ac) |  | 0.033 | 0 | 0.033 | — | — |
|  |  | A(Ac)/A(Ar) |  | — | — | — | 2 | 5 |

TABLE 2-continued

| Class | Name of Raw Material | Active Component or Unit | A12 | A13 | A14 | A15 | A16 |
|---|---|---|---|---|---|---|---|
| Initial supply | | | | | | | |
| Emulsifier | KH1025 | 25% | 0.50 | 0.50 | 0.50 | 0.50 | 0.50 |
| | SR1025 | 25% | 0.50 | 0.50 | 0.50 | 0.50 | 0.50 |
| | Ion-exchanged water | — | 70.4 | 70.4 | 70.4 | 70.4 | 70.4 |
| Initiator | APS (aq) | 2% | 7.5 | 7.5 | 7.5 | 7.5 | 7.5 |
| Emulsified liquid | | | | | | | |
| Acid monomer | MAA | 100% | 1.0 | 1.0 | 1.0 | 1.0 | 1.0 |
| | AA | 100% | 1.0 | 1.0 | 1.0 | 1.0 | 1.0 |
| (Meth)acrylic acid ester | MMA | 100% | 66 | 88 | 58 | 58 | 38 |
| | BA | 100% | 0 | 0 | 20 | 0 | 60 |
| | BMA | 100% | 0 | 0 | 0 | 0 | 0 |
| | EHA | 100% | 0 | 0 | 0 | 20 | 0 |
| | CHMA | 100% | 0 | 0 | 0 | 0 | 0 |
| Aromatic vinyl monomer | St | 100% | 32 | 10 | 10 | 10 | 0 |
| Cyano group-containing monomer | AN | 100% | 0 | 0 | 0 | 0 | 0 |
| Functional group-containing monomer | HEMA | 100% | 0 | 0 | 0 | 0 | 0 |
| | AM | 100% | 0 | 0 | 0 | 0 | 0 |
| Crosslinking monomer | GMA | 100% | 0 | 0 | 0 | 0 | 0 |
| | A-TMPT | 100% | 1.0 | 1.0 | 1.0 | 1.0 | 1.0 |
| | AcSi | 100% | 0.5 | 0.5 | 0.5 | 0.5 | 0.5 |
| Emulsifier | KH1025 | 25% | 2.0 | 2.0 | 2.0 | 2.0 | 2.0 |
| | SR1025 | 25% | 0 | 0 | 0 | 0 | 0 |
| | NaSS | 100% | 0 | 0 | 0 | 0 | 0 |
| Initiator | APS (aq) | 2% | 7.5 | 7.5 | 7.5 | 7.5 | 7.5 |
| | Ion-exchanged water | — | 52 | 52 | 52 | 52 | 52 |
| Physical properties | | | | | | | |
| Glass transition temperature Tg | | (° C.) | 95 | 95 | 57 | 55 | −10 |
| Particle diameter (50% particle diameter) | | (nm) | 150 | 150 | 140 | 140 | 165 |
| Toluene-insoluble matter | | (%) | — | — | — | — | — |
| Degree of swelling with electrolyte solvent | | (times) | 4.8 | 5.0 | 3.8 | 4.4 | 6.0 |
| Infrared absorption peak intensity ratio | | A(An)/A(Ac) | — | — | — | — | — |
| | | A(Ac)/A(Ar) | 8 | 12 | 12 | 12 | 19 |

| Class | Name of Raw Material | Active Component or Unit | A17 | A18 | A19 | A20 | A21 |
|---|---|---|---|---|---|---|---|
| Initial supply | | | | | | | |
| Emulsifier | KH1025 | 25% | 0.50 | 0.50 | 0.50 | 0.50 | 0.50 |
| | SR1025 | 25% | 0.50 | 0.50 | 0.50 | 0.50 | 0.50 |
| | Ion-exchanged water | — | 70.4 | 70.4 | 70.4 | 70.4 | 70.4 |
| Initiator | APS (aq) | 2% | 7.5 | 7.5 | 7.5 | 7.5 | 7.5 |
| Emulsified liquid | | | | | | | |
| Acid monomer | MAA | 100% | 1.0 | 1.0 | 1.0 | 1.0 | 1.0 |
| | AA | 100% | 1.0 | 1.0 | 1.0 | 1.0 | 1.0 |
| (Meth)acrylic acid ester | MMA | 100% | 80 | 48 | 88 | 88 | 88 |
| | BA | 100% | 18 | 20 | 0 | 0 | 0 |
| | BMA | 100% | 0 | 0 | 0 | 0 | 0 |
| | EHA | 100% | 0 | 20 | 0 | 0 | 0 |
| | CHMA | 100% | 0 | 0 | 0 | 0 | 0 |
| Aromatic vinyl monomer | St | 100% | 0 | 10 | 10 | 10 | 10 |
| Cyano group-containing monomer | AN | 100% | 0 | 0 | 0 | 0 | 0 |
| Functional group-containing monomer | HEMA | 100% | 0 | 0 | 0 | 0 | 0 |
| | AM | 100% | 0 | 0 | 0 | 0 | 0 |
| Crosslinking monomer | GMA | 100% | 0 | 0 | 0 | 0 | 0 |
| | A-TMPT | 100% | 1.0 | 1.0 | 1.0 | 1.0 | 1.0 |
| | AcSi | 100% | 0.5 | 0.5 | 0.5 | 0.5 | 0.5 |
| Emulsifier | KH1025 | 25% | 2.0 | 2.0 | 4.5 | 6.0 | 8.0 |
| | SR1025 | 25% | 0 | 0 | 0 | 0 | 0 |
| | NaSS | 100% | 0 | 0 | 0 | 0 | 0 |
| Initiator | APS (aq) | 2% | 7.5 | 7.5 | 9.0 | 9.0 | 9.0 |
| | Ion-exchanged water | — | 52 | 52 | 52 | 52 | 52 |

TABLE 2-continued

| Physical properties | Glass transition temperature Tg | (° C.) | 62 | 60 | 95 | 95 | 95 |
|---|---|---|---|---|---|---|---|
| | Particle diameter (50% particle diameter) | (nm) | 155 | 160 | 100 | 70 | 50 |
| | Toluene-insoluble matter | (%) | — | — | — | — | — |
| | Degree of swelling with electrolyte solvent | (times) | 6.8 | 4.8 | 5.0 | 4.9 | 4.7 |
| | Infrared absorption peak intensity ratio | A(An)/A(Ac) | — | — | — | — | — |
| | | A(Ac)/A(Ar) | 19 | 12 | 12 | 12 | 12 |

Production Example A2-1

A portion of Water Dispersion A2 obtained in Production Example A2 was taken aside and used as a seed polymer in carrying out multi-stage polymerization to synthesized Water Dispersion A2-1.

20 Parts by mass in terms of solid content of Water Dispersion A2 was charged into a reaction vessel equipped with a stirrer, a reflux condenser, a dropping tank and a thermometer, and the temperature inside the reaction vessel was raised to 80° C. While maintaining the temperature of 80° C. inside the vessel, 7.5 parts by mass of ammonium persulfate (an aqueous 2% solution) was added. This completes the initial supply.

A mixture of 71.5 parts by mass of methyl methacrylate, 18.9 parts by mass of n-butyl acrylate, 2 parts by mass of 2-ethylhexyl acrylate, 0.1 parts by mass of methacrylic acid, 0.1 parts by mass of acrylic acid, 2 parts by mass of 2-hydroxyethyl methacrylate, 5 parts by mass of acrylamide, 0.4 parts by mass of glycidyl methacrylate, 3 parts by mass of AQUALON KH1025 (registered trademark, an aqueous 25% solution), 3 parts by mass of ADEKA REASOAP SR1025 (registered trademark, an aqueous 25% solution), 0.05 parts by mass of sodium p-styrenesulfonate, 0.4 parts by mass of trimethylolpropane triacrylate, 0.3 parts by mass of γ-methacryloxypropyltrimethoxysilane, 7.5 parts by mass of ammonium persulfate (an aqueous 2% solution), and 52 parts by mass of ion-exchanged water was mixed by a homomixer for 5 minutes to produce an emulsified liquid.

The resulting emulsified liquid was added dropwise to the reaction vessel from the dropping tank. The dropwise addition began 5 minutes after the addition of an aqueous ammonium persulfate solution to the reaction vessel, and the entirety of the emulsified liquid was added dropwise over 150 minutes. During the dropwise addition of the emulsified liquid, the temperature inside the vessel was maintained at 80° C.

After the completion of dropwise addition of the emulsified liquid, the temperature inside the reaction vessel was maintained at 80° C. for 90 minutes, and the system was then cooled to room temperature to obtain an emulsion. The obtained emulsion was adjusted to pH=9.0 by using an aqueous ammonium hydroxide solution (an aqueous 25% solution) to obtain an acrylic copolymer latex at a concentration of 40 mass % (Raw Material Polymer A2-1). Raw Material Polymer (Water Dispersion) A1 was evaluated by the methods above. The results obtained are shown in Table 2.

Production Examples A2-2 to A18-2

Each copolymer latex was obtained by multi-stage polymerization in the same manner as Raw Material Polymer (Water Dispersion) A2-1 except that the compositions of seed polymer, monomers and other raw materials used were changed as shown in Table 3. Each of the obtained raw material polymers (water dispersions) was evaluated by the methods above. The results obtained are shown in Table 3.

TABLE 3

| | Class | Name of Raw Material | Active Component or Unit | A2-1 | A2-2 | A2-3 | A3-1 | A3-2 | A4-1 | A4-2 |
|---|---|---|---|---|---|---|---|---|---|---|
| Initial supply | Species of seed polymer | | — | A2 | A2-1 | A2-2 | A3 | A3-1 | A4 | A4-1 |
| | Diameter of seed polymer | | (nm) | 144 | 270 | 550 | 150 | 280 | 150 | 280 |
| | Amount of seed polymer | | 100% | 20 | 13 | 22 | 20 | 13 | 20 | 13 |
| | Ion-exchanged water | | — | 70.4 | 70.4 | 70.4 | 70.4 | 70.4 | 70.4 | 70.4 |
| | Initiator | APS (aq) | 2% | 7.5 | 7.5 | 7.5 | 75 | 7.5 | 7.5 | 7.5 |
| Emulsified liquid | Acid monomer | MAA | 100% | 0.1 | 0.1 | 0.1 | 1 | 1 | 1 | 1 |
| | | AA | 100% | 0.1 | 0.1 | 0.1 | 1 | 1 | 1 | 1 |
| | (Meth)acrylic acid ester | MMA | 100% | 71.5 | 71.5 | 71.5 | 0 | 0 | 0 | 0 |
| | | BA | 100% | 18.9 | 18.9 | 18.9 | 0 | 0 | 0 | 0 |
| | | BMA | 100% | 0 | 0 | 0 | 0 | 0 | 0 | 0 |
| | | EHA | 100% | 2 | 2 | 2 | 10 | 10 | 10 | 10 |
| | | CHMA | 100% | 0 | 0 | 0 | 83 | 83 | 33 | 33 |
| | Aromatic vinyl monomer | St | 100% | 0 | 0 | 0 | 0 | 0 | 0 | 0 |
| | Cyano group-containing monomer | AN | 100% | 0 | 0 | 0 | 5 | 5 | 55 | 55 |
| | Functional group-containing monomer | HEMA | 100% | 2 | 2 | 2 | 0 | 0 | 0 | 0 |
| | | AM | 100% | 5 | 5 | 5 | 0 | 0 | 0 | 0 |

TABLE 3-continued

| | | | | | | | | | | |
|---|---|---|---|---|---|---|---|---|---|---|
| | Crosslinking monomer | GMA | 100% | 0.4 | 0.4 | 0.4 | 0 | 0 | 0 | 0 |
| | | A-TMPT | 100% | 0.4 | 0.4 | 0.4 | 1 | 1 | 1 | 1 |
| | | AcSi | 100% | 0.3 | 0.3 | 0.3 | 0.5 | 0.5 | 0.5 | 0.5 |
| | Emulsifier | KH1025 | 25% | 3 | 3 | 3 | 2 | 2 | 2 | 2 |
| | | SR1025 | 25% | 3 | 3 | 3 | 0 | 0 | 0 | 0 |
| | | NaSS | 100% | 0.05 | 0.05 | 0.05 | 0 | 0 | 0 | 0 |
| | Initiator | APS (aq) | 2% | 7.5 | 7.5 | 7.5 | 7.5 | 7.5 | 7.5 | 7.5 |
| | Ion-exchanged water | | — | 52 | 52 | 52 | 52 | 52 | 52 | 52 |
| Physical properties | Glass transition temperature Tg | | (° C.) | 55 | 55 | 55 | 47.4 | 47.4 | 61.8 | 61.8 |
| | Particle diameter (50% particle diameter) | | (nm) | 270 | 550 | 970 | 280 | 580 | 280 | 590 |
| | Toluene-insoluble matter | | (%) | 96% | 96% | 96% | — | — | — | — |
| | Degree of swelling with Electrolyte solvent | | (times) | 2.4 | 2.4 | 2.4 | 2.5 | 2.5 | 5 | 5 |
| | Infrared absorption peak intensity ratio | | A(An)/A(Ac) | — | — | — | 0.015 | 0.015 | 0.188 | 0.188 |
| | | | A(Ac)/A(Ar) | — | — | — | — | — | — | — |

| | | Name of Raw | Active Component | Raw Material Polymer | | | | | |
|---|---|---|---|---|---|---|---|---|---|
| | Class | Material | or Unit | A5-1 | A5-2 | A6-1 | A6-2 | A8-1 | A8-2 |
| Initial supply | Species of seed polymer | | — | A5 | A5-1 | A6 | A6-1 | A8 | A8-1 |
| | Diameter of seed polymer | | (nm) | 150 | 280 | 150 | 280 | 150 | 280 |
| | Amount of seed polymer | | 100% | 20 | 13 | 20 | 13 | 20 | 13 |
| | Ion-exchanged water | | — | 70.4 | 70.4 | 70.4 | 70.4 | 70.4 | 70.4 |
| | Initiator | APS (aq) | 2% | 7.5 | 7.5 | 7.5 | 7.5 | 7.5 | 7.5 |
| Emulsified liquid | Acid monomer | MAA | 100% | 1 | 1 | 1 | 1 | 1 | 1 |
| | | AA | 100% | 1 | 1 | 1 | 1 | 1 | 1 |
| | (Meth)acrylic acid ester | MMA | 100% | 0 | 0 | 0 | 0 | 5 | 5 |
| | | BA | 100% | 0 | 0 | 10 | 10 | 5 | 5 |
| | | BMA | 100% | 5 | 5 | 0 | 0 | 5 | 5 |
| | | EHA | 100% | 5 | 5 | 0 | 0 | 5 | 5 |
| | | CHMA | 100% | 5 | 5 | 68 | 68 | 78 | 78 |
| | Aromatic vinyl monomer | St | 100% | 0 | 0 | 0 | 0 | 0 | 0 |
| | Cyano group-containing monomer | AN | 100% | 83 | 83 | 20 | 20 | 0 | 0 |
| | Functional group-containing monomer | HEMA | 100% | 0 | 0 | 0 | 0 | 0 | 0 |
| | | AM | 100% | 0 | 0 | 0 | 0 | 0 | 0 |
| | Crosslinking monomer | GMA | 100% | 0 | 0 | 0 | 0 | 0 | 0 |
| | | A-TMPT | 100% | 1 | 1 | 1 | 1 | 1 | 1 |
| | | AcSi | 100% | 0.5 | 0.5 | 0.5 | 0.5 | 0.5 | 0.5 |
| | Emulsifier | KH1025 | 25% | 2 | 2 | 2 | 2 | 2 | 2 |
| | | SR1025 | 25% | 0 | 0 | 0 | 0 | 0 | 0 |
| | | NaSS | 100% | 0 | 0 | 0 | 0 | 0 | 0 |
| | Initiator | APS (aq) | 2% | 7.5 | 7.5 | 7.5 | 7.5 | 7.5 | 7.5 |
| | Ion-exchanged water | | — | 52 | 52 | 52 | 52 | 52 | 52 |
| Physical properties | Glass transition temperature Tg | | (° C.) | 79.3 | 79.3 | 54.9 | 54.9 | 46.8 | 46.8 |
| | Particle diameter (50% particle diameter) | | (nm) | 280 | 580 | 280 | 580 | 280 | 580 |
| | Toluene-insoluble matter | | (%) | — | — | — | — | — | — |
| | Degree of swelling with Electrolyte solvent | | (times) | 6 | 6 | 3 | 3 | 3 | 3 |
| | Infrared absorption peak intensity ratio | | A(An)/A(Ac) | 0.284 | 0.284 | 0.067 | 0.067 | 0 | 0 |
| | | | A(Ac)/A(Ar) | — | — | — | — | — | — |

| | | Name of Raw | Active Component | Raw Material Polymer | | | | | |
|---|---|---|---|---|---|---|---|---|---|
| | Class | Material | or Unit | A9-1 | A9-2 | A10-1 | A10-2 | A11-1 | A11-2 |
| Initial supply | Species of seed polymer | | — | A9 | A9-1 | A10 | A10-1 | A11 | A11-1 |
| | Diameter of seed polymer | | (nm) | 150 | 280 | 150 | 280 | 150 | 290 |
| | Amount of seed polymer | | 100% | 20 | 13 | 20 | 13 | 20 | 13 |
| | Ion-exchanged water | | — | 70.4 | 70.4 | 70.4 | 70.4 | 70.4 | 70.4 |
| | Initiator | APS (aq) | 2% | 7.5 | 7.5 | 7.5 | 7.5 | 7.5 | 7.5 |
| Emulsified liquid | Acid monomer | MAA | 100% | 1 | 1 | 1.0 | 1.0 | 1.0 | 1.0 |
| | | AA | 100% | 1 | 1 | 1.0 | 1.0 | 1.0 | 1.0 |
| | (Meth)acrylic acid ester | MMA | 100% | 51 | 51 | 20 | 20 | 48 | 48 |
| | | BA | 100% | 37 | 37 | 0 | 0 | 0 | 0 |

TABLE 3-continued

| Class | | Name of Raw Material | Active Component or Unit | | | | | | |
|---|---|---|---|---|---|---|---|---|---|
| | | BMA | 100% | 0 | 0 | 0 | 0 | 0 | 0 |
| | | EHA | 100% | 0 | 0 | 0 | 0 | 0 | 0 |
| | | CHMA | 100% | 0 | 0 | 0 | 0 | 0 | 0 |
| | Aromatic vinyl monomer | St | 100% | 0 | 0 | 78 | 78 | 50 | 50 |
| | Cyano group-containing monomer | AN | 100% | 10 | 10 | 0 | 0 | 0 | 0 |
| | Functional group-containing monomer | HEMA | 100% | 0 | 0 | 0 | 0 | 0 | 0 |
| | | AM | 100% | 0 | 0 | 0 | 0 | 0 | 0 |
| | Crosslinking monomer | GMA | 100% | 0 | 0 | 0 | 0 | 0 | 0 |
| | | A-TMPT | 100% | 1 | 1 | 1.0 | 1.0 | 1.0 | 1.0 |
| | | AcSi | 100% | 0.5 | 0.5 | 0.5 | 0.5 | 0.5 | 0.5 |
| | Emulsifier | KH1025 | 25% | 2 | 2 | 2.0 | 2.0 | 2.0 | 2.0 |
| | | SR1025 | 25% | 0 | 0 | 0 | 0 | 0 | 0 |
| | | NaSS | 100% | 0 | 0 | 0 | 0 | 0 | 0 |
| | Initiator | APS (aq) | 2% | 7.5 | 7.5 | 7.5 | 7.5 | 7.5 | 7.5 |
| | | Ion-exchanged water | — | 52 | 52 | 52 | 52 | 52 | 52 |
| Physical properties | Glass transition temperature Tg | | (° C.) | 24.8 | 24.8 | 95 | 95 | 95 | 95 |
| | Particle diameter (50% particle diameter) | | (nm) | 280 | 590 | 280 | 580 | 290 | 600 |
| | Toluene-insoluble matter | | (%) | — | — | — | — | — | — |
| | Degree of swelling with Electrolyte solvent | | (times) | 6.5 | 6.5 | 3.6 | 3.6 | 4.4 | 4.4 |
| | Infrared absorption peak intensity ratio | | A(An)/A(Ac) | 0.033 | 0.033 | — | — | — | — |
| | | | A(Ac)/A(Ar) | — | — | 2 | 2 | 5 | 5 |

| Class | | Name of Raw Material | Active Component or Unit | Raw Material Polymer | | | | | |
|---|---|---|---|---|---|---|---|---|---|
| | | | | A12-1 | A12-2 | A13-1 | A13-2 | A14-1 | A14-2 |
| Initial supply | Species of seed polymer | | — | A12 | A12-1 | A13 | A13-1 | A14 | A14-1 |
| | Diameter of seed polymer | | (nm) | 150 | 280 | 150 | 280 | 140 | 260 |
| | Amount of seed polymer | | 100% | 20 | 13 | 20 | 13 | 20 | 13 |
| | Ion-exchanged water | | — | 70.4 | 70.4 | 70.4 | 70.4 | 70.4 | 70.4 |
| | Initiator | APS (aq) | 2% | 7.5 | 7.5 | 7.5 | 7.5 | 7.5 | 7.5 |
| Emulsified liquid | Acid monomer | MAA | 100% | 1.0 | 1.0 | 1.0 | 1.0 | 1.0 | 1.0 |
| | | AA | 100% | 1.0 | 1.0 | 1.0 | 1.0 | 1.0 | 1.0 |
| | (Meth)acrylic acid ester | MMA | 100% | 66 | 66 | 88 | 88 | 58 | 58 |
| | | BA | 100% | 0 | 0 | 0 | 0 | 20 | 20 |
| | | BMA | 100% | 0 | 0 | 0 | 0 | 0 | 0 |
| | | EHA | 100% | 0 | 0 | 0 | 0 | 0 | 0 |
| | | CHMA | 100% | 0 | 0 | 0 | 0 | 0 | 0 |
| | Aromatic vinyl monomer | St | 100% | 32 | 32 | 10 | 10 | 10 | 10 |
| | Cyano group-containing monomer | AN | 100% | 0 | 0 | 0 | 0 | 0 | 0 |
| | Functional group-containing monomer | HEMA | 100% | 0 | 0 | 0 | 0 | 0 | 0 |
| | | AM | 100% | 0 | 0 | 0 | 0 | 0 | 0 |
| | Crosslinking monomer | GMA | 100% | 0 | 0 | 0 | 0 | 0 | 0 |
| | | A-TMPT | 100% | 1.0 | 1.0 | 1.0 | 1.0 | 1.0 | 1.0 |
| | | AcSi | 100% | 0.5 | 0.5 | 0.5 | 0.5 | 0.5 | 0.5 |
| | Emulsifier | KH1025 | 25% | 2.0 | 2.0 | 2.0 | 2.0 | 2.0 | 2.0 |
| | | SR1025 | 25% | 0 | 0 | 0 | 0 | 0 | 0 |
| | | NaSS | 100% | 0 | 0 | 0 | 0 | 0 | 0 |
| | Initiator | APS (aq) | 2% | 7.5 | 7.5 | 7.5 | 7.5 | 7.5 | 7.5 |
| | | Ion-exchanged water | — | 52 | 52 | 52 | 52 | 52 | 52 |
| Physical properties | Glass transition temperature Tg | | (° C.) | 95 | 95 | 95 | 95 | 57 | 57 |
| | Particle diameter (50% particle diameter) | | (nm) | 280 | 590 | 280 | 580 | 260 | 550 |
| | Toluene-insoluble matter | | (%) | — | — | — | — | — | — |
| | Degree of swelling with Electrolyte solvent | | (times) | 4.8 | 4.8 | 5.0 | 5.0 | 3.8 | 3.8 |
| | Infrared absorption peak intensity ratio | | A(An)/A(Ac) | — | — | — | — | — | — |
| | | | A(Ac)/A(Ar) | 8 | 8 | 12 | 12 | 12 | 12 |

TABLE 3-continued

| | Name of Raw | Active Component | Raw Material Polymer | | | | | |
|---|---|---|---|---|---|---|---|---|
| | Class | Material | or Unit | A15-1 | A15-2 | A17-1 | A17-2 | A18-1 | A18-2 |
| Initial supply | Species of seed polymer | | — | A15 | A15-1 | A17 | A17-1 | A18 | A18-1 |
| | Diameter of seed polymer | | (nm) | 140 | 260 | 155 | 280 | 160 | 280 |
| | Amount of seed polymer | | 100% | 20 | 13 | 20 | 13 | 20 | 13 |
| | Ion-exchanged water | | — | 70.4 | 70.4 | 70.4 | 70.4 | 70.4 | 70.4 |
| | Initiator | APS (aq) | 2% | 7.5 | 7.5 | 7.5 | 7.5 | 7.5 | 7.5 |
| Emulsified liquid | Acid monomer | MAA | 100% | 1.0 | 1.0 | 1.0 | 1.0 | 1.0 | 1.0 |
| | | AA | 100% | 1.0 | 1.0 | 1.0 | 1.0 | 1.0 | 1.0 |
| | (Meth)acrylic acid ester | MMA | 100% | 58 | 58 | 80 | 80 | 48 | 48 |
| | | BA | 100% | 0 | 0 | 18 | 18 | 20 | 20 |
| | | BMA | 100% | 0 | 0 | 0 | 0 | 0 | 0 |
| | | EHA | 100% | 20 | 20 | 0 | 0 | 20 | 20 |
| | | CHMA | 100% | 0 | 0 | 0 | 0 | 0 | 0 |
| | Aromatic vinyl monomer | St | 100% | 10 | 10 | 0 | 0 | 10 | 10 |
| | Cyano group-containing monomer | AN | 100% | 0 | 0 | 0 | 0 | 0 | 0 |
| | Functional group-containing monomer | HEMA | 100% | 0 | 0 | 0 | 0 | 0 | 0 |
| | | AM | 100% | 0 | 0 | 0 | 0 | 0 | 0 |
| | Crosslinking monomer | GMA | 100% | 0 | 0 | 0 | 0 | 0 | 0 |
| | | A-TMPT | 100% | 1.0 | 1.0 | 1.0 | 1.0 | 1.0 | 1.0 |
| | | AcSi | 100% | 0.5 | 0.5 | 0.5 | 0.5 | 0.5 | 0.5 |
| | Emulsifier | KH1025 | 25% | 2.0 | 2.0 | 2.0 | 2.0 | 2.0 | 2.0 |
| | | SR1025 | 25% | 0 | 0 | 0 | 0 | 0 | 0 |
| | | NaSS | 100% | 0 | 0 | 0 | 0 | 0 | 0 |
| | Initiator | APS (aq) | 2% | 7.5 | 7.5 | 7.5 | 7.5 | 7.5 | 7.5 |
| | Ion-exchanged water | | — | 52 | 52 | 52 | 52 | 52 | 52 |
| Physical properties | Glass transition temperature Tg | | (° C.) | 55 | 55 | 62 | 62 | 60 | 60 |
| | Particle diameter (50% particle diameter) | | (nm) | 260 | 530 | 280 | 580 | 290 | 600 |
| | Toluene-insoluble matter | | (%) | — | — | — | — | — | — |
| | Degree of swelling with Electrolyte solvent | | | 4.4 | 4.4 | 6.8 | 6.8 | 4.8 | 4.8 |
| | Infrared absorption peak intensity ratio | | A(An)/A(Ac) | — | — | — | — | — | — |
| | | | A(Ac)/A(Ar) | 12 | 12 | 19 | 19 | 12 | 12 |

Abbreviated designations for Name of Raw Material in Tables 2 and 3 have the following meanings.

<Emulsifier>

KH1025: AQUALON KH1025, produced by DKS Co., Ltd., an aqueous 25% solution

SR1025: ADEKA REASOAP SR1025, produced by ADEKA Corporation, an aqueous 25% solution NaSS: sodium p-styrenesulfonate <Initiator>

APS: ammonium persulfate (an aqueous 2% solution)

<Monomer>

(Acid Monomer)

MAA: methacrylic acid

AA: acrylic acid ((Meth)Acrylic Acid Ester)

MMA: methyl methacrylate

BA: n-butyl acrylate

BMA: n-butyl methacrylate

EHA: 2-ethylhexyl acrylate

CHMA: cyclohexyl methacrylate (Aromatic Vinyl Monomer)

St: styrene (Cyano Group-Containing Monomer)

AN: acrylonitrile (Other Functional Group-Containing Monomers)

HEMA: 2-hydroxyethyl methacrylate

AM: acrylamide (Crosslinking Monomer)

GMA: glycidyl methacrylate

A-TMPT: trimethylolpropane triacrylate

AcSi: γ-methacryloxypropyltrimethoxysilane

Example 1

80 Parts by mass in terms of solid content of Water Dispersion A2 and 20 parts by mass in terms of solid content of Water Dispersion A1 were uniformly dispersed in water to prepare a thermoplastic polymer-containing coating solution (solid content: 10 mass %). At this time, the viscosity of the coating solution was adjusted to 20 mPa·s by adding carboxymethyl cellulose as a thickener to account for 1 mass % relative to the coating solution. The coating solution was applied throughout one surface of Base Material B1-1 by reverse coating using a gravure coater, and the coating solution applied was then dried at 60° C. to remove water. The coating solution was similarly applied also onto another surface of Base Material B1-1 and again dried in the same manner as above. In this way, a separator in which a polymer layer was formed on both surfaces of Base Material B1-1 was obtained.

Example 2

A separator was manufactured in the same manner as in Example 1 except that the coating conditions were adjusted to provide a polymer loading amount of 0.5 g/m².

Examples 3 to 10 and 13 to 26

Separators were obtained in the same manner as in Example 1 except that the composition of each of the base material and the coating solution was changed as shown in Table 4.

Example 11

A separator was obtained in the same manner as in Example 2 except that the thickener was xanthan gum.

Example 12

A separator was obtained in the same manner as in Example 2 except that the thickener was a modified polyurethane-based polyether.

Comparative Examples 1 and 2

Separators were obtained in the same manner as in Example 1 except that the coating conditions were as shown in Table 4 and the coating method was direct coating.

Comparative Example 3

A separator was obtained in the same manner as in Example 1 except that the coating conditions were as shown in Table 4 and the coating method was direct coating.

Comparative Example 4

A separator was obtained in the same manner as in Example 1 except that the coating conditions were as shown in Table 4 and the coating method was spray coating.

[Evaluation Results]

Each of the separators obtained in Examples and Comparative Examples was evaluated for various properties by the methods above.

The results obtained are shown in Table 4.

TABLE 4

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Coating solution | Composition | Water dispersion No. | A2 | A2 | A2 | A19 | A20 | A21 | A2-1 | A2-1 | A2-2 | A2-2 |
| | | Mixing ratio parts by mass | 80 | 80 | 80 | 80 | 80 | 80 | 80 | 80 | 80 | 80 |
| | | Water dispersion No. | A1 | A1 | A1 | A2 | A3 | A4 | A1 | A1 | A1 | A1 |
| | | Mixing ratio parts by mass | 20 | 20 | 20 | 20 | 20 | 20 | 20 | 20 | 20 | 20 |
| | | Type of thickener | CMC | CMC | CMC | CMC | CMC | CMC | CMC | CMC | CMC | CMC |
| | Solid content in coating solution mass % | | 10 | 10 | 10 | 10 | 10 | 10 | 10 | 10 | 10 | 10 |
| | Base material No. | | B1-1 | B1-1 | B1-1 | B1-1 | B1-1 | B1-1 | B1-1 | B1-1 | B1-1 | B1-1 |
| | Loading amount of polymer layer relative to base material (g/m²) | | 0.3 | 0.5 | 0.7 | 0.6 | 0.6 | 0.6 | 0.3 | 0.5 | 0.3 | 0.5 |
| | Average thickness of polymer layer (μm) | | 0.5 | 0.5 | 0.5 | 0.5 | 0.5 | 0.5 | 0.5 | 0.5 | 0.5 | 0.5 |
| Voronoi tessellation | Evaluation in 3 visual fields | Area density (%) | 30 | 51 | 80 | 60 | 68 | 76 | 32 | 49 | 31 | 52 |
| | | Average value of $\sigma^2$ (dispersion) | 0.5 | 0.5 | 0.3 | 0.4 | 0.4 | 0.3 | 0.5 | 0.4 | 0.5 | 0.4 |
| | Evaluation in 95 visual fields | Area density (%) | 31 | 53 | 78 | 62 | 70 | 74 | 31 | 51 | 30 | 51 |
| | | Average value of $\sigma^2$ (dispersion) | 0.5 | 0.5 | 0.3 | 0.4 | 0.4 | 0.3 | 0.5 | 0.4 | 0.5 | 0.4 |
| | Adhesion of separator | | A | A | AA | A | AA | AA | A | A | A | A |
| | Cycle characteristics | | B | B | B | B | B | B | A | A | AA | AA |
| | High-temperature storage characteristics | | A | A | AA | A | A | A | A | A | A | A |
| | Oxidation resistance | | A | A | A | A | A | A | A | A | A | A |
| | Rate characteristics | | A | A | A | A | B | B | A | A | A | A |

| | | | Example | | | | | | | | | |
|---|---|---|---|---|---|---|---|---|---|---|---|---|
| | | | 11 | 12 | 13 | 14 | 15 | 16 | 17 | 18 | 19 | 20 |
| Coating solution | Composition | Water dispersion No. | A2-2 | A2-2 | A2-2 | A3-2 | A4-2 | A5-2 | A6-2 | A10-2 | A11-2 | A12-2 |
| | | Mixing ratio parts by mass | 80 | 80 | 80 | 80 | 80 | 80 | 80 | 80 | 80 | 80 |
| | | Water dispersion No. | A1 | A1 | A1 | A8 | A8 | A8 | A8 | A16 | A16 | A16 |
| | | Mixing ratio parts by mass | 20 | 20 | 20 | 20 | 20 | 20 | 20 | 20 | 20 | 20 |
| | | Type of thickener | XTG | MPE | CMC | CMC | CMC | CMC | CMC | CMC | CMC | CMC |
| | Solid content in coating solution mass % | | 10 | 10 | 10 | 10 | 10 | 10 | 10 | 10 | 10 | 10 |
| | Base material No. | | B1-1 | B1-1 | B2-1 | B1-1 | B1-1 | B1-1 | B1-1 | B1-1 | B1-1 | B1-1 |
| | Loading amount of polymer layer relative to base material (g/m²) | | 0.5 | 0.5 | 0.5 | 0.3 | 0.3 | 0.3 | 0.3 | 0.3 | 0.3 | 0.3 |
| | Average thickness of polymer layer (μm) | | 0.5 | 0.5 | 0.5 | 0.5 | 0.5 | 0.5 | 0.5 | 0.5 | 0.5 | 0.5 |
| Voronoi tessellation | Evaluation in 3 visual fields | Area density (%) | 49 | 52 | 51 | 31 | 31 | 31 | 30 | 32 | 31 | 33 |
| | | Average value of $\sigma^2$ (dispersion) | 0.4 | 0.4 | 0.4 | 0.5 | 0.5 | 0.5 | 0.5 | 0.5 | 0.5 | 0.5 |
| | Evaluation in 95 visual fields | Area density (%) | 51 | 50 | 49 | 32 | 31 | 30 | 30 | 31 | 30 | 32 |
| | | Average value of $\sigma^2$ (dispersion) | 0.4 | 0.4 | 0.4 | 0.5 | 0.5 | 0.5 | 0.5 | 0.5 | 0.5 | 0.5 |
| | Adhesion of separator | | A | A | AA | AA | AA | AA | AA | A | AA | AA |
| | Cycle characteristics | | AA | AA | AA | AA | AA | AA | AA | AA | AA | AA |

TABLE 4-continued

| | | | | | | | | | | | |
|---|---|---|---|---|---|---|---|---|---|---|---|
| High-temperature storage characteristics | | A | A | A | A | A | A | A | A | A | A |
| Oxidation resistance | | A | A | A | A | AA | AA | A | A | A | AA |
| Rate characteristics | | A | A | A | A | A | A | A | AA | AA | AA |

| | | | Example | | | | | | Comparative Example | | | |
|---|---|---|---|---|---|---|---|---|---|---|---|---|
| | | | 21 | 22 | 23 | 24 | 25 | 26 | 1 | 2 | 3 | 4 |
| Coating solution | Composition | Water dispersion No. | A13-2 | A14-2 | A15-2 | A17-2 | A18-2 | A2-3 | A2 | A2 | A1 | A1 |
| | | Mixing ratio parts by mass | 80 | 80 | 80 | 80 | 80 | 80 | 80 | 80 | 100 | 100 |
| | | Water dispersion No. | A16 | A16 | A16 | A16 | A16 | A1 | A1 | A1 | — | — |
| | | Mixing ratio parts by mass | 20 | 20 | 20 | 20 | 20 | 20 | 20 | 20 | — | — |
| | | Type of thickener | CMC | CMC | CMC | CMC | CMC | CMC | CMC | CMC | CMC | CMC |
| | | Solid content in coating solution mass % | 10 | 10 | 10 | 10 | 10 | 10 | 10 | 10 | — | — |
| | | Base material No. | B1-1 | B1-1 | B1-1 | B1-1 | B1-1 | B1-1 | B1-1 | B2-1 | B1-1 | B1-1 |
| | Loading amount of polymer layer relative to base material (g/m²) | | 0.3 | 0.3 | 0.3 | 0.3 | 0.3 | 0.5 | 0.3 | 0.3 | 0.3 | 0.3 |
| | Average thickness of polymer layer (μm) | | 0.5 | 0.5 | 0.5 | 0.5 | 0.5 | 0.5 | 0.5 | 0.5 | 0.05 | 0.2 |
| Voronoi tessellation | Evaluation in 3 visual fields | Area density (%) | 31 | 34 | 31 | 30 | 30 | 40 | 49 | 31 | ND | 42 |
| | | Average value of σ² (dispersion) | 0.5 | 0.5 | 0.5 | 0.5 | 0.5 | 0.5 | 0.9 | 1.1 | ND | 1.5 |
| | Evaluation in 95 visual fields | Area density (%) | 31 | 33 | 30 | 32 | 31 | 42 | 52 | 33 | ND | 48 |
| | | Average value of σ² (dispersion) | 0.5 | 0.5 | 0.5 | 0.5 | 0.5 | 0.5 | 0.9 | 1.1 | ND | 1.7 |
| | Adhesion of separator | | A | A | AA | B | AA | B | B | C | B | B |
| | Cycle characteristics | | AA | AA | AA | A | AA | AA | B | B | C | B |
| | High-temperature storage characteristics | | A | A | A | A | A | A | C | C | C | C |
| | Oxidation resistance | | AA | AA | AA | AA | AA | AA | A | A | A | A |
| | Rate characteristics | | A | AA | A | B | AA | AA | B | B | C | B |

Abbreviated designations for the thickener in Table 4 have the following meanings.
CMC: Carboxymethyl cellulose
XTG: Xanthan gum
MPE: Modified polyurethane-based polyether

The invention claimed is:

1. A separator for an electricity storage device, comprising a base material containing at least a porous film, and a thermoplastic polymer arranged on at least one surface of the base material, wherein
the thermoplastic polymer contains an acrylic polymer which contains a crosslinked acrylic polymer containing a crosslinking monomer as a monomer unit, and the content ratio of the crosslinking monomer in the acrylic polymer is from 0.01 to 10 mass % per 100 mass % of the acrylic polymer,
the thermoplastic polymer has a dispersion ($\sigma^2$) of 0.01 to 0.7 as defined by the following mathematical equation using the area (Si) of a Voronoi polygon obtained by Voronoi tessellation,
the dispersion ($\sigma^2$) is defined as an average value of 95 dispersions ($\sigma^2$) calculated respectively in measurement visual fields set from an image captured by photographing the thermoplastic polymer arranged on the base material by a scanning electron microscope,
each of the measurement visual fields is a captured image taken at a magnification set such that the number of thermoplastic polymer particles observed in one visual field is from 80 to 200, and
the measurement visual fields are set as follows:
i) each measurement visual field: an image captured by a scanning electron microscope,
ii) method for setting the visual field:
a) an initial visual field is set,
b) 19 visual fields consisting of 9 visual fields composed of regions sequentially adjoining the initial visual field in the transverse direction, 9 visual fields composed of regions sequentially adjoining in the longitudinal direction, and the initial visual field are set,
c) a region defined by the 19 visual fields is set as an initial section,
d) 4 sections composed of regions sequentially adjoining the initial section in the uniaxial direction at intervals of 10 mm are set,
e) in each of the 4 sections, 19 visual fields are set at positions similar to those of 19 visual fields in the initial section, and
f) a total of 95 visual fields (19 visual fields ×5 sections) in the 4 sections and the initial section are set as the measurement visual field;

$$\sigma^2 = \sum_i^n \frac{\left(\frac{S_i}{m} - 1\right)^2}{n} \qquad \text{[Math. 1]}$$

(wherein Si is the measured area of a Voronoi polygon, m is an average value of the measured areas of Voronoi polygons, and n is the total number of Voronoi polygons).

2. The separator for an electricity storage device according to claim 1, wherein the dispersion ($\sigma^2$) is from 0.01 to 0.6.

3. The separator for an electricity storage device according to claim 1, wherein the dispersion ($\sigma^2$) is from 0.01 to 0.5.

4. The separator for an electricity storage device according to claim 1, wherein the thermoplastic polymer is particulate.

5. The separator for an electricity storage device according to claim 1, wherein the average particle diameter of the thermoplastic polymer is from 10 to 2,000 nm.

6. The separator for an electricity storage device according to claim 1, wherein the average particle diameter of the thermoplastic polymer is from 50 to 1,500 nm.

7. The separator for an electricity storage device according to claim 1, wherein the average particle diameter of the thermoplastic polymer is from 100 to 1,000 nm.

8. The separator for an electricity storage device according to claim 1, wherein the average particle diameter of the thermoplastic polymer is from 130 to 800 nm.

9. The separator for an electricity storage device according to claim 1, wherein the area density of the thermoplastic polymer is from 30 to 80%.

10. The separator for an electricity storage device according to claim 1, wherein the thermoplastic polymer is present substantially without overlapping.

11. The separator for an electricity storage device according to claim 1, wherein the ratio of an infrared absorption peak intensity at a wavelength of 1,720 to 1,750 $cm^{-1}$ to an infrared absorption peak intensity at a wavelength of 740 to 770 $cm^{-1}$, of the thermoplastic polymer, is from 1 to 18.

12. The separator for an electricity storage device according to claim 1, wherein the ratio of an infrared absorption peak intensity at a wavelength of 2,220 to 2,260 $cm^{-1}$ to an infrared absorption peak intensity at a wavelength of 1,720 to 1,750 $cm^{-1}$, of the thermoplastic polymer, is from 0.001 to 0.320.

13. The separator for an electricity storage device according to 1, wherein the thermoplastic polymer contains at least one member selected from the group consisting of the following (1) to (3):
   (1) a copolymer having a (meth)acrylic acid ester as a monomer unit (with a proviso excluding the following copolymer (2) and copolymer (3)),
   (2) a copolymer having a cyano group-containing monomer and a (meth)acrylic acid ester monomer as monomer units, and
   (3) a copolymer having an aromatic vinyl monomer and a (meth)acrylic acid ester monomer as monomer units.

14. The separator for an electricity storage device according to claim 13, wherein the cyano group-containing monomer is (meth)acrylonitrile.

15. The separator for an electricity storage device according to claim 13, wherein the aromatic vinyl monomer is styrene.

16. An electricity storage device having mounted therein the separator for an electricity storage device according to claim 1.

17. The method for producing the separator for an electricity storage device of claim 1, comprising:
   a step of adjusting the viscosity of a solution containing the thermoplastic polymer to 20 mPa·s or more, and
   a step of coating a base material containing a porous film with the prepared thermoplastic polymer solution while applying a shear force.

18. The separator for an electricity storage device according to claim 1, wherein the crosslinking monomer is selected from a monomer having two or more radical polymerizable double bonds, and a monomer having a functional group that provides a self-crosslinked structure during polymerization or after polymerization.

19. The separator for an electricity storage device according to claim 1, wherein the acrylic polymer contains a (meth)acrylic compound as a monomer unit in the content of from 5 to 95 mass % per 100 mass % of the acrylic polymer.

20. The separator for an electricity storage device according to claim 1, wherein the acrylic polymer layer contains the thermoplastic polymer in an amount of 60 mass % or more, and the thermoplastic polymer is the acrylic polymer.

21. The separator for an electricity storage device according to claim 1, wherein the thermoplastic polymer has at least two glass transition temperatures, at least one of these glass transition temperatures is present in a region of less than 20° C., and at least one of these glass transition temperatures is present in a region of 20° C. or more.

22. The separator for an electricity storage device according to claim 20, wherein the thermoplastic polymer contains a copolymer having a cyano group-containing monomer and a (meth)acrylic acid ester monomer as monomer units, and glass transition temperature thereof is present in a region of 20° C. or more.

* * * * *

UNITED STATES PATENT AND TRADEMARK OFFICE
CERTIFICATE OF CORRECTION

PATENT NO. : 10,361,415 B2  
APPLICATION NO. : 15/129155  
DATED : July 23, 2019  
INVENTOR(S) : Keitaro Ameyama et al.

Page 1 of 1

It is certified that error appears in the above-identified patent and that said Letters Patent is hereby corrected as shown below:

On the Title Page

In the Related U.S. Application Data:  
Please delete "(63) Continuation of application No. PCT/JP2015/056199, filed on March 3, 2015."

Signed and Sealed this  
Seventeenth Day of December, 2019

Andrei Iancu  
*Director of the United States Patent and Trademark Office*